(12) United States Patent
Levinson et al.

(10) Patent No.: US 9,462,028 B1
(45) Date of Patent: Oct. 4, 2016

(54) SYSTEM AND METHOD FOR SIMULTANEOUS REAL TIME VIDEO STREAMING FROM MULTIPLE MOBILE DEVICES OR OTHER SOURCES THROUGH A SERVER TO RECIPIENT MOBILE DEVICES OR OTHER VIDEO DISPLAYS, ENABLED BY SENDER OR RECIPIENT REQUESTS, TO CREATE A WALL OR MATRIX OF REAL TIME LIVE VIDEOS, AND TO ENABLE RESPONSES FROM THOSE RECIPIENTS

(71) Applicant: ZAP SYSTEMS LLC, Monroe Township, NJ (US)

(72) Inventors: Lawrence Levinson, Roslyn, NY (US); Connie Lynn Carr, Ft. Lauderdale, FL (US)

(73) Assignee: ZAP SYSTEMS LLC, Monroe Township, NJ (US)

( * ) Notice: Subject to any disclaimer, the term of this patent is extended or adjusted under 35 U.S.C. 154(b) by 0 days.

(21) Appl. No.: 15/066,310

(22) Filed: Mar. 10, 2016

Related U.S. Application Data

(60) Provisional application No. 62/140,061, filed on Mar. 30, 2015.

(51) Int. Cl.
*G06F 15/16* (2006.01)
*H04L 29/06* (2006.01)
(Continued)

(52) U.S. Cl.
CPC ............ *H04L 65/602* (2013.01); *H04L 63/08* (2013.01); *H04L 65/4007* (2013.01); *H04L 67/02* (2013.01); *H04N 7/181* (2013.01); *H04N 21/2187* (2013.01); *H04N 21/25816* (2013.01); *H04N 21/25841* (2013.01);
(Continued)

(58) Field of Classification Search
CPC ..... H04L 67/02; H04L 65/602; H04L 63/08; H04L 65/4007
USPC .................................................. 709/219, 231
See application file for complete search history.

(56) References Cited

U.S. PATENT DOCUMENTS

| 5,648,770 | A | 7/1997 | Ross |
| 5,982,420 | A | 11/1999 | Ratz |

(Continued)

FOREIGN PATENT DOCUMENTS

| RU | 2 018 867 C1 | 8/1994 |
| RU | 2 196 358 C2 | 1/2003 |
| RU | 36 315 U1 | 3/2004 |

*Primary Examiner* — Hee Soo Kim
(74) *Attorney, Agent, or Firm* — Scully, Scott, Murphy & Presser, PC

(57) ABSTRACT

A system and method for simultaneous real time video streaming from multiple mobile devices or other sources through a server to recipient mobile devices or other video displays, enabled by sender or recipient requests, to create a wall of real time live videos, and to enable responses from those recipients, for security, personal, entertainment or commercial applications. A server searches, retrieves, upstreams and simultaneously transmits videos from multiple sender devices to requesting recipient devices and other designated recipient devices. The server displays the content of the upstream on a website. The server enables placement of information such as third party and sender advertising and publicity in the content and enables responses to the content such as communicating with the user, posting comments, conducting electronic commerce and making reservations.

30 Claims, 47 Drawing Sheets

(51) Int. Cl.
*H04L 29/08* (2006.01)
*H04N 21/2187* (2011.01)
*H04N 21/258* (2011.01)
*H04N 21/478* (2011.01)
*H04N 21/643* (2011.01)
*H04N 21/433* (2011.01)
*H04N 21/414* (2011.01)
*H04N 21/61* (2011.01)
*H04N 7/18* (2006.01)

(52) U.S. Cl.
CPC ... *H04N 21/41407* (2013.01); *H04N 21/4334* (2013.01); *H04N 21/478* (2013.01); *H04N 21/6125* (2013.01); *H04N 21/6131* (2013.01); *H04N 21/6175* (2013.01); *H04N 21/6181* (2013.01); *H04N 21/64322* (2013.01)

(56) References Cited

U.S. PATENT DOCUMENTS

| | | | |
|---|---|---|---|
| 7,308,246 | B2 | 12/2007 | Yamazaki et al. |
| 7,444,588 | B2 | 10/2008 | Hill et al. |
| 7,451,401 | B2 | 11/2008 | Tanskanen et al. |
| 7,508,941 | B1 | 3/2009 | O'Toole, Jr. et al. |
| 7,843,491 | B2 | 11/2010 | Vallone et al. |
| 7,956,723 | B2 | 6/2011 | Girgis et al. |
| 8,149,109 | B2 | 4/2012 | Lontka |
| 8,694,612 | B1* | 4/2014 | Schoenberg ....... H04N 21/2225 709/219 |
| 2003/0098869 | A1 | 5/2003 | Arnold et al. |
| 2003/0169185 | A1 | 9/2003 | Taylor |
| 2005/0097135 | A1 | 5/2005 | Epperson et al. |
| 2006/0000971 | A1 | 1/2006 | Jones et al. |
| 2006/0276200 | A1 | 12/2006 | Radhakrishnan et al. |
| 2008/0031426 | A1 | 2/2008 | Weeks |
| 2008/0216139 | A1* | 9/2008 | Liwerant ................. G06Q 30/02 725/113 |
| 2008/0304628 | A1 | 12/2008 | Rowe et al. |
| 2008/0320538 | A1 | 12/2008 | Liwerant |
| 2009/0044237 | A1 | 2/2009 | Keiter |
| 2009/0150947 | A1 | 6/2009 | Soderstrom |
| 2009/0284348 | A1 | 11/2009 | Pfeffer |
| 2009/0300498 | A1 | 12/2009 | Falchuk |
| 2009/0300530 | A1 | 12/2009 | Falchuk |
| 2010/0099461 | A1 | 4/2010 | Rahfaldt et al. |
| 2010/0229121 | A1 | 9/2010 | Falchuk |
| 2010/0279649 | A1 | 11/2010 | Thomas |
| 2011/0090334 | A1* | 4/2011 | Hicks, III ........ G08B 13/19656 348/143 |
| 2011/0099372 | A1 | 4/2011 | Annapureddy et al. |
| 2011/0107220 | A1 | 5/2011 | Perlman |
| 2011/0111728 | A1 | 5/2011 | Ferguson et al. |
| 2011/0130112 | A1 | 6/2011 | Saigh et al. |
| 2011/0230161 | A1 | 9/2011 | Newman |
| 2012/0016952 | A1* | 1/2012 | Watt .................... G01C 21/367 709/217 |
| 2012/0052837 | A1 | 3/2012 | Reich et al. |
| 2014/0052828 | A1* | 2/2014 | Mousseau ............ H04L 65/605 709/219 |
| 2015/0032858 | A1* | 1/2015 | Motrenko ................ H04L 51/10 709/219 |

* cited by examiner

SYSTEM AND METHOD FOR SIMULTANEOUS REAL TIME VIDEO STREAMING FROM MULTIPLE MOBILE DEVICES OR OTHER SOURCES THROUGH A SERVER TO RECIPIENT MOBILE DEVICES OR OTHER VIDEO DISPLAYS, ENABLED BY SENDER OR RECIPIENT REQUESTS, TO CREATE A WALL OR MATRIX OF REAL TIME LIVE VIDEOS, AND TO ENABLE RESPONSES FROM THOSE RECIPIENTS

CROSS REFERENCE TO RELATED PATENTS AND APPLICATIONS

This application claims priority from U.S. Provisional Application No. 62/140,061 filed on Mar. 30, 2015.

This application is related to issued U.S. Pat. No. 8,483,654 for SYSTEM AND METHOD FOR REPORTING AND TRACKING INCIDENTS WITH A MOBILE DEVICE; issued U.S. Pat. No. 8,878,938 for SYSTEM AND METHOD FOR ASSIGNING CAMERAS AND CODES TO GEOGRAPHIC LOCATIONS AND GENERATING SECURITY ALERTS USING MOBILE PHONES AND OTHER DEVICES and issued U.S. Pat. No. 9,154,740, SYSTEM AND METHOD FOR REAL TIME VIDEO STREAMING FROM A MOBILE DEVICE OR OTHER SOURCES THROUGH A SERVER TO A DESIGNATED GROUP AND TO ENABLE RESPONSES FROM THOSE RECIPIENTS.

FIELD OF THE INVENTION

The invention relates generally to simultaneous video streaming from multiple mobile devices or other sources through a server to recipient mobile devices or other video displays, to create a wall or matrix of real time live video for simultaneous viewing, in response to requests by recipients or senders, where the senders can be in a designated group or groups and where the recipients can be in a designated group or groups, and to enable responses from those recipients.

BACKGROUND OF THE INVENTION

There is a need for a system to enable spontaneous or planned simultaneous real time video streaming from multiple mobile devices or other sources, through a server, as requested by a recipient or by a sender, to create a wall or matrix of real time live video, accessible to a group of recipients pre-selected by either the recipient or the sender, or if preferred by the sender, accessible to the general public, and to enable responses from those recipients, such as alert and forward the video to public safety agencies, to conduct electronic commerce or other transactions, to make reservations or appointments or to send text or data, and where the recipients are able to pre-select designated groups of senders of video they wish to access in real time. This is different from existing systems which merely enable public access, one single video at a time, to archived video upstreamed by the general public, or which merely transmit a single real time video on a one-to-one basis between users, or which merely transmit, one single video at a time, upstreamed video accessible to the general public with no control over the recipients and no capability of response by the recipients. Moreover existing systems do not provide the ability to access and view simultaneous real time live video from multiple sources and do not provide safety or security features.

SUMMARY OF THE INVENTION

The present invention provides a novel system whereby a recipient or a sender can initiate and create a wall of videos being simultaneously streamed from multiple mobile devices or other sources (a "ZAPWALL"), and whereby the recipient or the sender can designate a pre-selected group of recipients who will have access on a real time basis to such ZAPWALL, with the recipients able to take actions in response to the videos being streamed on the ZAPWALL and where the recipients are able to pre-select designated groups of senders of video they wish to access in real time. The ZAPWALL of videos being simultaneously streamed from multiple sources gives the recipients a situational and comparative awareness of simultaneous, multiple video views of one location or of multiple locations for security, personal, entertainment or commercial applications, and with the benefit of such situational and comparative awareness, the recipients may take actions on the system in response to the videos being streamed on the ZAPWALL. The recipients may view the multiple real time live videos simultaneously in the ZAPWALL matrix or may select from the ZAPWALL matrix one or more of the videos for individual viewing. In the security or military context, a recipient commander with a mobile device or a command center dispatcher may request a ZAPWALL of simultaneous real time live video streams from mobile devices being utilized by several designated senders (police or security officers or soldiers) who are deployed at or near a location, to obtain a situational awareness of an objective by live video being taken from multiple viewpoints, and such recipient commander or dispatcher can then direct such ZAPWALL to a designated group of recipients (who may also be designated senders) who can also view the multiple live videos, who may be other commanders or the personnel at or near the location, and the recipient commander or dispatcher can take actions on the system in response to such ZAPWALL, such as transmitting voice, text or data in real time to the various senders and recipients. In the entertainment context, a recipient with a mobile device or a personal computer or laptop may request a ZAPWALL of simultaneous real time live video streams from mobile devices being utilized by senders at several entertainment venues, such as dance clubs, bars and cabarets, to obtain a comparative awareness of the activity at each location, and such recipient can then direct such ZAPWALL to a designated group of recipients who are his/her friends, and the recipients can take actions on the system in response to such ZAPWALL, such as making reservations, buying tickets or transmitting voice, text or data in real time to the various senders and recipients to coordinate plans to attend particular venues. In the commercial context, a recipient with a mobile device who is attending an art show or a trade show may request a ZAPWALL of simultaneous real time live video streams from mobile devices being utilized by senders at various exhibits or locations at the show, to obtain a comparative awareness of activity, artwork or trade displays at each location, and such recipient can then direct such ZAPWALL to a designated group of recipients, who are his/her business colleagues or clients, and the recipients can take actions on the system in response to such ZAPWALL, such as communicating with the exhibitors, placing a bid or order, or transmitting voice, text or data in real time to the various senders and recipients to get more information on the exhibit location and content. In another commercial context, a recipient with a mobile device or personal computer or laptop may request a ZAPWALL of simultaneous real time live video streams from mobile devices or other video sources at multiple automobile dealerships or multiple pet stores in a geographic area to obtain a comparative awareness of new arrivals and activity at these retail locations, and such recipient can then direct such ZAPWALL to a designated group of recipients who may be family or friends, and the recipients can take actions on the system in response to such ZAPWALL, such as communicating with the retailers, making an appointment, requesting quotes or prices, placing an order, or transmitting voice, text or data in real time to the various senders and recipients to get more comparative information. Such a recipient may narrow the requested search to video upstreamed by a specific designated group of automobile dealers or pet stores already known by the recipient. The inventive system enables a sender, who may be commercial, governmental, or professional, to upstream videos to the server, accessible by pre-selected groups or the general public, who are recipients requesting ZAPWALLs of simultaneous real time live videos relevant to the location, product or service of sender, as a form of alerting, advertising, marketing and publicity for the sender. In the commercial context example above, an automobile dealer or pet shop as senders may upstream live videos of activity at their location so that recipients requesting ZAPWALLs of automobile dealers or pet shops, as applicable, in their geographic area will access the senders' videos (along with other relevant senders as well) on the ZAPWALL and then take actions on the system such as communicating with such retailer senders, making an appointment, requesting quotes or prices, placing an order, or transmitting voice, text or data in real time to such senders (and other senders) to get more comparative information. In all of these examples, the recipients accessing the ZAPWALL of multiple real time live video streams can send the same communication (voice, text, data) to the multiple senders simultaneously (such as requesting a price quote) and continue to view the video display and responses to the communication in real time. Alternatively, in all of these examples, the recipients can select from the ZAPWALL matrix of multiple videos, one or more of the sender videos to view individually and take responses to such selected sender videos.

The inventive system is spontaneous and real time utilizing live video which is displayed and viewed as it happens, and is different from systems which stream archived video. The inventive system simultaneously displays on a mobile device or other monitor a ZAPWALL matrix or wall of multiple real time live videos, and is different from systems which display only a single video.

The inventive system enables users who are recipients to search, access and view simultaneously multiple real time live video streams relevant to their inquiry. The incentive system enables users who are senders to upstream real time live video content which can be directed to designated groups of recipients or to the general public so that it is available for viewing when such recipients are scanning for multiple video streams relevant to their inquiry. Such senders may also send alerts to designated groups of recipients that upstreamed real time live video content is available for viewing.

The inventive system enables users to obtain a unique visual situational awareness of particular locations, objectives, facilities or incidents because users are able to search, access and view simultaneously multiple real time live video streams of different views thereof with the senders transmitting live video from multiple positions. With such unique visual situational awareness, users can take more educated actions in response. For example, police or military users are able to view simultaneously multiple real time live video streams of different views of a facility under surveillance because personnel deployed near the facility are transmitting live video from multiple positions near the facility, and the recipient users with such enhanced situational awareness of the facility are better able to take actions in response.

The inventive system enables users to obtain a unique visual comparative awareness of multiple locations and facilities relevant to their inquiries because users are able to search, access and view simultaneously multiple real time live video streams from different relevant senders. For example, users are able to view simultaneously multiple real time live video streams of different entertainment venues in their city because senders are transmitting live video from multiple venues within the city, and the recipient users with such enhanced comparative awareness of the multiple venues are better able to make decisions such as which venue to attend or make reservations or order tickets.

The inventive system enables bi-directional communication through the server, between recipients and senders, including voice, text and data, to further enhance situational and comparative awareness created by the simultaneous multiple real time live video streams, and to enable actions taken by recipients or senders in response to such video streams.

The inventive system enables precision searching by recipients seeking to access real time live video from particular senders or designated groups of senders or senders identified by geographic area, type of facility or venue or even coded locations within facilities or venues, or any other codes or identifiers or a general text-based search of senders. For example, police or military recipients may create a ZAPWALL of live video from specific senders identified by codes or phone numbers who are deployed in the field. Recipients may create, a ZAPWALL of live video from senders at entertainment venues within a specific zip code or other geographic identifier or from senders in a designated senders group of friends or family who may be present at various entertainment venues. Recipients at a baseball stadium who are sitting near first base may create a ZAPWALL of live video from senders who are sitting near third base to get different views of the sports action on the field, by utilizing a code such as the seating section near third base. Recipients who are tourists visiting Washington D.C. may create a ZAPWALL of live video from senders who are sightseeing venues or other tourists at those venues by initiating a text search for live videos of "Washington D.C. sightseeing venues".

The inventive system enables precision designation by senders of real time live video of particular recipients or designated groups of recipients or recipients identified by geographic area, type of facility or venue, type of recipient, or even coded locations within facilities or venues, or any other codes or identifiers or a general text based search of recipients. For example, police or military personnel deployed in the field might initiate sending real time live video to specific recipient dispatchers or commanders. Entertainment venue operators may send real time live video from their venues to designated recipient groups of prior patrons or visitors or others who have signed up to receive such videos. A pet store owner may send real time live videos of new pet arrivals accessible to all recipients within designated zip codes or counties and who match a text search for "seeking terrier puppies".

The inventive system enables insertion of third party advertising, messages or other video, audio, text and data content into the real time live video being transmitted by senders to recipients, which can appear within the ZAP-WALL, as one or more individual components of the ZAP-WALL matrix or can appear within the content transmitted by senders. For example, recipients at a baseball stadium may create a ZAPWALL of live video from senders at other locations in the stadium, which appears as a matrix of six live videos on their mobile device, except that one of the matrix slots is replaced by an advertisement for beverages and snacks available at the concession stands, which may itself be a live video, a recorded video, an image, text or data or some combination or sequence thereof. Such replacement and insertion of third party content may be temporary, intermittent, or continuous. Alternatively, the third party advertising or other content might appear within one or more of the six slots of live video comprising the ZAPWALL matrix, on a temporary, intermittent or continuous basis.

The incentive system enables recipients to refresh the ZAPWALL matrix of real time live videos to access different videos from the same or a different universe of senders. For example, recipients may create a ZAPWALL of live video from senders at entertainment venues within a specific zip code or other geographic identifier or from senders in a designated senders group of friends or family who may be present at various entertainment venues. After viewing the initial ZAPWALL matrix of for example, six videos, the recipient can request another batch of six videos from the same search criteria, which will result in accessing live videos from six new, different senders. Alternatively, after the recipient has created a ZAPWALL with videos from senders at several different entertainment venues, the recipient can narrow the ZAPWALL matrix to multiple senders from just one of those entertainment venues.

A system and method using a mobile device or other source to transmit real time streaming video through a server, accessible to a pre-selected group of recipients or to the general public, and that enables such recipients to create a ZAPWALL or matrix whereby they can access and view multiple real time live video streams from senders relevant to the recipient's inquiry, and that enables such recipients to take action in response, and that provides a solution to known problems is presented. The invention can also serve as an enhanced situational awareness system where recipients can create a ZAPWALL or matrix and simultaneously view multiple real time live video streams being transmitted from senders with different viewpoints and positions in and around a facility, location or objective. The invention can also serve as an enhanced comparative awareness system where recipients can create a ZAPWALL or matrix and simultaneously view multiple real time live video streams (together with text, data and other content) from competitive or comparative senders relevant to the recipient's inquiry and take action in response to such content. The invention can also serve as an enhanced social media format, where recipient users can spontaneously request to access and view simultaneously a ZAPWALL or matrix of relevant real time live video streams, and where users who are senders can on a spontaneous or planned basis, in response to recipient requests or on their own initiative, make available real time live video streams accessible to designated recipients or to the general public, and in either case, users can take action in response to the accessed videos.

The inventive system enables a recipient user to transmit an alert to a pre-selected group of senders, who will receive email, text or audio alerts that they should initiate sending videos which can then be accessed by the recipient as a ZAPWALL or matrix. For example, a military or police commander recipient can send such alerts to a select group of personnel deployed near a facility, requesting videos be sent from different viewpoints and positions at the facility, and such recipient can then view the real time live videos simultaneously in a ZAPWALL matrix. In another example, a leader of a corporate team attending a trade show can send such alerts to his or her other colleagues who are located at various exhibits in different parts of the trade show venue, requesting videos be sent from such different exhibits, and such recipient can then view the real time live videos simultaneously in a ZAPWALL matrix. In both cases, the recipient can take action in response to the live videos received.

The incentive system enables the multiple streams of real time live video in the ZAPWALL of a recipient to be forwarded by the recipient directly to mobile devices of other pre-selected recipients, either as an entire matrix or as one or more individual video streams selected by the first recipient.

The inventive system enables a Dispatcher to request, search for, access and view simultaneously in a ZAPWALL matrix, multiple real time live video streams from senders relevant to its inquiry, and to forward the multiple streams of real time live videos in the ZAPWALL directly to mobile devices of First Responders, either as an entire matrix or as one or more individual video streams selected by the Dispatcher.

The inventive system enables a Recipient to request access and viewing simultaneously in a ZAPWALL matrix, multiple real time videos at a facility, venue or other location for safety and security reasons, and the Recipient can forward such video, either as an entire matrix or as one or more individual video streams selected by the Recipient, to Recipient's Safety Group if it is a 'potentially dangerous' but not an emergency situation, or to a Dispatcher and Recipient's Safety Group if it is an emergency situation.

The inventive system enables a Recipient to request access and viewing simultaneously in a ZAPWALL matrix, multiple real time videos at a facility, venue or other location for safety and security reasons, not only videos being taken by individual senders from devices, but videos being taken by fixed location cameras maintained by a city, county or other municipality, transportation agencies, facility, corporate or campus security and which have been made accessible to the ZAP system (referred to as ZAP CAMERAs). For example, a Recipient is walking through a train station late at night, and for personal safety, wants to view multiple real time live videos taken from cameras located in different parts of the station. The Recipient would request ZAP CAMERA real time live videos with the correct train station code number, and if the transportation agency had made available its camera videos to the ZAP system as ZAP CAMERAS, the Recipient would be able to view a ZAPWALL matrix of live videos from such ZAP CAMERAS from multiple locations in the station. The Recipient can forward such video, either as an entire matrix or as one or more individual video streams selected by Recipient, to Recipient's Safety Group if the Recipient feels he or she is in a 'potentially dangerous' but not emergency situation, or to a Dispatcher and Recipient's Safety Group if it is an emergency situation.

The inventive system and method provides users with a software based application that can be installed on mobile devices or computers. This software can be used to send information, including live video, audio, pictures and/or text. The information is sent via the mobile device or a computer to a server from where it can be displayed live on a web site, with access controlled to a pre-selected group or available to the general public. The web site may be accessed from a mobile device, personal computer, ipad or other tablet, laptop, an internet-television, etc. Members of a pre-selected group of recipients will receive email, text or audio alerts that they should access the web site, because a video of interest to them is going to be transmitted. Members of a pre-selected group of senders will receive email, text or audio alerts that they should commence taking live videos, because a recipient wants them to take and transmit videos of interest to the recipient.

A system for real time video streaming from one or more sender devices or a designated group of senders through a website to devices of one or more recipients or a designated group of recipients enabling the recipients to view simultaneously multiple real time live videos on a device, for security, personal, entertainment or commercial applications and to enable responses from those recipients, compromising a server having a CPU, the server operable to bi-directionally communicate with the sender devices and recipient devices, and the sender devices and recipient devices operable to bi-directionally communicate with the server, a module on the server operable to receive notice of a request from a recipient device to access video and authenticate log-in of the device, transmit notice of the request for video to designated sender groups selected in accordance with the log-in of the recipient device, if any; conduct a search for relevant live video content available through the server in accordance with parameters identified by the recipient, such as videos being sent by devices of a designated sender group, or videos retrieved in a text or tag search by name, subject, location, codes or other identifiers; to receive notice of an upstream from sender devices and authenticate a log-in of the device, transmit content of the upstream of real time live video to the website, transmit notice of the upstream to one or more designated recipient groups selected in accordance with the log-in of the sender device, if any, display the content of the upstream on the website, in response to requests from one or more of the recipients, formatting and organizing multiple real time live videos so that they can be viewed simultaneously as a ZAPWALL matrix on a recipient device; enable placement of information in the displayed content, said information describing at least advertising and publicity, and enable responses to the displayed content, said responses comprising at least communicating with the log-in of the device, posting comments, conducting electronic commerce, making appointments and making reservations.

In one aspect, the module is further operable to route communications between the sender devices and the recipient devices and record, at the server, the communication from the devices to the server. In one aspect, the device can have characteristics comprising at least a geographic location and the server can be further operable to prepare and maintain a map of the geographic location of the device. In one aspect, the communication between the server and the device is performed using one or more of an internet and a cellular network, the communication between the server and personal computers, laptops and internet television is performed using one or more of an internet and a cellular network, the communication between the server and a dispatcher is performed using the internet and the communication between the service and designated sender groups and recipient groups is performed using one or more of an internet and a cellular network. In one aspect, the bi-directional communication comprises one or more of video, audio, images, text, data in encrypted form and data in unencrypted form. In one aspect, at least one of the device and the log-in of the device is registered with the system. In one aspect, the other devices comprise one or more of a personal computer, a laptop and an internet television, and at least one of the one or more devices and a log-in of one of the one or more devices is registered with the system. In one aspect, the module is further operable to enable searching for video imagery, audio, text and data on the website with respect to particular ZAPCHANNELS™ and particular senders. In one aspect, the module is further operable to manage data describing the log-in of the device, the data comprising one or more of name, address, emergency contacts, safety group names and telephone numbers, and user emergency notes.

A computer readable storage medium storing a program of instructions executable by a machine to perform one or more methods described herein may also be provided.

TERMINOLOGY

Designated Recipient Group: The pre-selected group of Recipients that a sender has designated to have access to video, imagery or other information transmitted by sender, identified by user name, subscriber lists, mobile device phone numbers, email addresses, serial numbers, codes and other methods.

Designated Sender Group. The pre-selected group of Senders that a recipient has designated to send, and such recipient to have access to, video, imagery or other information transmitted by the sender, identified by user name, subscriber lists, mobile device phone numbers, email addresses, serial numbers, codes or other methods.

Dispatcher: Person, such as a 911 operator, a police, military or security office command center monitor, an air, highway, rail, harbor, truck fleet, public utility or other transportation or traffic controller, or otherwise designated to receive and monitor distress calls and/or video content from senders. Dispatchers would also include persons managing public utility and other maintenance and service personnel and designated to receive and monitor calls and/or video content from senders. Alternatively, the Dispatcher is a centralized office to handle dispatch and response to ZAP ALERTS.

First Responder. These are police, fire, EMT, Hazmat, SWAT, Anti-Terrorism, Bomb Squad, military personnel, or any other agency, body or group, private or government owned, and/or other service providers who respond to 911, security and/or distress emergencies.

First Responders would also include public utility and other maintenance and service personnel managed by a Dispatcher. Follower. A ZAPAPP user follows particular Senders or ZAPCHANNELS™ and who receives an alert that a particular Sender or the Sender of a ZAPCHANNEL™ is upstreaming a live real time video or other information.

Geo-Location. Physical location for a mobile device, generally as determined from the device's GPS (global positioning system).

Information. Information which is communicated between system components, such as video, audio, text, images and/or other data, such as data in encrypted form and data in unencrypted form. Generally information is the exchange of audio, video, image and/or text data between the parties involved in the call. All of the information is stored on a ZAP SERVER.

Mobile Device. These are devices, typically hardware, than can stream information via the internet or 3G/4G or any other cellular networks to the ZAP SERVER. Examples of these types of devices can be an iPhone, iPad, Android®-based smartphones, Android® Notebook, Chrome book, Amazon® Kindle®, Blackberry® phones, tablet computers, laptop computers or any other mobile device on which the ZAPAPP can be installed. Mobile devices may also include navigation, communication and information display systems installed in a motor vehicle. These devices are not limited to any specific type of hardware or vendor or operating system, but will operate with any device generally considered to be a mobile device, that can connect to a network, transmit information to a server and receive information from a servicer. Typically, only software is provided to be installed on the mobile device, and the hardware is owned by the sender or recipient.

Recipient. Person who logs on to the ZAP CLOUD WEBSITE to access video, imagery, and other information from Senders, including persons who are part of a pre-selected Designated Recipient Group of a particular sender who can access video from that sender, and persons in the general public who can access only video which the senders make available for general public access. A Recipient may request, access and view simultaneously multiple real time live video from Senders relevant to Recipient's inquiry.

Safety Group. A user can create, as a special type of Designated Recipient Group, a "safety group" of other users, typically friends and/or family, who are to be notified when the creating user initiates a distress signal. Each member of the safety group has a mobile device with the ZAPAPP on it. The ZAP SERVER will send the alert to the safety group as well as to the Dispatcher. The safety group will receive the alert whether or not there is a Dispatcher, which has licensed the ZAP SYSTEM in the vicinity. If the creating user is in a situation that is "potentially dangerous" but not an emergency situation, for example, if the creating user is walking alone in a dark alley or someone knocks on the door of the creating user at 3 a.m., then the creating user can transmit either an individual video or a ZAPWALL matrix of videos from his mobile device via ZAPAPP to his predefined safety group. The safety group can view the videos from the situation, know about the situation, and can alert the police, other authorities and/or relevant people, if appropriate.

Sender. Anyone who has the ZAPAPP on his or her mobile device, or installed on a computer, and by use of the mobile device, camcorder, DVD or other video source initiates a transmission of video to the ZAP SERVER.

Upstream. When a SENDER initiates the ZAPAPP to send video and other information to the ZAP SERVER, then he or she is conducting an "Upstream". The Information provided in the Upstream can be limited to access to one or more of the Sender's Designated Recipient Groups, or can be accessible by the general public, as specified by the Sender. The Sender can specify that the Upstream is limited to access to the Sender's Safety Group. The call can be an Emergency Call or a non-emergency call such as reporting a flat tire to the sender's Safety Group.

ZAP SERVER. Hardware and/or software which manages the ZAP SYSTEM including all communications among the Senders Recipients, Designated Recipient Groups, Designated Sender Groups, the Dispatcher, the First Responders, the Safety Groups and ZAP CAMERAS. ZAP SERVER receives and processes Information sent by Senders and maintains databases, such as a database of Designated Recipient Groups and Designated Sender Groups.

ZAP CAMERA. A camera typically at a fixed location installed and maintained by a city, county or other municipality, transportation agencies, facility, corporate or campus security or others and which have been made accessible to the ZAP system.

ZAPCHANNEL™. A real time streaming video channel associated with a particular Sender and which can become a regularly viewed destination containing video imagery and other Information, accessible by a Designated Recipient Group or by the general public.

ZAPAPP. A software application which is downloaded onto the mobile device (or other computer) of the Sender and is utilized by the Sender to conduct an Upstream of video imagery or other Information to the ZAP SERVER. The same software application is utilized by a Recipient to access from the ZAP SERVER video and other Information which has been Upstreamed.

ZAP911® SYSTEM. The system described in commonly-owned U.S. Pat. No. 8,483,654 "SYSTEM AND METHOD FOR REPORTING AND TRACKING INCIDENTS WITH A MOBILE DEVICE" (HEREINAFTER "U.S. Pat. No. 8,483,654" which enables Senders, via the ZAPAPP, to send video and other Information to the ZAP SERVER, which identifies the Sender's location by GPS and routes the video and other Information to the applicable Dispatcher in a ZAP PROTECTED COUNTY and to the Sender's Safety Group in both a ZAP PROTECTED COUNTY and a Non-ZAP PROTECTED COUNTY.

ZAPCODE® SYSTEM. The system described in commonly-owned U.S. Pat. No. 8,878,938 "SYSTEM AND METHOD FOR ASSIGNING CAMERAS AND CODES TO GEOGRAPHIC LOCATIONS AND GENERATING SECURITY ALERTS USING MOBILE PHONES AND OTHER DEVICES", which enables Senders, via the ZAPAPP, to send video and other Information to the ZAP SERVER, which identifies the Sender's location not only by GPS but also by camera code and location codes and routes the information to the applicable Dispatcher, in a facility or organization which has licensed the ZAP SYSTEM, as well as to the Sender's safety group. For example, an airport operator which has licensed the ZAP SYSTEM will have assigned codes to each of the terminals, gates and parking areas of the airport so that Sender sending a ZAP ALERT can be identified by such coded locations.

ZAP PROTECTED COUNTY. A County where the ZAP911® system has been implemented. This would include providing the Dispatchers in the county with ZAP DISPATCH software and providing the First Responders in the county with the First Responder software/hardware.

NON-ZAP PROTECTED COUNTY. A county where the ZAP SYSTEM has not been implemented. The Dispatcher in this county have access to limited information about an incident via a web site provided by ZAP. The First Responders are not provided with any software or hardware in such counties.

ZAPCLOUD™ WEBSITE. A Website accessible by Recipients (via a mobile device, personal computer, ipad or other tablet, laptop or internet television, etc) which displays real time live video and other Information Upstreamed by Senders, as well as archived Information Upstreamed by Senders. When a Sender limits information access to one or more of his or her Designated Recipient Groups, this Information can only be accessed on the ZAPCLOUD™ WEBSITE by that Designated Recipient Group. When a Recipient limits requests for videos to one or more of his or her Designated Sender Groups, the Recipient will only access Information which is being or has been Upstreamed by that Designated Sender Group. Information which a Sender has made available to the general public can be accessed on the ZAPCLOUD™ WEBSITE by the general public which has the ZAPAPP. The ZAPCLOUD™ WEBSITE may also facilitate response actions by Recipients to Information from Senders. These response actions can include conducting electronic commerce, making appointments and reservations, sending text, data or confirmations and, for emergency situations, alerting and forwarding video to authorities.

ZAPWALL. A grid or matrix of videos displayed on a device or a computer screen or monitor whereby Recipients which have the ZAPAPP can access and view simultaneously multiple real time live videos which have been Upstreamed to the ZAP SERVER, with the Recipient enabled to request live videos being Upstreamed by specified individual Senders or by a Designated Sender Group and the Recipient also enabled to request relevant live videos resulting from a search based on text, tags, codes, locations, venues, or subject matter, which have been Upstreamed by ZAPAPP senders. A Recipient accessing and viewing the ZAPWALL for real time live video may select one or more of the real time live videos to maximize viewing and minimize the others. A Recipient accessing and viewing the ZAPWALL of real time live videos may select one or more or all of such videos to take response actions. These response actions can include conducting electronic commerce, making appoints and reservations, sending text, data or conformations, and for emergency situations, alerting and forwarding video to authorities.

BRIEF DESCRIPTION OF THE DRAWINGS

The invention is further described in the detailed description that follows, by reference to the noted drawings by way of non-limited illustrative embodiments of the invention, in which the reference numerals represent similar parts throughout the drawings. As should be understood, however, the invention is not limited to the precise arrangements and instrumentalities shown in the drawings.

DETAILED DESCRIPTION

Figure 1:
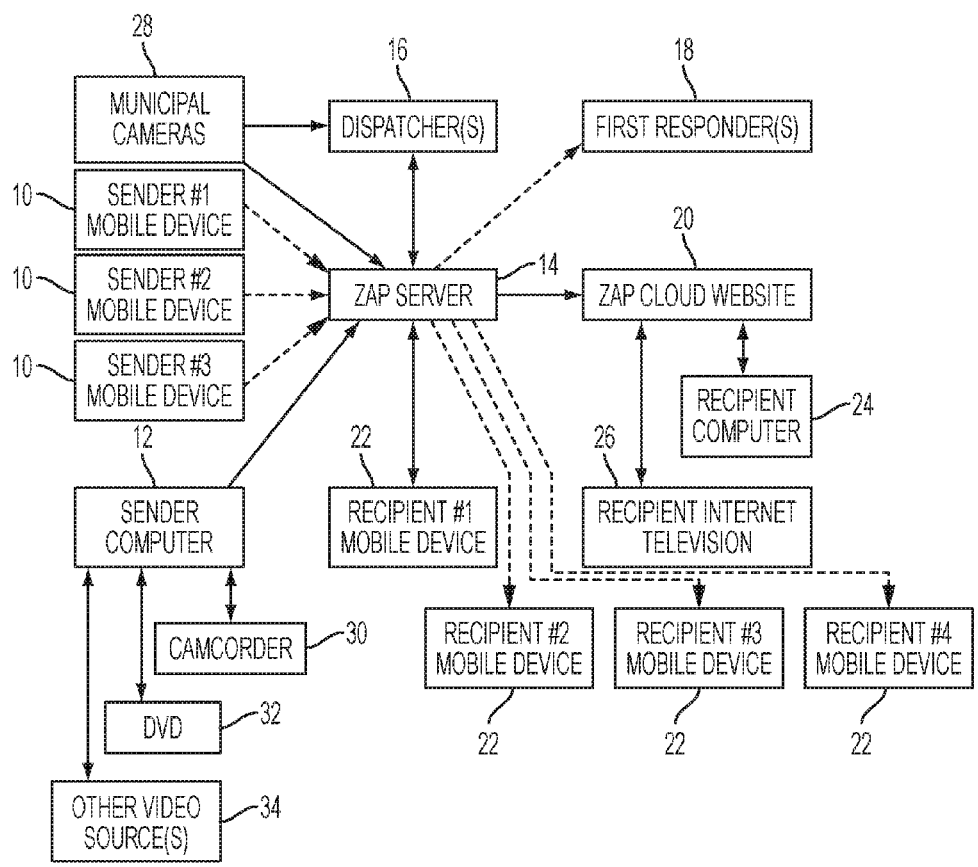
FIG. 1 shows the components of the inventive system in the exemplary embodiment.

A novel system and method for simultaneous real time video streaming from multiple mobile devices or other sources through a server to Recipient mobile devices or other video displays, enabled by Sender or Recipient requests, to create a wall or matrix of real time live videos, and which enable Recipients to take actions in response, is presented.

The inventive system and method incorporates the ZAPCLOUD™ system presented in U.S. Pat. No. 9,154,740 which provides users with a software based application, ZAPAPP, that can be installed on mobile devices as well as other computers. This software can be used to send information, including live video, audio, pictures and/or text. The Information is sent via the mobile device or other computer to a server from where it will be displayed live on a web site, the ZAPCLOUD™ WEBSITE, with access limited to a pre-selected group of users or available to the general public of users of ZAPAPP. The web site may be accessed from a mobile device, personal computer, ipad or other tablet, laptop or from an internet-television, etc. Members of the pre-selected group will receive email, test or audio alerts that they should access the web site because a video of interest to them is going to be transmitted. Members of the Safety Group of a Sender or Recipient will automatically receive the video of a safety situation from the Sender or Recipient and can simply click on their ZAPAPP to view the video, without having to otherwise access the ZAPCLOUD™ WEBSITE. When ZAPAPP is installed on a mobile device, the Sender Upstreams video and other information on a wireless basis to the ZAP SERVER. When ZAPAPP is installed on a personal computer, laptop or internet television, etc., the Sender Upstreams video and other Information via the internet to the ZAP SERVER and the ZAPAPP as so installed can have additional features, such as features to enable video editing, advertising, electronic commerce and other transactions.

The inventive system and method provides a novel system whereby a Recipient or sender can initiate and create a wall or matrix of videos being simultaneously streamed from multiple mobile devices or other sources (a "ZAPWALL") and whereby the Recipient or the sender can designate a pre-selected group of Recipients who will have access on a real time basis to such ZAPWALL, with the Recipients able to take actions in response to the video being streamed on the ZAPWALL. The Recipients are able to pre-select designated groups of Senders of video they wish to access in real time. The ZAPWALL, being created from videos being simultaneously streamed from multiple sources, gives the Recipients a situational and comparative awareness of simultaneous, multiple video views of one location or of multiple locations for security, personal, entertainment or commercial applications, and with the benefit of such situation and comparative awareness, the Recipients may take actions on the system in response to the videos being streamed on the ZAPWALL. The Recipients may view the multiple real time live videos simultaneously in the ZAPWALL matrix or may select from the ZAPWALL matrix one or more of the videos for individual viewing. The Recipients may take actions in response to the live videos in the ZAPWALL matrix. The action may be transmitted to all of the senders of video appearing in the ZAPWALL matrix or may be transmitted only to the senders of one or more of the videos in the ZAPWALL matrix, as selected by the Recipient taking the action.

The inventive system can be integrated with the ZAP911® system presented in U.S. Pat. No. 8,483,654 for ZAP PROTECTED COUNTIES. The inventive system enables a Recipient to request access and viewing simultaneously of the ZAPWALL matrix, multiple real time videos at a facility, venue or other location for safety and security reasons. The Recipient can forward such video, either as an entire matrix or as one or more individual video streams selected by the Recipient, to Recipient's Safety Group if it is a 'potentially dangerous' but not an emergency situation, or to a Dispatcher and the Recipient's Safety Group if it is an emergency situation. Further, the inventive system enables a Dispatcher in a ZAP PROTECTED COUNTY to request, search for, access and view simultaneously the ZAPWALL matrix, multiple real time live video streams from senders relevant to its inquiry, and to forward the multiple videos streams of real time live videos, directly to mobile devices of First Responders, either as an entire matrix or as one or more individual video streams selected by the Dispatcher. Further, the inventive system enables a Recipient and/or Dispatchers in a ZAP PROTECTED COUNTY, to request, access and viewing simultaneously the ZAPWALL matrix, multiple real time live videos at a facility, venue or other location for safety and security reasons, not only videos being taken by individual senders from devices, but videos being taken by fixed location cameras maintained by a city, county or other municipality, transportation agency, facility, corporate or campus security and which have been made accessible to the ZAP system (referred to as ZAP CAMERAs).

The inventive system can be integrated with the ZAPCODE® system presented in U.S. Pat. No. 8,787,938. The inventive system enables a Recipient to request access and viewing simultaneously the ZAPWALL matrix, multiple real time videos at a facility, venue or other location for safety and security reasons which are identified by specific codes, tags, branch, facility, building, room or other location numbers (ZAPCODE®s), and the Recipient can forward such video, either as an entire matrix or as one or more individual video streams selected by the Recipient, to Recipient's Safety Group if it is a 'potentially dangerous' but not an emergency situation, or to a Dispatcher and the Recipient's Safety Group if it is an emergency situation. Further, the inventive system enables a Dispatcher in A ZAP PROTECTED facility or organization, to request, search for, access and view simultaneously the ZAPWALL matrix, multiple real time live video streams from senders relevant to its inquiry and identified by specific codes, tags, branch, facility, building, room or other location numbers (ZAPCODE® s) and to forward the multiple videos streams of real time live videos, directly to mobile devices of First Responders, either as an entire matrix or as one or more individual video streams selected by the Dispatcher. Further, the inventive system enables a Recipient and/or Dispatchers in a ZAP PROTECTED facility or organization, to request, access and viewing simultaneously the ZAPWALL matrix, multiple real time live videos at a facility, venue or other location for safety and security reasons, not only videos being taken by individual senders from devices, but videos being taken by fixed location cameras maintained by a city, county or other municipality, transportation agency, facility, corporate or campus security and which have been made accessible to the ZAP system (referred to as ZAP CAMERAs) and which are identified by specific codes, tags, branch, facility, building, room or other location numbers (ZAPCODE® s).

The inventive system can be integrated with the use of ZAPCHANNELS™, which are part of the ZAPCLOUD™ system presented in U.S. Pat. No. 9,154,740. The ZAPCLOUD™ system enables a Sender to establish a real time streaming video channel associated with that Sender (referred to as a ZAPCHANNEL™). This ZAPCHANNEL™ can become a regular viewed channel or destination on the ZAPCLOUD™ WEBSITE, accessible by a pre-selected group of ZAPAPP users or by the general public of users of ZAPAPP, via mobile devices, personal computers, laptops, internet television, etc. and utilized for personal, entertainment, advertising, electronic commerce and other commercial applications. Each ZAPCHANNEL™ can be customized by the Sender, with respect to the Designated Recipient Groups to have access from time to time and with respect to the content on the ZAPCHANNEL™, which in addition to video will include other information and the ability of the Recipients to take actions in response to the Information on the ZAPCHANNEL™, such as conducting electronic commerce transactions, making appointments and reservations, entering text and data, and many other responses. The inventive system enables Senders with a ZAPCHANNEL™ to send to the Designated Recipient Groups or the general public a ZAPWALL matrix of multiple real time videos which can be viewed simultaneously, and with the Recipients being enabled to take actions in response to all of the videos or one or more of the videos selected by the Recipient. For example, a pet shop with a ZAPCHANNEL™ could send to its Designated Recipient Group of customers looking for dogs, a ZAPWALL matrix of six live real time videos of different dogs in the store, and a Recipient of such ZAPWALL could take action in response and select two of the six and text to the store, "I'm interested in these two dogs, please reserve them as I will visit your store today". The inventive system enables Recipients to search for ZAPCHANNELS™ and create a ZAPWALL matrix of multiple real time videos which can be viewed simultaneously and with the Recipient able to take actions in response to all of the videos or one or more of the videos selected by the Recipient. For example, a Recipient looking for dogs could request and receive a ZAPWALL matrix of six ZAPCHANNELS™ from different pet stores in his or her vicinity, and the Recipient could take action in response and select two of the six and text to those pet stores, "I'm interested in the dog you are showing on your ZAPCHANNEL™, please reserve them as I will visit your store today."

The invention is centered around three pieces of software: ZAPAPP, ZAP SERVER (which includes the software to create ZAPWALLs), and the ZAPCLOUD™ WEBSITE. In ZAP PROTECTED COUNTIES which have implemented the ZAP911® system or ZAP PROTECTED facilities or organizations which have implemented the ZAPCODE® system, the invention also utilizes ZAP DISPATCH and ZAP FIRST RESPONDER software. These pieces work together to facilitate an end-to-end video, audio, images, and/or text medium of communication between the Sender, the ZAP SERVER, the Recipients and the ZAPCLOUD™ WEBSITE, and ZAP PROTECTED COUNTIES or ZAP PROTECTED facilities or organizations, the Dispatcher and First Responders.

FIG. 1 shows the components of the inventive system in an exemplary embodiment. As shown on FIG. 1, the system can include one or more Sender's mobile devices 10, a personal computer 12 with video inputs from a camcorder 30, DVD 32 and/or other video sources 34, a ZAP SERVER 14, ZAP DISPATCH software located in a computing device 16, one or more First Responder devices 18, ZAPCLOUD™ WEBSITE 20, one or more Recipient mobile devices 22, a Recipient's personal computer 24, a Recipient's internet television 26, and ZAP CAMERAS 28 installed by ZAP or accessible by the ZAP SERVER. These cameras can be installed at public locations in the county or installed by a facility or a campus. The camera's video feed can be provided to the ZAP SERVER over the Internet. The ZAP DISPATCH Software on device 16, ZAP FIRST RESPONDER Software on device 18 and ZAP CAMERAS 28 are part of the ZAP911® or ZAPCODE® systems and are only available in ZAP PROTECTED COUNTIES or a ZAP PROTECTED organization or facility. In a non-ZAP PROTECTED COUNTY, a governmental Dispatcher can access limited information about the incident via a web page provided by ZAP.

The components of the inventive system can communicate via the Internet as shown with the solid lines. In addition or in the alternative, communication can occur via cellular networks (4G or any other type of cellular network available), as shown with the dashed lines. Specifically the ZAP SERVER 14 can bi-directionally communicate with one or more of the mobile devices 10 and 22 via the internet or cellular networks and with one or more of the personal computers and internet televisions 12, 24 and 26 over the internet, with ZAP DISPATCH software on device 16 via the internet and with ZAP FIRST RESPONDER mobile device(s) 18 via the cellular networks.

ZAPAPP, the novel software application, is software that a Recipient or a Sender can download and install on his or her mobile device 10 or on a personal computer 12. ZAPAPP provides the user functionality and interface with other components. In one embodiment, this software can be downloaded from a repository, such as "Apple® online app store", "Android® store", the ZAP WEBSITE, etc. In another embodiment, this software can be downloaded onto a personal computer from the ZAPCLOUD™ WEBSITE.

Figure 2:
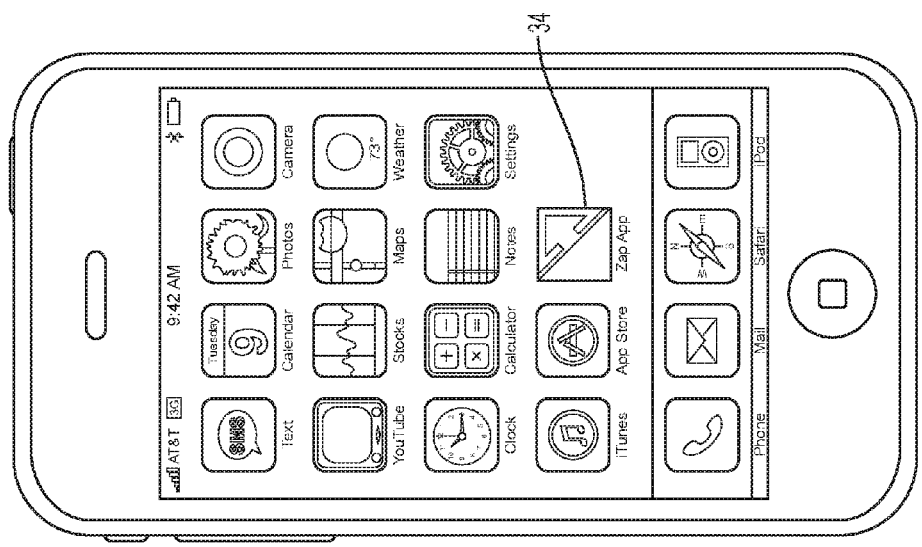
FIG. 2 shows an exemplary mobile device screen with ZAPAPP installed and a ZAPAPP icon displayed on the screen.

FIG. 2 shows an exemplary mobile device screen with ZAPAPP installed and a ZAPAPP icon 34 displayed thereon. The display would be similar for a personal computer with ZAPAPP installed.

ZAPAPP allows a user to perform the following functions: Register with the ZAP SYSTEM, Create a Safety Group, Create one or more Designated Recipient Groups, Make emergency or non-emergency calls, Stream Video or send images (pictures), Receive alerts, Provide geo-location to a server, Upstream video and other information accessible on the ZAPCLOUD™ WEBSITE to Designated Recipient Groups and alert the members of those groups, Upstream video and other information accessible on the ZAPCLOUD™ WEBSITE by the general public of users who have ZAPAPP, create and tag a ZAPCHANNEL™ on the ZAPCLOUD™ WEBSITE, access the ZAPCLOUD™ WEBSITE to view content in response to an alert to a Designated Recipient Group or a Safety Group, or to view content accessible to all Recipients, and in ZAP PROTECTED COUNTIES, or with respect to a ZAP PROTECTED organization or facility, communicate with the Dispatcher and/or First Responder(s), using voice or text data, Get status updates when a call is in progress and Tag Calls. ZAPAPP can receive information from the ZAP SERVER, such as a safety group alert and/or video stream and a Designated Recipient Group Alert. The ZAPAPP enables the Recipient to view, simultaneously, a ZAPWALL matrix or grid of multiple real time live videos, which have been made available to such Recipient by one or more Senders.

Figure 3:
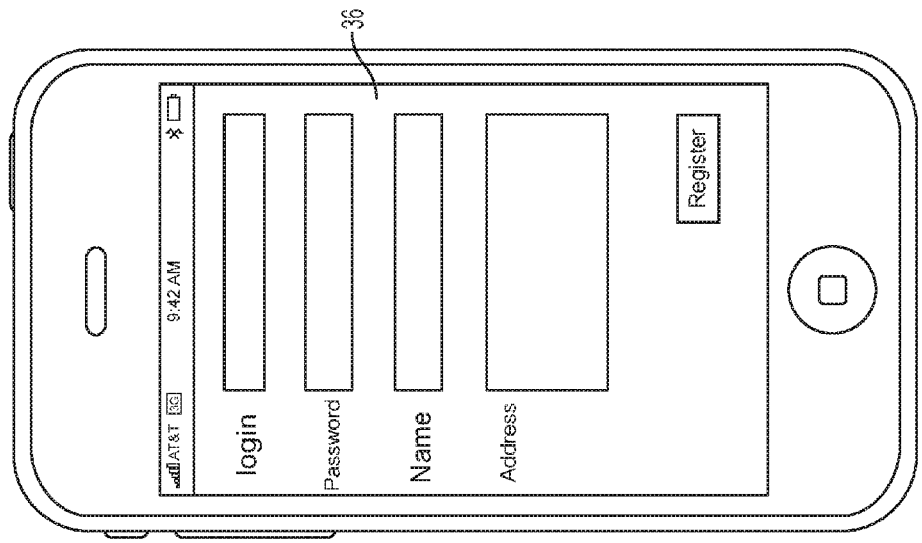
FIG. 3 is an exemplary screen illustrating one embodiment of ZAPAPP registration

ZAPAPP allows a user to register with the ZAP SYSTEM. In the ZAP SYSTEM each user has a login id and password that uniquely identifies that user in the system. FIG. 3 is an exemplary screen 36 illustrating ZAPAPP registration. Other screen formats can also be used.

Figure 4:
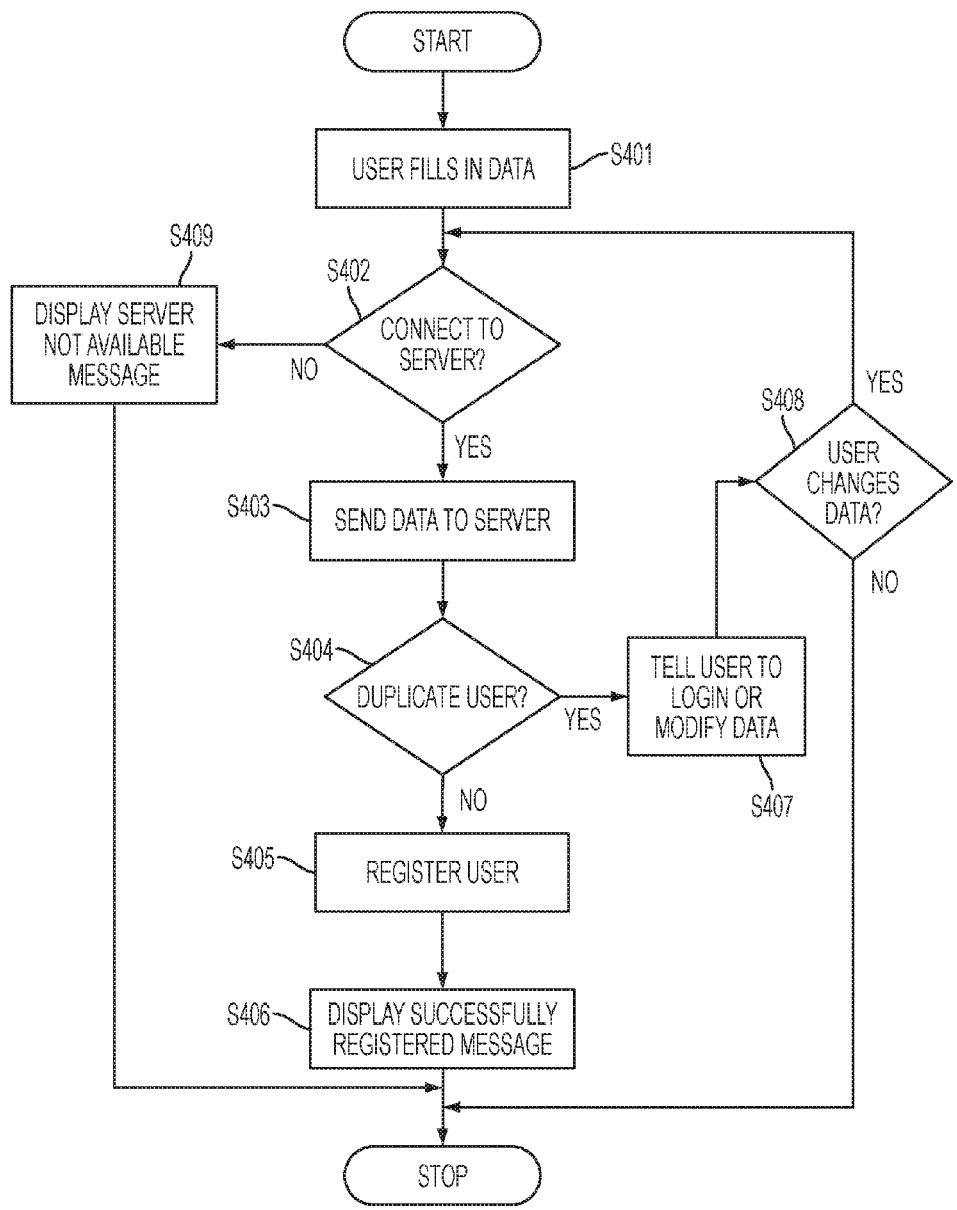
FIG. 4 is a flow diagram of the registration process.

FIG. 4 is a flow diagram of the registration process. In step S401, the users fills in data, such as a login, e.g., user name, password, name and address. Additional data can include User Home/Work Address, User Telephone Number, User Emergency Contact Names (S), User Emergency Contact Phone Number(s) and/or User Emergency Notes. Not all of this data is required for registration. If the user is connected to the ZAP server (S402-YES) then the data is sent to the Server is step S403. If the user is not a duplicate (S404-NO) then the user is registered in the system in step S405. A message indicating that the user has successfully registered is displayed in step S406 and the registration process is complete.

If the user is a duplicate (S404-YES), then the user is instructed to either login or to modify the user name in step S407. If the user changes the data, e.g., modifies the user name (S408-YES), then processing continues at S402. Otherwise (S408-NO), processing terminates.

If the user is not connected to the Server (S402-NO), then a message indicating that the server is not available is displayed and processing terminates.

The ZAPAPP allows a user to create a safety group, that is, a group of ZAP MEMBERS, e.g., friends and/or family of the user, who can be sent an alert when a user makes an Emergency or Non-Emergency call. When a member of the safety group clicks on or accepts the alert, he or she sees what video and other information is being streamed from the mobile device of the users. The video stream alert to the safety group will indicate whether or not the Dispatcher has received the alert from the user and is managing the alert as an incident. If the alert to the safety group indicates there is no Dispatcher involved, or the Dispatcher has rejected the user alert, or the Dispatcher has not elevated the user alert to an incident, then one or more members of the safety group can initiate a call to 911 when he or she feels that user's environment or situation warrants such call. If the Recipient user has created a ZAPWALL of multiple live video streams of the facility or environment, the user can transmit the entire ZAPWALL matrix or individual video streams within the ZAPWALL, to the Dispatcher and the Safety Group, thereby enhancing the situational awareness being viewed by the Dispatcher and the Safety Group. The ZAPWALL can include videos Upstreamed by individual Senders and/or video fees from ZAP CAMERAS if they have been made accessible to the ZAP SYSTEM.

Figure 5:
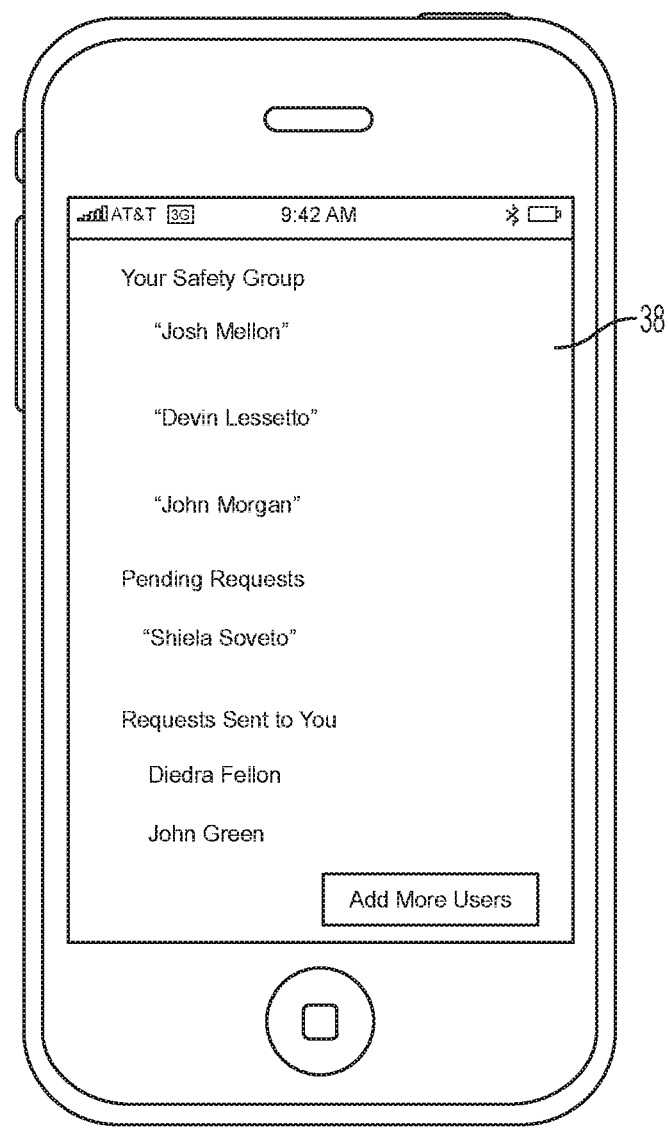
FIG. 5 is an exemplary screen of a Recipient's or Sender's safety group.

FIG. 5 is an exemplary screen 38 of a user's safety group. As shown, the screen displays the current members of the safety group, pending requests from other potential members, and requests from system users to join their safety groups. The User can add more members to his or her safety group by click on the "Add More Users" button.

Figure 6:
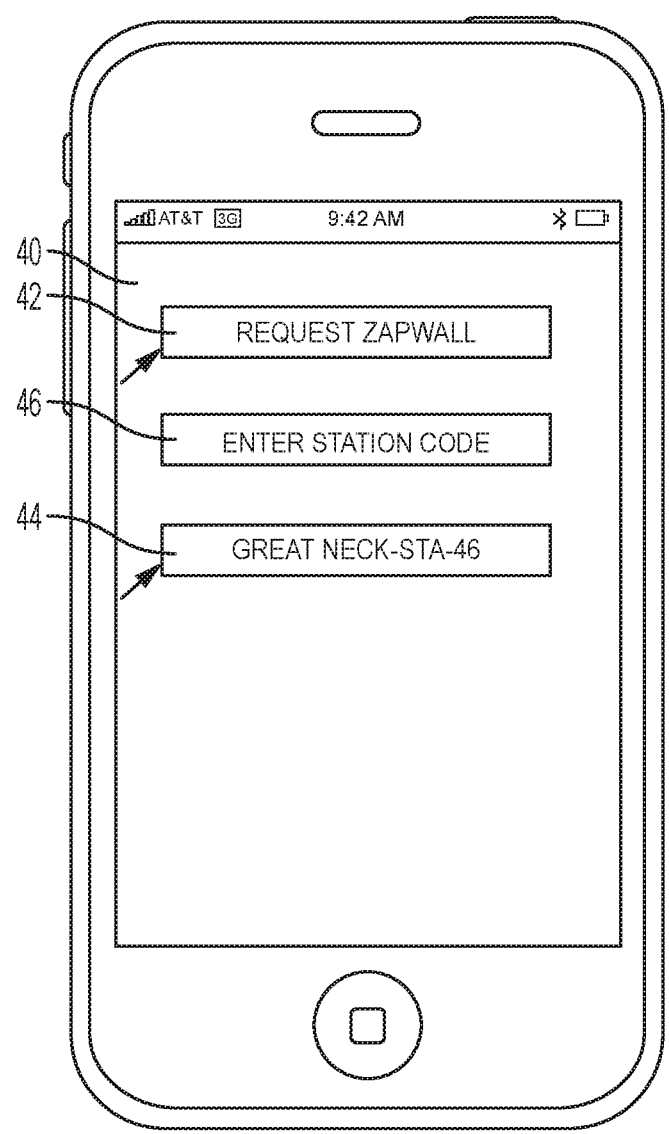
FIG. 6 is an exemplary screen of a Recipient requesting simultaneous multiple live video streams from a train station platform.

As an example, FIG. 6 is an exemplary screen 40 of a Recipient requesting a ZAPWALL matrix of simultaneous live video streams from the train station platform. In this example, the user who is registered with the ZAP SYSTEM and has the ZAPAPP, is waiting for her train at a commuter train station late in the evening and is concerned with her safety. Utilizing the ZAPAPP on her smartphone, in request area 42 she requests a ZAPWALL matrix of live real time videos being sent from other ZAPAPP users as well as ZAP CAMERAS at the train station, by tapping in area 44 a text for "Great Neck Station" or a code "Station 46" that appear from a GPS locator function. A station code can also be entered in area 46.

Figure 7:
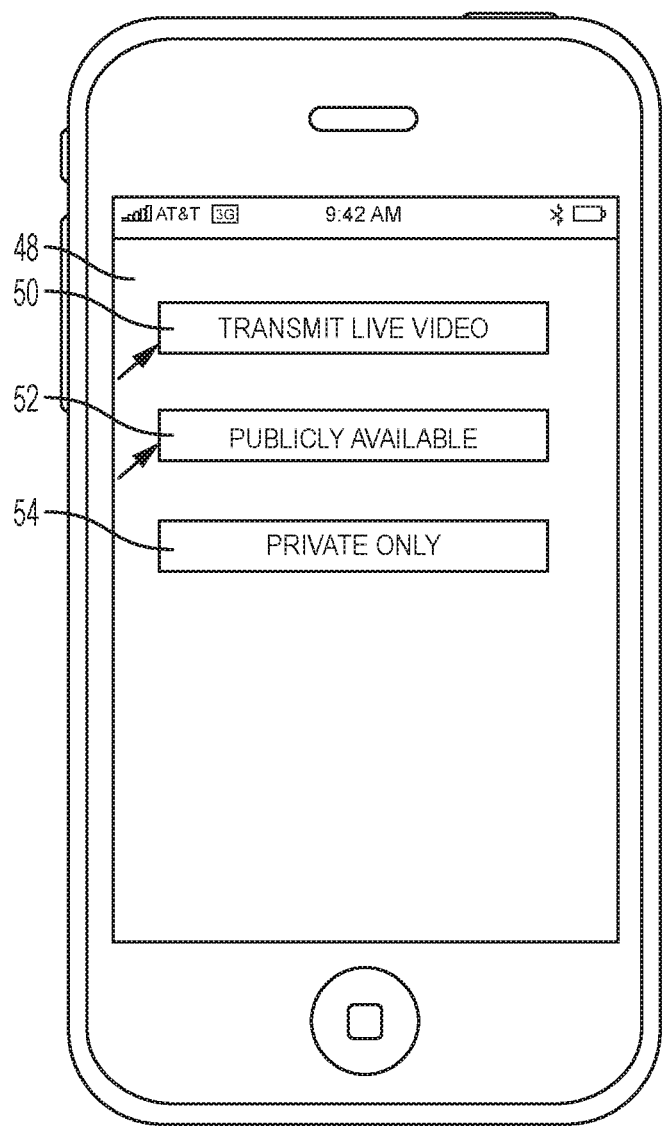
FIG. 7 is an exemplary screen of a sender transmitting live video from a train station platform.

FIG. 7 is an exemplary screen 48 of the smartphone of another ZAPAPP user who is a Sender of live video from the same station platform and who is making such video available to the general public of ZAPAPP users, as well as to his own Safety Group using the transmit button 50. This Sender has chosen to make his video publicly available using area 52 because, if he encounters a dangerous situation on the platform, other ZAPAPP users on the same station platform viewing his live video, can take actions in response. His Safety Group can also take actions in response, such as alerting a Dispatcher. Alternatively, the video can be made private using area 54.

Figure 8:
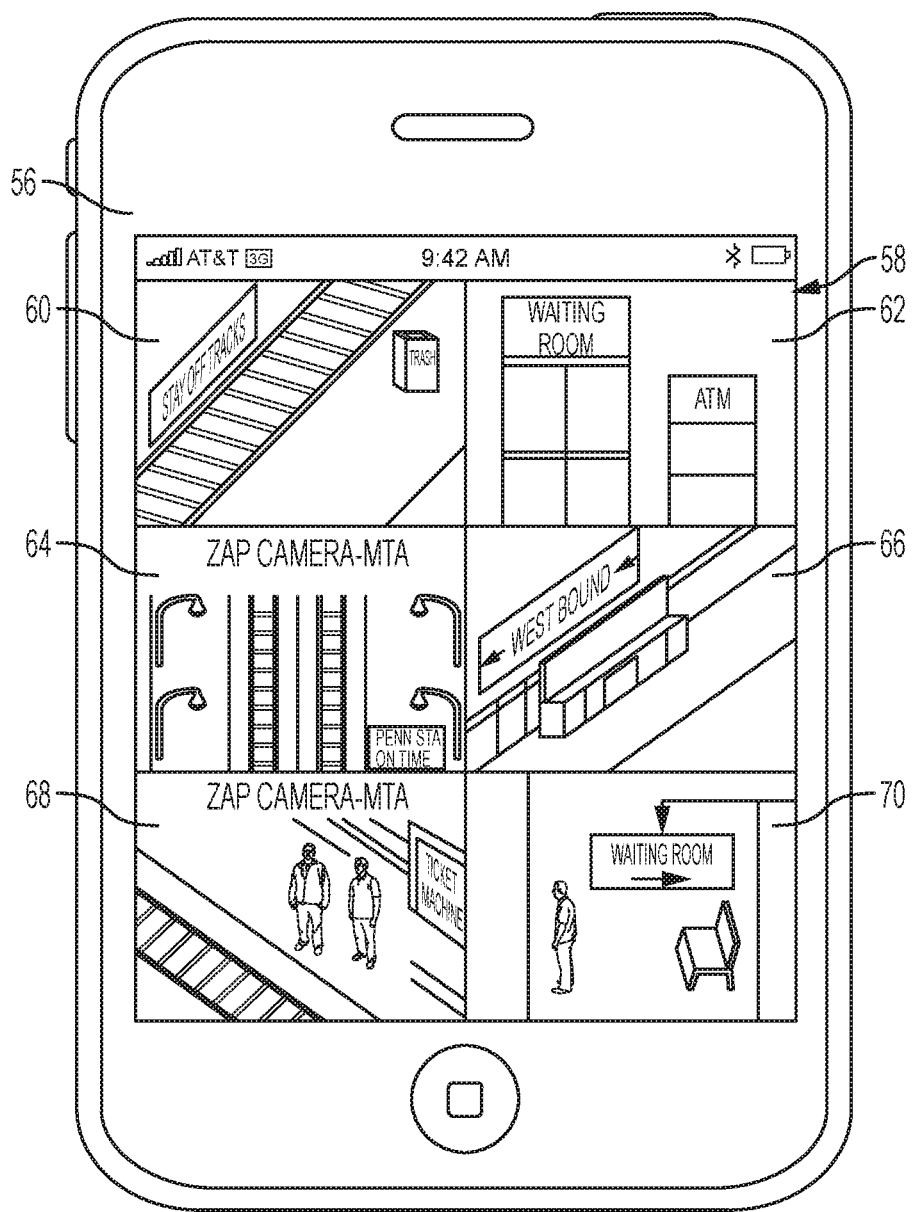
FIG. 8 is an exemplary screen of a Recipient showing a ZAPWALL matrix of simultaneous, multiple live video streams from private senders and from ZAP CAMERAS installed by the transportation agency.

FIG. 8 is an exemplary screen 56 of the ZAPWALL matrix 58, of live videos 60, 62, 64, 66, 68 and 70 with different views of the train station platform, appearing on the smartphone of the Recipient who had requested the ZAPWALL. If the Great Neck Station is in a ZAP PROTECTED COUNTY and/or the transportation agency has installed and made available ZAP CAMERAS to the ZAP SYSTEM, the ZAPWALL matrix will include live video from these ZAP CAMERAS as well as from the Senders taking live video of the station platform from their mobile devices. The Recipient is now viewing a ZAPWALL matrix 58 with live videos taken from different viewpoints of the platform and has a greater situational awareness of her safety, and take actions in response to the ZAPWALL videos. She can walk to a different part of the platform if one area has a potential danger. She can also forward the ZAPWALL matrix as a whole, or one or more of the live videos within the ZAPWALL, to her Safety Group, or if it is an Emergency, to a Dispatcher in a ZAP PROTECTED COUNTY or to the transportation agency if it is a ZAP PROTECTED organization.

Figure 9A:
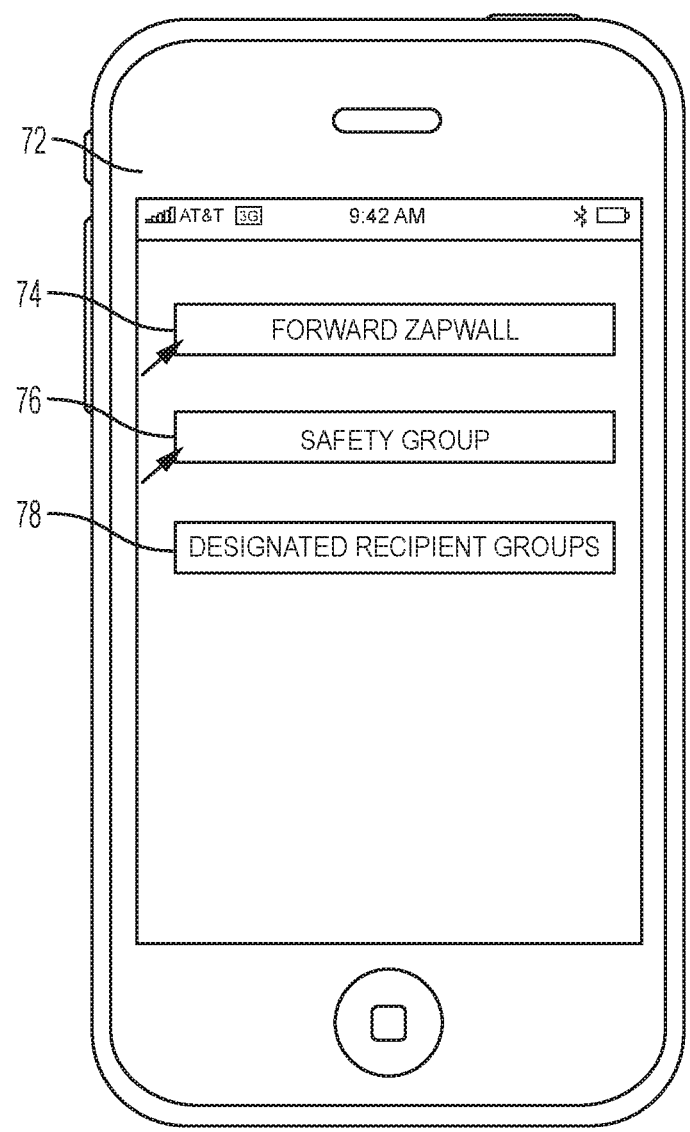
FIG. 9A is an exemplary screen of a Recipient in a distress situation forwarding a ZAPWALL matrix to his or her Safety Group.
Figure 10:
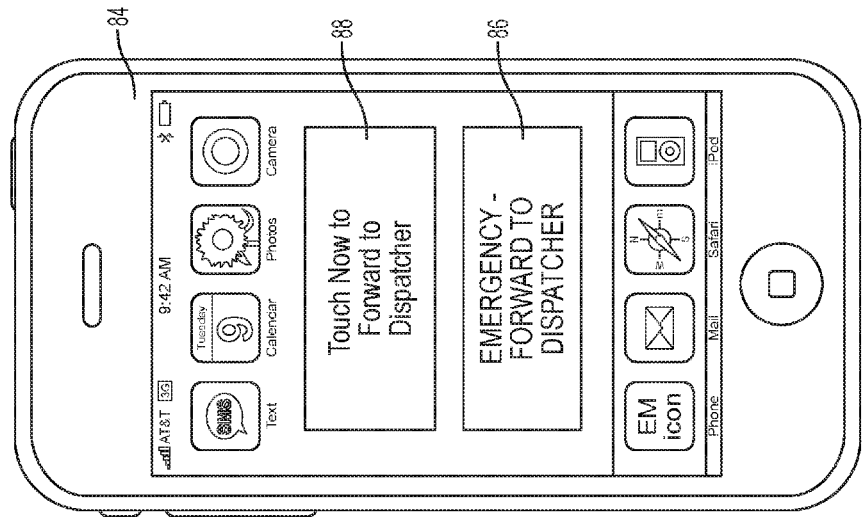
FIG. 10 is an exemplary screen of a Safety Group member forwarding the ZAPWALL matrix of simultaneous, multiple live video streams of an incident in an emergency situation (received from a Recipient or a sender) to a Dispatcher in a ZAP PROTECTED COUNTY.
Figure 9B:
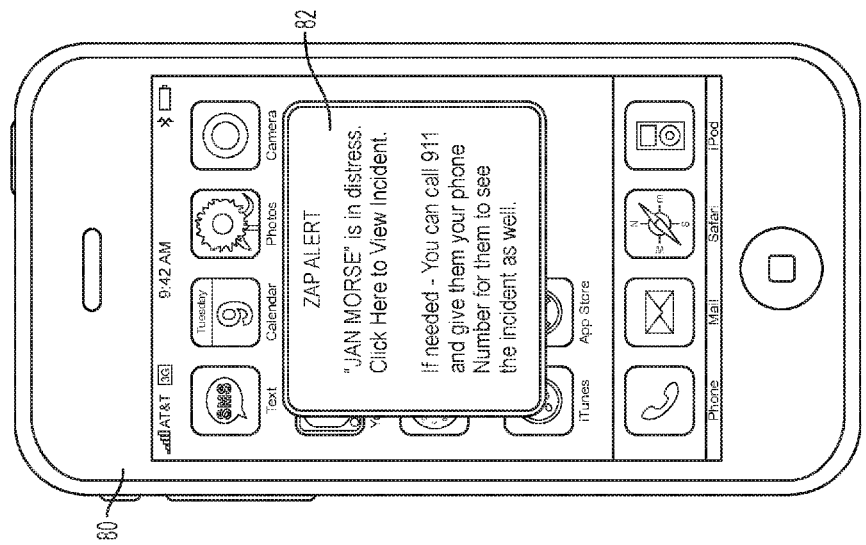
FIG. 9B is an exemplary screen of safety group member receiving an alert from a sender or Recipient in a distress situation.
Figure 11:
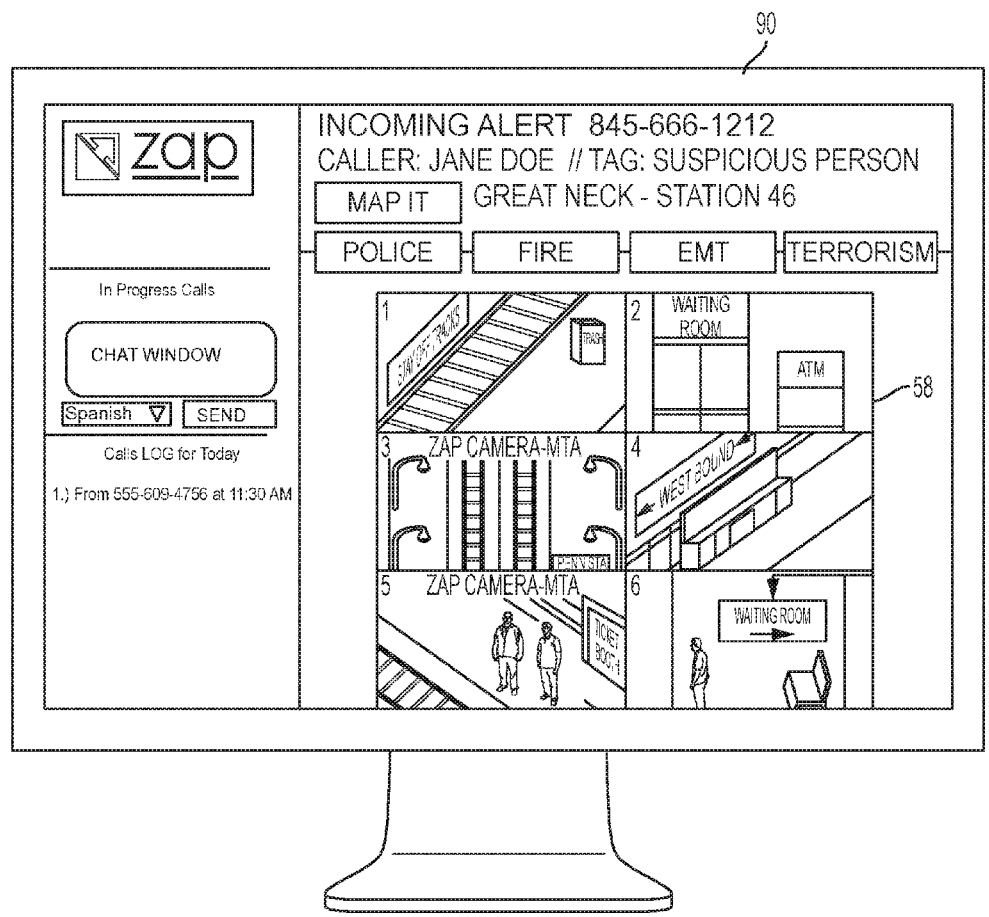
FIG. 11 is an exemplary screen of a Dispatcher receiving an alert on the ZAP WEB SITE via the ZAP DISPATCH software in a ZAP PROTECTED COUNTY, viewing a ZAPWALL matrix of simultaneous, multiple live video streams of an incident forwarded by a Recipient or a safety group member of the Recipient.

Continuing the example above, suppose the Recipient, after viewing the ZAPWALL matrix of live videos from the station platform, feels uncomfortable about her security and that there is a potentially dangerous situation. FIG. 9A is an exemplary screen 72 of a Recipient in a distress situation forwarding a ZAPWALL matrix. The Recipient can use area 74 to forward the ZAPWALL matrix of live video to her Safety Group highlighting area 76 or to her Designated Recipient Group highlighting area 78. FIG. 9B is an exemplary screen 80 of safety group member receiving an alert 82 from a Sender or Recipient in a distress situation. The Safety Group member now views the ZAPWALL matrix of live videos from the station platform forwarded by the Recipient, and is also alarmed by viewing the multiple views of the station platform, and decides to forward the ZAPWALL matrix and alert a Dispatcher that there is an Emergency situation. FIG. 10 is an exemplary screen 84 of a Safety Group member forwarding the ZAPWALL matrix of simultaneous multiple live video streams of an incident in an emergency situation (as received from the Recipient) to a Dispatcher using area 86 in a ZAP PROTECTED COUNTY or a ZAP PROTECTED Organization, in this case the transportation agency operating the train station or to a Dispatcher in a non-emergency situation using area 88. FIG. 11 is an exemplary screen 90 of a Dispatcher receiving an alert on the ZAP WEB SITE via the ZAP DISPATCH software in a ZAP PROTECTED COUNTY or a ZAP PROTECTED Organization (the transportation agency), viewing the ZAPWALL matrix 58 of simultaneous, multiple live video streams of an incident, which video originated with the Recipient above who is on the station platform and was forwarded to a Safety Group member of such Recipient, who then forwarded it to the Dispatcher. The Dispatcher may then elect to view videos—whether individual or a ZAPWALL matrix—being Upstreamed by other ZAPAPP users as well as ZAP CAMERA video feeds at the same location. The Dispatcher viewing the ZAPWALL matrix of simultaneous live video streams from one or more users, as well as ZAP CAMERA video feeds, is able to obtain an enhanced situational awareness and capability of taking response actions, such as forwarding to First Responders and issuing specific command instructions relevant to the incident.

When a situation in which a user or Sender becomes a user-in-distress, depending on whether the user makes an Emergency or Non-Emergency call, the ZAPAPP can perform the following operations. If the user has specified that the call is an emergency Call, e.g., by clicking or tapping the emergency box, the ZAP SERVER will determine whether the user is located in a ZAP PROTECTED COUNTY, facility or organization, or a NON-ZAP PROTECTED COUNTY, facility or organization. The distress signal will include the user's geo-location, and may include a code, tag, facility, building, room number or other ZAPCODE® identifier, captured by ZAPAPP from the user's mobile device. When the distress signal is sent out or transmitted, the ZAP SERVER determines the location of the user-in-distress and if the call is made from a ZAP PROTECTED COUNTY, facility or organization, then the ZAP SERVER routes the call to the correct Dispatcher, including the ZAPWALL matrix or one or more individual videos being upstreamed. For a NON-ZAP PROTECTED COUNTY, facility or organization, since there is no Dispatcher, the alert and the ZAPWALL matrix or one or more individual videos is sent by the server only to the Safety Group members. If the user has specified that the call is a non-Emergency Call, by clicking or tapping the Non-Emergency box, then the alert is sent by the ZAP SERVER only to the user's safety group members.

The user can stream information, such as video, audio, images, text and other data or a combination thereof, including a ZAPWALL matrix, to his or her Designated Recipient Group, safety group and/or the Dispatcher. ZAPAPP typically uses the inbuilt camera in the mobile device to capture the video and/or pictures in situations where the user does not have a high speed internet connection available. This process generally occurs in the background. The user points the camera in the direction of the subject scene and the ZAPAPP basically captures the "view" of the camera on the mobile device and steams this view in video format to ZAP SERVER. The format can be H.2t64 and can vary from device to device. The video is sent to the server using HTTP, FTP, RTP, RTMP, RTSP or any other streaming protocol as appropriate. ZAPAPP can also be installed on a personal computer, laptop, internet television or other device, and the video content can be input to such computer via camcorder, camera, DVD or other source. ZAPAPP can have additional features to enable video editing, advertising, electronic commerce and other transactions. Due to the greater bandwidth required by these features, this embodiment may be more appropriate for commercial and creative Senders who wish to Upstream video and have it displayed on the ZAPCLOUD™ WEBSITE and to have a ZAPCHANNEL™ associated with such Senders.

The transmission, e.g., video streaming in one embodiment, can be adjusted in accordance with the bandwidth available to transmit the data when the call is made. For example, if the bandwidth is good, then video-color data is streamed. If the bandwidth is medium, then a lower frame rate video is sent. If the bandwidth is less than medium, then gray scale video is sent. If the bandwidth is minimal, then the only data sent is images that are taken every two or five seconds and uploaded to the server for transmission to the appropriate devices. Bandwidth considerations may also require that the number of live videos appearing in the ZAPWALL matrix be adjusted; for example, if the Recipient is viewing six live videos simultaneously, and there is limited bandwidth, the ZAP SERVER will make an adjustment so that three live videos are viewed simultaneously and then rotated with the other three Sender live videos every 15 seconds.

ZAPAPP has built-in capabilities to receive alerts from the user or ZAP SERVER. The alert can be sent by one or more of the following methods. PUSH notification can be used to send messages to mobile devices. This technology is typically deployed to send alerts to users of APPLE® and ANDROID®-based devices. A member of the user's Designated Recipient Group or Safety Group can get an alert via PUSH notification or its equivalent technology on different devices. A Short Message Service (SMS) message is sent along with the PUSH notification.

When the user makes an Emergency call from a ZAP PROTECTED COUNTY, facility or organization, the Dispatcher receives the alert directly on his computer. This alert is generally sent using HTTP protocol and not PUSH notification, since this alert is being sent to a computer device and not a mobile device. This HTTP protocol could also be established to send ZAPWALL live videos in the security and military sector. For example, police, security or military Senders deployed in the field or at a facility could send live video which is to be viewed by a designated Recipient commander in a command center with computers and large scale monitors. Alternatively, the designated Recipient commander might also be in the field or in a vehicle or temporary command post and might view the videos on a mobile device, using PUSH notification.

In the security and military sector, the inventive system provides a unique visual situational awareness because the Recipient is able to view ZAPWALL matrix of multiple real time live videos taken from different viewpoints of a target or facility by members of the Designated Sender Group, and the Recipient is then better able to take action in response to such videos, such as issuing instructions or commands to the Senders. In the security or military context, a Recipient who is a commander with a mobile device or a command center Dispatcher may request a ZAPWALL of simultaneous real time live video streams from mobile devices being utilized by several designated Senders (police or security officers or soldiers) who are deployed at or near a location, to obtain situational awareness of an objective by live video being taken from multiple viewpoints and such Recipient commander or Dispatcher can then direct the ZAPWALL matrix to a designated group of Recipients (who may also be designated Senders) who can also view the multiple live videos, or who may be other commanders or personnel at or near the location, and the Recipient commander or Dispatcher can taken actions on the system in response to the ZAPWALL matrix such as transmitting voice, text or data in real time to the various Senders and Recipients. The use of silent video, text or data may be required in sensitive operations where voice or sound communications would impair mission success.

Figure 12:
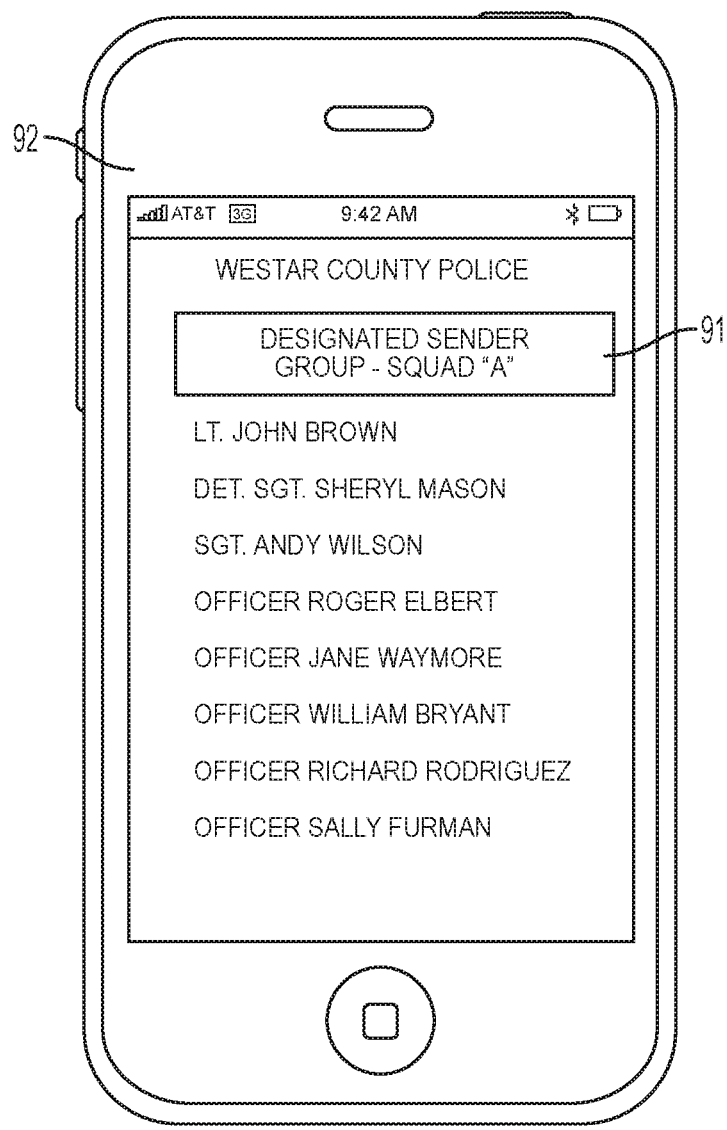
FIG. 12 is an exemplary screen of a Designed Sender Group of a Recipient in the security and military sector.
Figure 13:
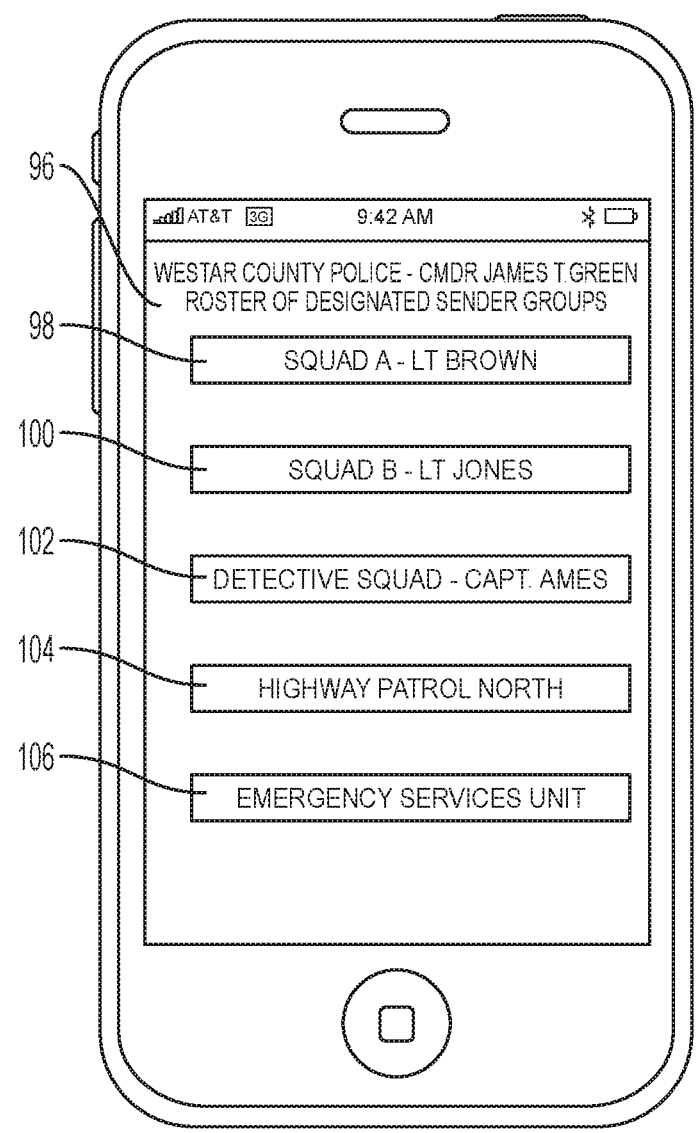
FIG. 13 is an exemplary screen showing a Recipient's roster of Designated Sender Groups, in the security and military sector.
Figure 14:
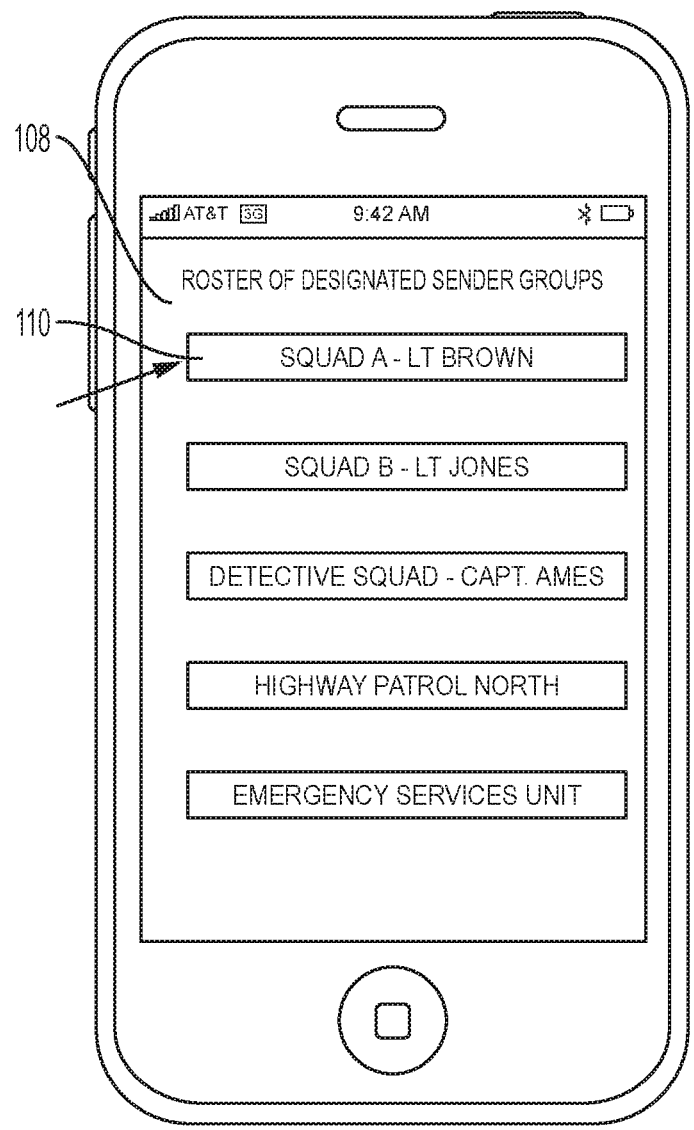
FIG. 14 is an exemplary screen showing Recipient's selection of which Designated Sender Group the Recipient requests upstreams of live real time video, in the security and military sector.
Figure 15:
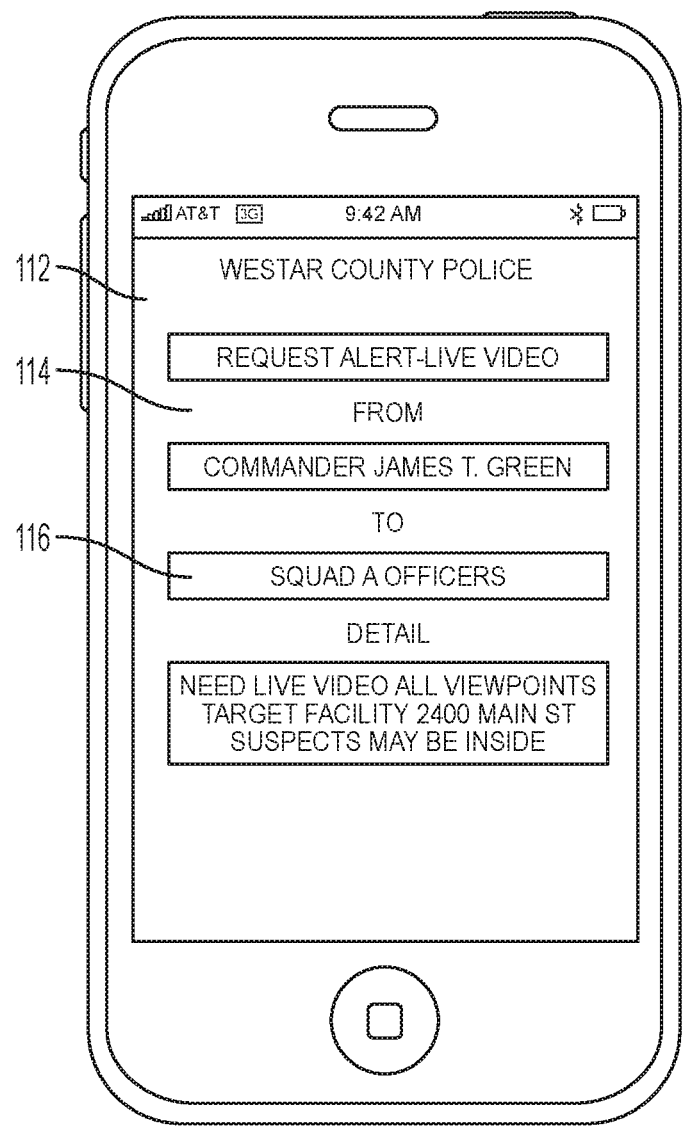
FIG. 15 is an exemplary screen of a member of a Designated Sender Group receiving an alert that a Recipient is requesting live real time video to be upstreamed for access by the Recipient, in the security and military sector.
Figure 16:
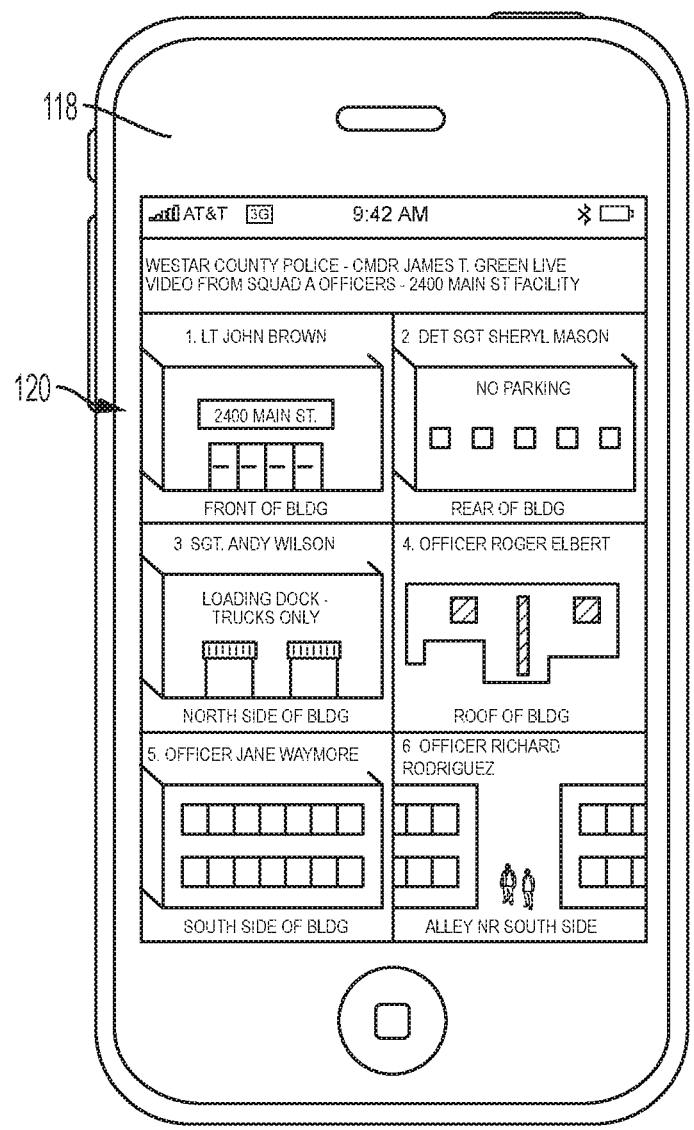
FIG. 16 is an exemplary screen of the Recipient in the security and military sector who sent the request, showing a ZAPWALL matrix of simultaneous, multiple live video streams from the Designated Sender Group.
Figure 17:
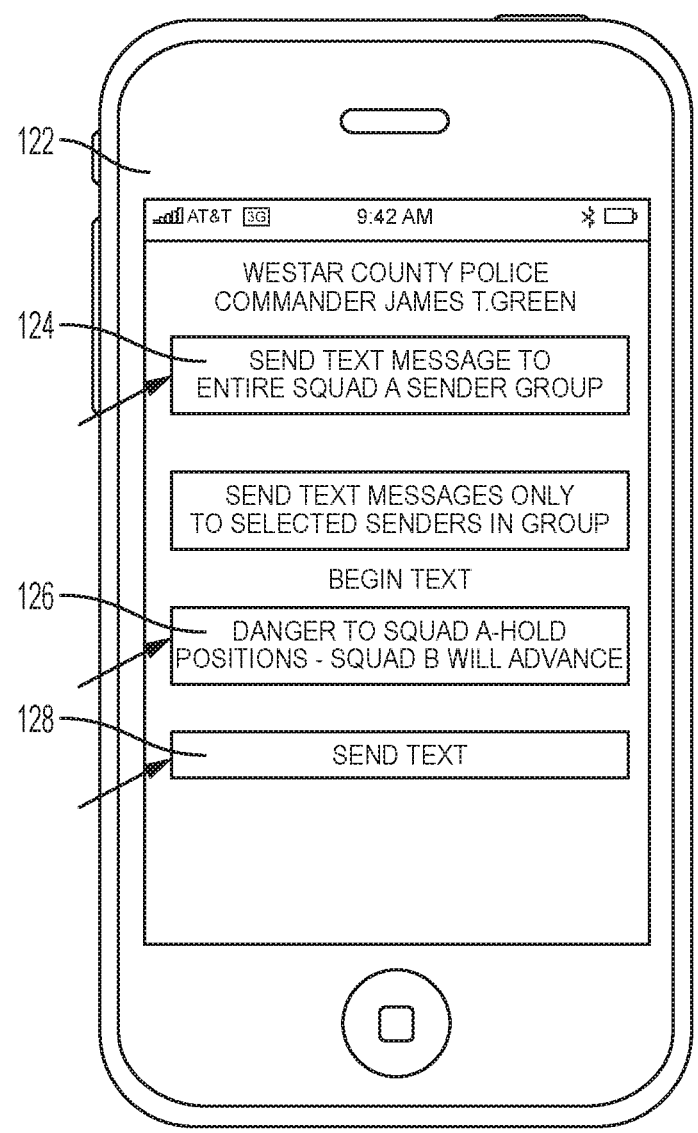
FIG. 17 is an exemplary screen of the Recipient in the security and military sector taking action in response to the ZAPWALL matrix by sending text messages to the Designated Sender Group.
Figure 18:
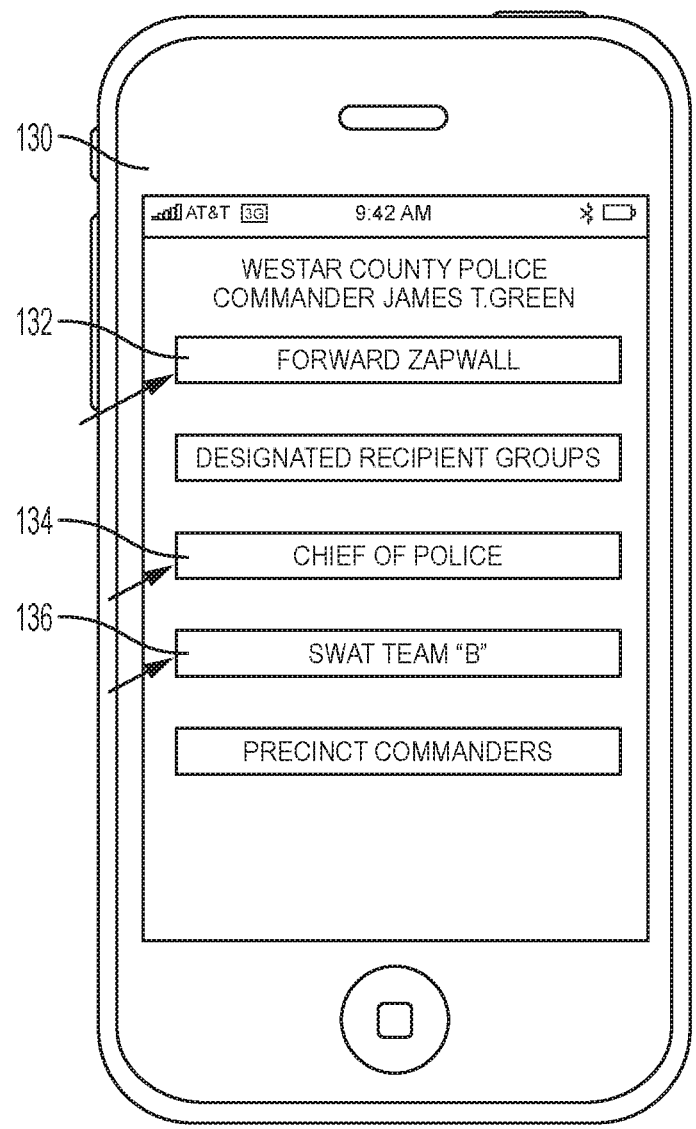
FIG. 18 is an exemplary screen of the Recipient in the security and military sector forwarding the requested ZAPWALL matrix to a Designated Recipient Group.

As an example, a police commander, as Recipient, wants to receive as ZAPWALL of multiple simultaneous live videos being sent by officers deployed outside a facility which is a target or objective, so he can observe activity at the facility from different viewpoints and have a greater situational awareness before making command decisions. FIG. 12 is an exemplary screen 92 of a Designated Sender Group of a Recipient in the security and military sector; in this example, these Senders are the police officers in Squad A, identified using area 94, which is deployed near the facility. FIG. 13 is an exemplary screen 96 showing a Recipient's roster of Designated Sender Groups in the security and military sector; in this example, the Recipient commander has several police units 98; 100, 102, 104 and 106 that he can request video and other information to be sent to him. The Recipient can establish several different Designated Sender Groups, and then select the members of each of the Designated Sender Groups. FIG. 14 is an exemplary screen 108 showing Recipient's selection of Designated Sender Group Squad A at 110, which the Recipient requests upstreams of live real time video, in the security and military sector. In this example, the Recipient commander requests video from the Designated Sender Group which is the unit deployed near the facility. FIG. 15 is an exemplary screen 112 of a member of a Designated Sender Group receiving an alert in box 114 that a Recipient commander is requesting live real time video to be upstreamed for access by the Recipient, in the security and military sector. In this example, the Sender in box 116 is a police officer in the unit which is deployed near the facility. FIG. 16 is an exemplary screen 118 of the Recipient commander in the security and military sector who initiated the request, showing a ZAPWALL matrix 120 of simultaneous, multiple live video streams from various Senders in the Designated Sender Group, that is, the police officers in the unit deployed near the facility. FIG. 17 is an exemplary screen 122 of the Recipient in the security and military sector for taking action in response to the ZAPWALL matrix by sending text messages to the Designated Sender Group. In this example, the Recipient commander obtains situational awareness from the multiple live videos, observes that there is danger facing A Team and uses boxes 124, 126, and 128 to text to the entire Designated Sender Group that A Team hold back and B Team proceed to advance. This process must be silent (video and text), as a voice communication might tip off the perpetrators in the facility. FIG. 18 is an exemplary screen 130 of the Recipient in the security and military sector using boxes 132, 134 and 136 forwarding the requested ZAP- WALL matrix to a Designated Recipient Group of other senior commanders in the police organization who may be in different offices elsewhere in the city—so that they can obtain situational awareness of the facility.

In the personal and commercial sector, the inventive system provides a unique visual comparative and competitive awareness because the Recipient is able to view the ZAPWALL matrix of multiple real time live videos taken by different retail and commercial Senders with venues, products or services of interest to the Recipient and/or by other consumers who are at the venues or other retail or commercial locations, and are better able to take action in response such as conducting electronic commerce, making reservations or appointments, or texting or calling with questions about price and other competitive factors. The Recipient may request the ZAPWALL of multiple live videos from a Designated Sender Group, or from Senders identified by codes, tags, names, or other identifiers, or by a text search of available live videos relevant to the request, by name, subject matter, topic, location or other words. The Recipient make take such actions with respect to all of the videos included in the ZAPWALL matrix simultaneously, or may select one or more videos within the ZAPWALL and communicate such actions only to the selected Senders. The Recipient may also forward the ZAPWALL matrix—either in its entirety or only as to one or more selected videos—to a Designated Recipient Group such as friends, family or other consumers, to get more input as to the venue, products or services of the Senders of the real time live video.

Figure 19:
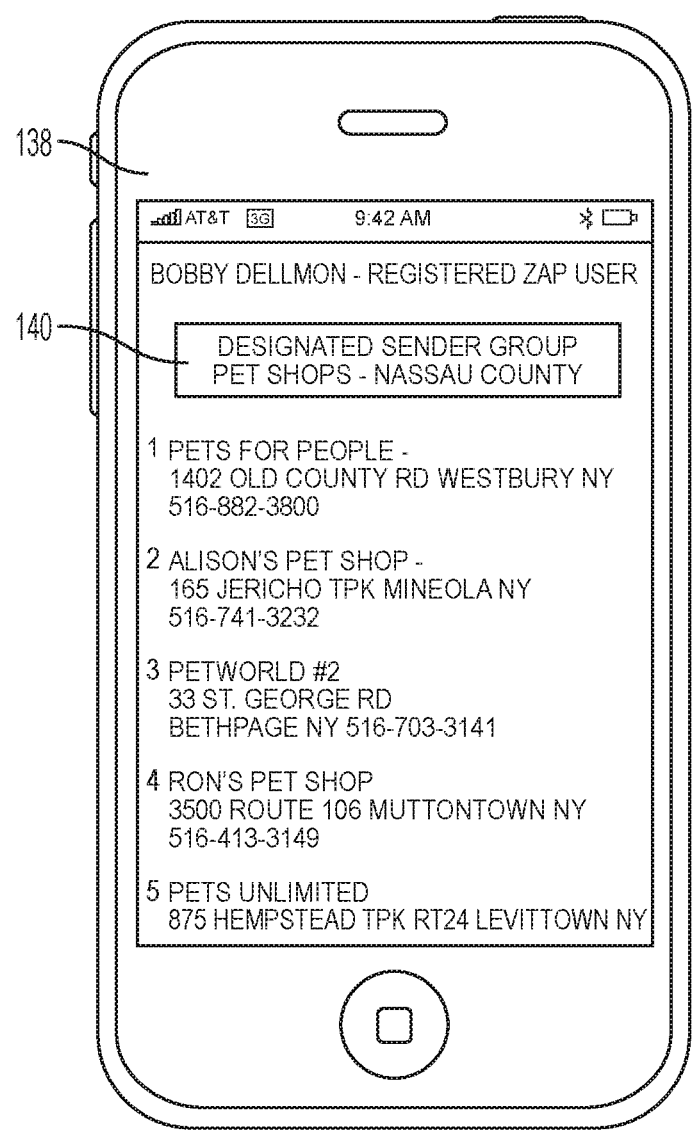
FIG. 19 is an exemplary screen of a Designed Sender Group of a Recipient in the personal and commercial sectors.
Figure 20:
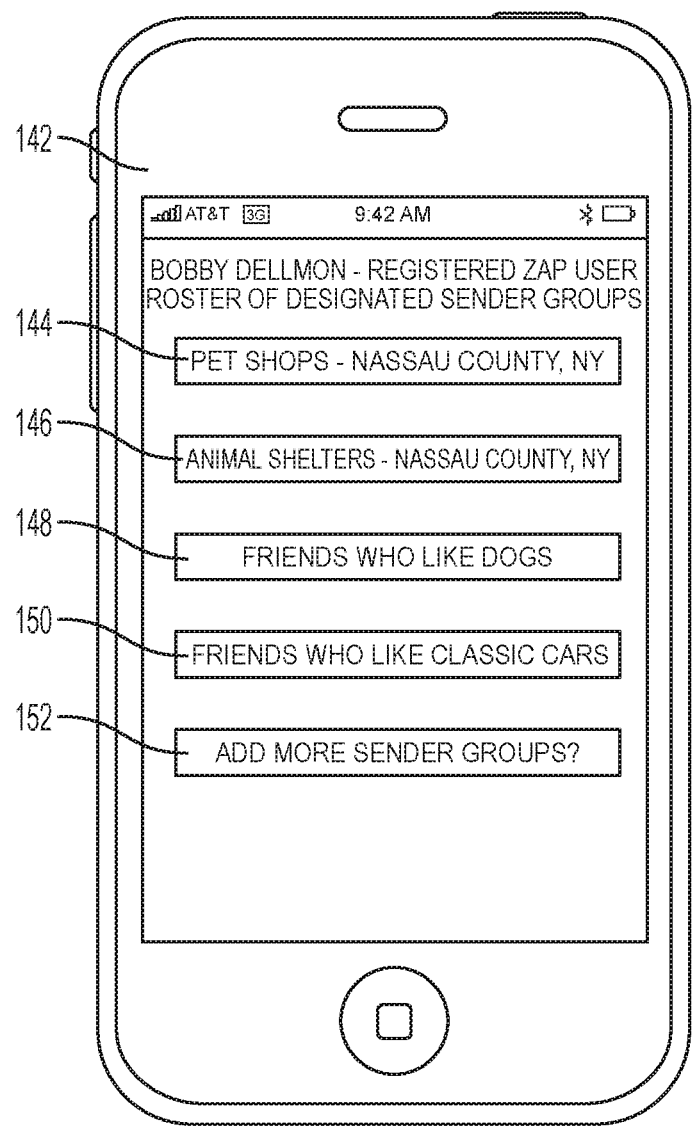
FIG. 20 is an exemplary screen showing a Recipient's roster of Designated Sender Groups, in the personal and commercial sectors.
Figure 21:
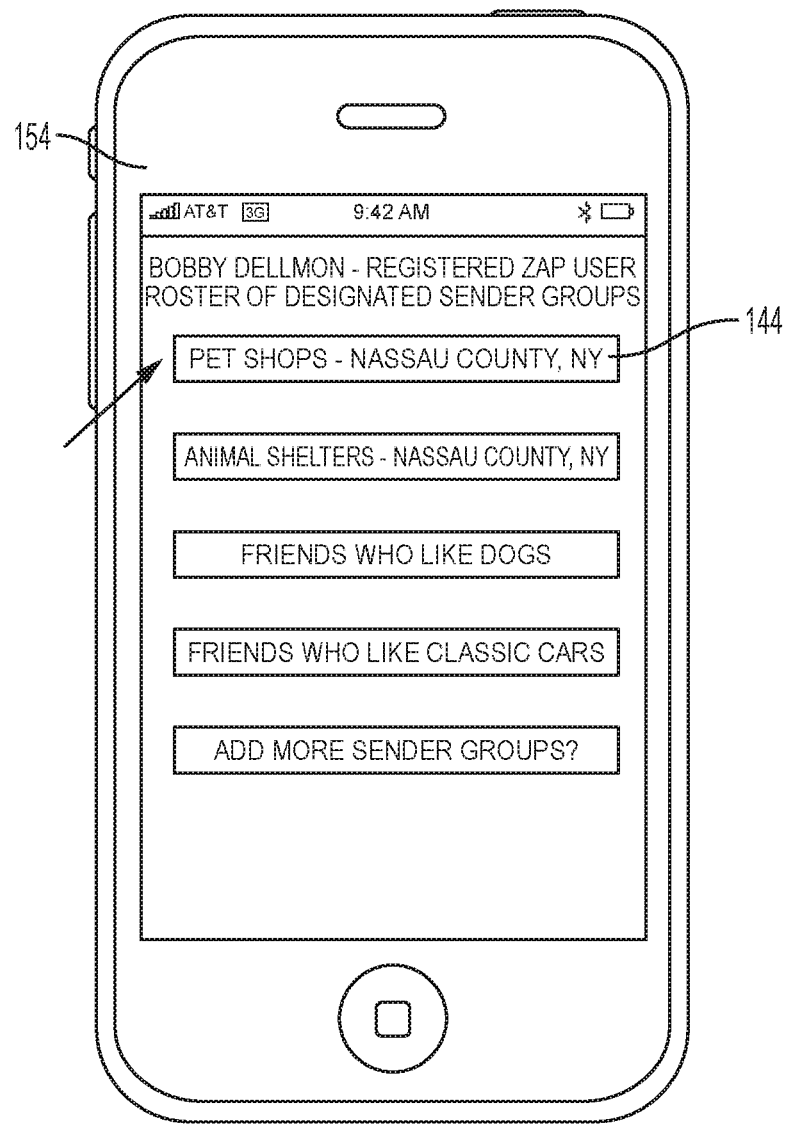
FIG. 21 is an exemplary screen showing Recipient's selection of which Designated Sender Group the Recipient requests upstreams of live real time video, in the personal and commercial sectors.
Figure 22:
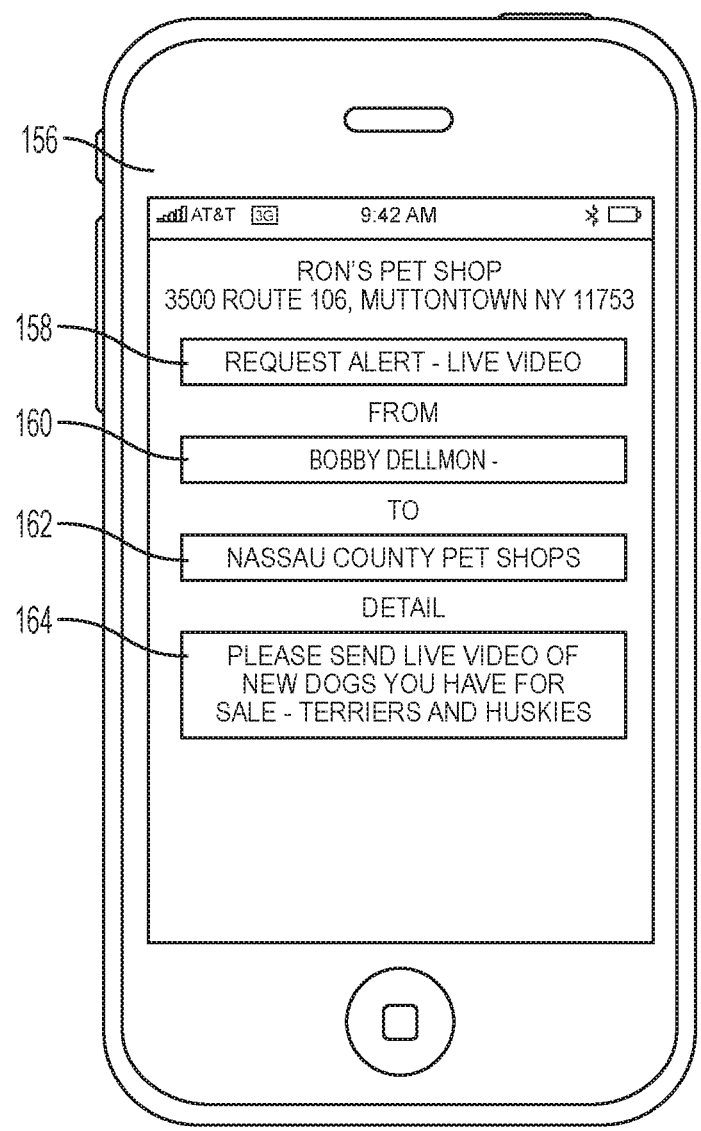
FIG. 22 is an exemplary screen of a member of a Designated Sender Group receiving an alert that a Recipient is requesting live real time video to be upstreamed for access by the Recipient, in the personal and commercial sectors.
Figure 23:
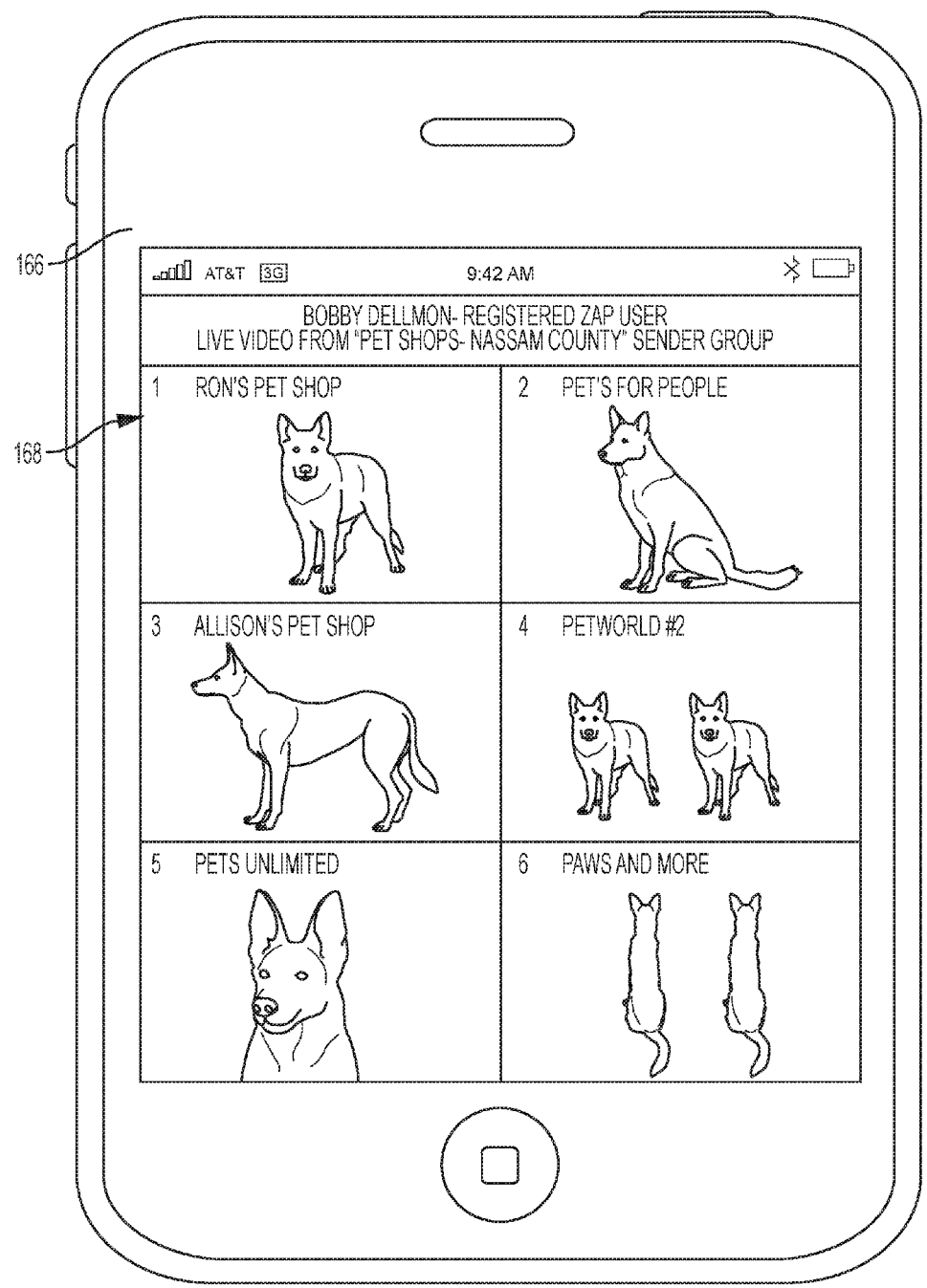
FIG. 23 is an exemplary screen of the Recipient in the personal and commercial sector who sent the request, showing a ZAPWALL matrix of simultaneous, multiple live video streams from the Designated Sender Group.
Figure 24:
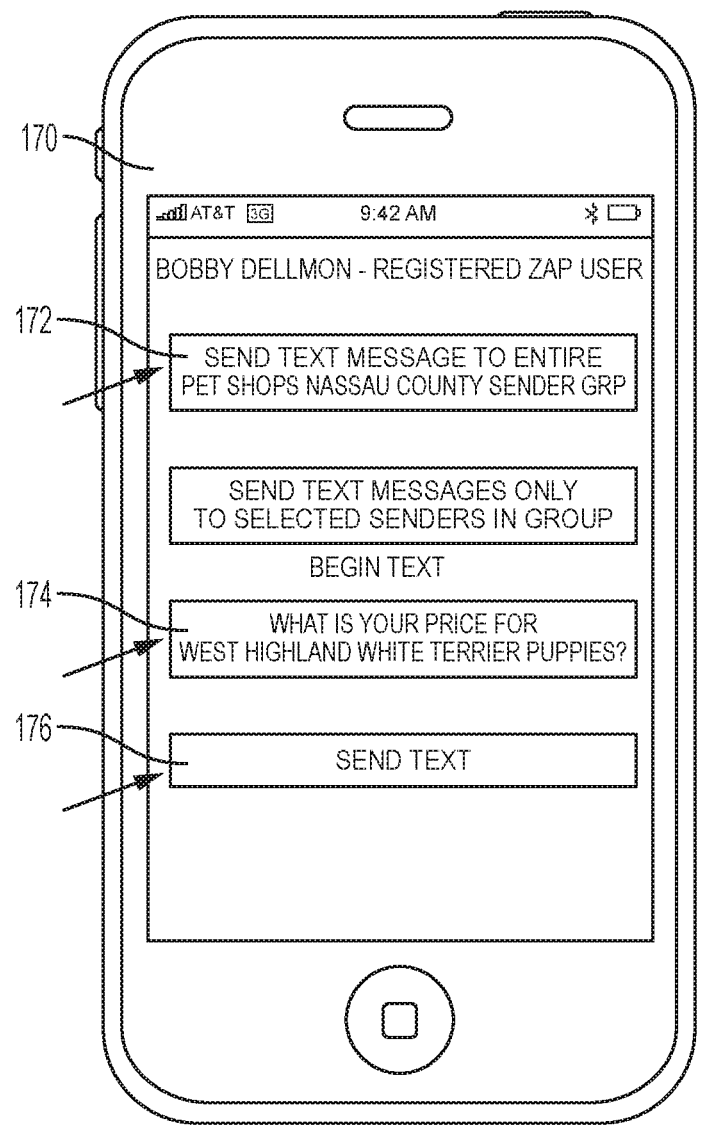
FIG. 24 is an exemplary screen of the Recipient in the personal and commercial sector taking action in response to the ZAPWALL matrix by sending text messages to the Designated Sender Group.

As an example in the personal and commercial sector, an individual user registered with ZAPAPP, is interested in viewing live videos of new dogs who are available for purchase at local pet shops. This user has been looking for new dogs for a while, and has set up a Designated Sender Group of local pet shops. The user has also set up another Designated Sender Group of local animal shelters who have rescued dogs available for adoption. FIG. 19 is an exemplary screen 138 of a Designed Sender Group of a Recipient in the personal and commercial sectors. In this example, the Senders identified in box 140 are local pet shops which have puppies and dogs available for purchase and transmit live videos to potential customers. FIG. 20 is an exemplary screen 142 showing a Recipient's roster of Designated Sender Groups in boxes 144, 146, 148, 150 and 152, in the personal and commercial sector. In this example, the Recipient has, for example, a Designated Sender Group of local pet shops 144; a Designated Sender Group of local animal shelters 146; and a Designated Recipient Group of friends who also like dogs 148. The Recipient can establish several different Designated Sender Groups, and then select the members of each of the Designated Sender Groups. The Recipient may also establish several different Designated Recipient Groups to forward ZAPWALL videos, and then select the members of each of the Designated Recipient Groups. FIG. 21 is an exemplary screen 154 showing Recipient's selection of which Designated Sender Group the Recipient requests upstreams of live real time video, in the personal and commercial sectors; in this example, the Recipient has selected the local pet shops Designated Recipient Group 144. FIG. 22 is an exemplary screen 156 of a member of a Designated Sender Group receiving an alert that a Recipient is requesting live real time video to be upstreamed for access by the Recipient, in the personal and commercial sectors. In this example, a particular pet shop is alerted, in boxes 158, 160, 162 and 164, that the Recipient would like to receive live videos of new dogs at the pet shop. FIG. 23 is an exemplary screen 166 of the Recipient in the personal and commercial sector who sent the request, showing a ZAPWALL matrix 168 of simultaneous, multiple live video streams from the Designated Sender Group. In this example, the Recipient is simultaneously viewing a ZAPWALL matrix 168 of real time live videos sent by six local pet shops of new dogs available for purchase. FIG. 24 is an exemplary screen 170 of the Recipient in the personal and commercial sector taking action in response to the ZAPWALL matrix by sending text messages to the Designated Sender Group. In this example, the Recipient uses boxes 172, 174 and 176 to send a text simultaneously to all six Senders in the Designated Sender Group, asking, "What is your price for West Highland White Terrier puppies?" The Recipient will receive a text response for each of the Senders in the Designated Sender Group. With the ZAPWALL matrix of real time live videos of new dogs from six Senders in the Designated Sender Group, plus the response from all six Senders as to their prices, the Recipient has a much greater comparative and competitive awareness of the dogs available from local pet shops.

Figure 25:
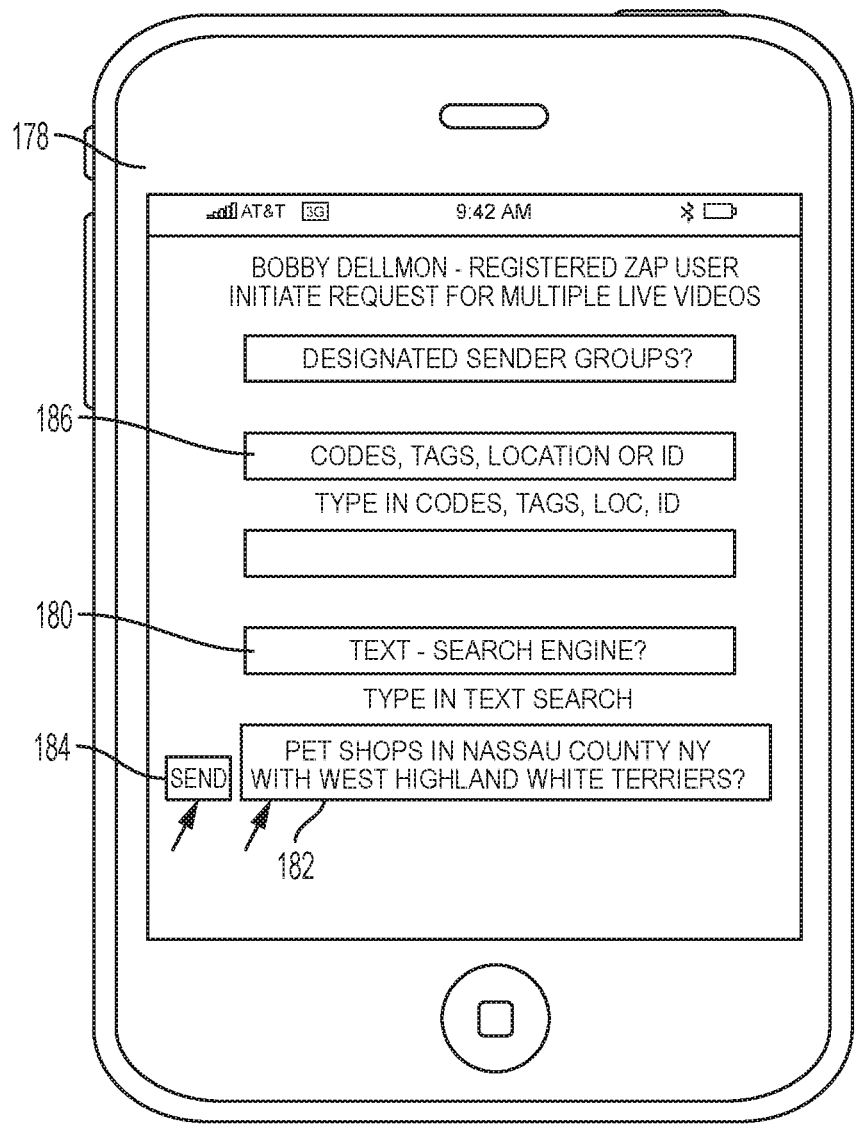
FIG. 25 is an exemplary screen showing a Recipient initiating a search for real time live video by a topical text search, in the personal and commercial sectors
Figure 26:
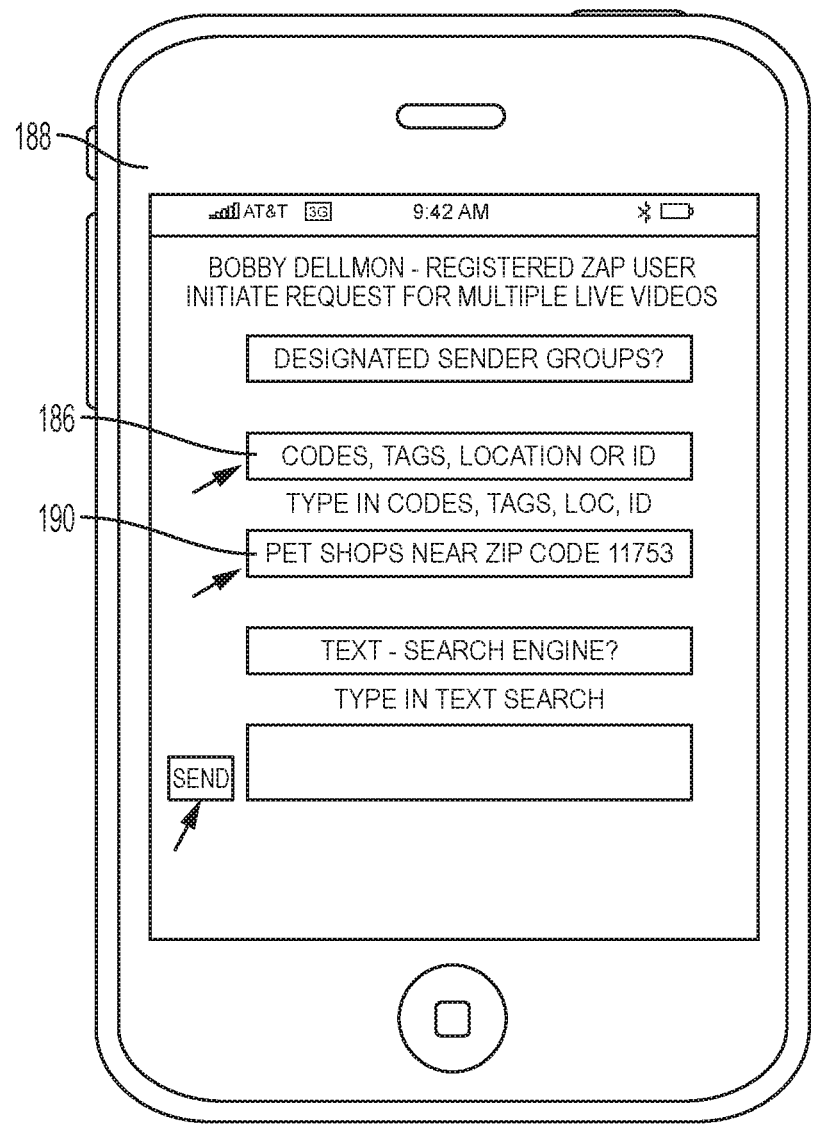
FIG. 26 is an exemplary screen showing a Recipient initiating a search for real time live video by a code or tag, in the personal and commercial sectors.

The inventive system enables additional features which further enhance the competitive and comparative awareness available to Recipients as well as convenience in utilizing the system. Continuing in the example above in the personal and commercial sector, suppose the Recipient does not yet have available the identity of local pet shops or has not set up a Designated Sender Group of local pet shops. The Recipient can instead initiate a request for a ZAPWALL matrix of real time live videos from local pet shops by implementing a topical text search, such as "Pet Shops in Nassau County" or even more precisely, "Pet Shops in Nassau County with West Highland White Terriers" FIG. 25 is an exemplary screen 178 showing a Recipient initiating a search for real time live video by a topical text search, in the personal and commercial sectors. In this example, the Recipient has requested real time live videos from Senders who are "Pet Shops in Nassau County" using boxes 180, 182 and 184. Alternatively, the Recipient could initiate a request for a ZAPWALL matrix of real time live videos utilizing a code, tag, location, building or room number or other identifier in box 186. FIG. 26 is an exemplary screen 188 showing a Recipient initiating a search for real time live video by a code or tag using box 186, in the personal and commercial sectors. In this example, the Recipient has requested real time live videos from Senders who are "Pet Shops Near Zip Code 11753" using box 190.

Figure 27A:
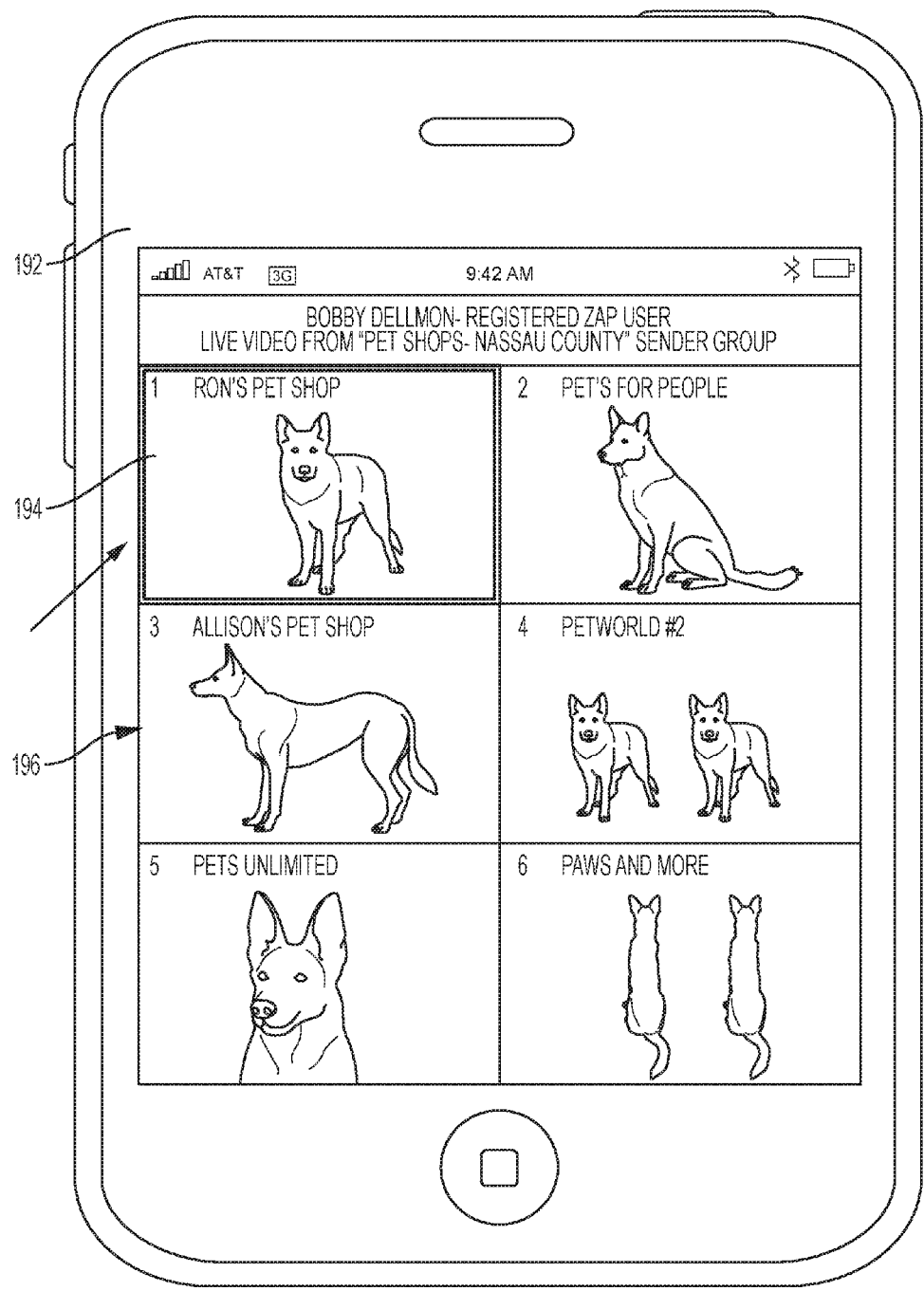
FIG. 27A is an exemplary screen of the Recipient in the personal and commercial sector selecting one of the multiple live real time videos in the ZAPWALL matrix for enlargement on the screen and to enable taking action in response to that particular video.
Figure 27B:
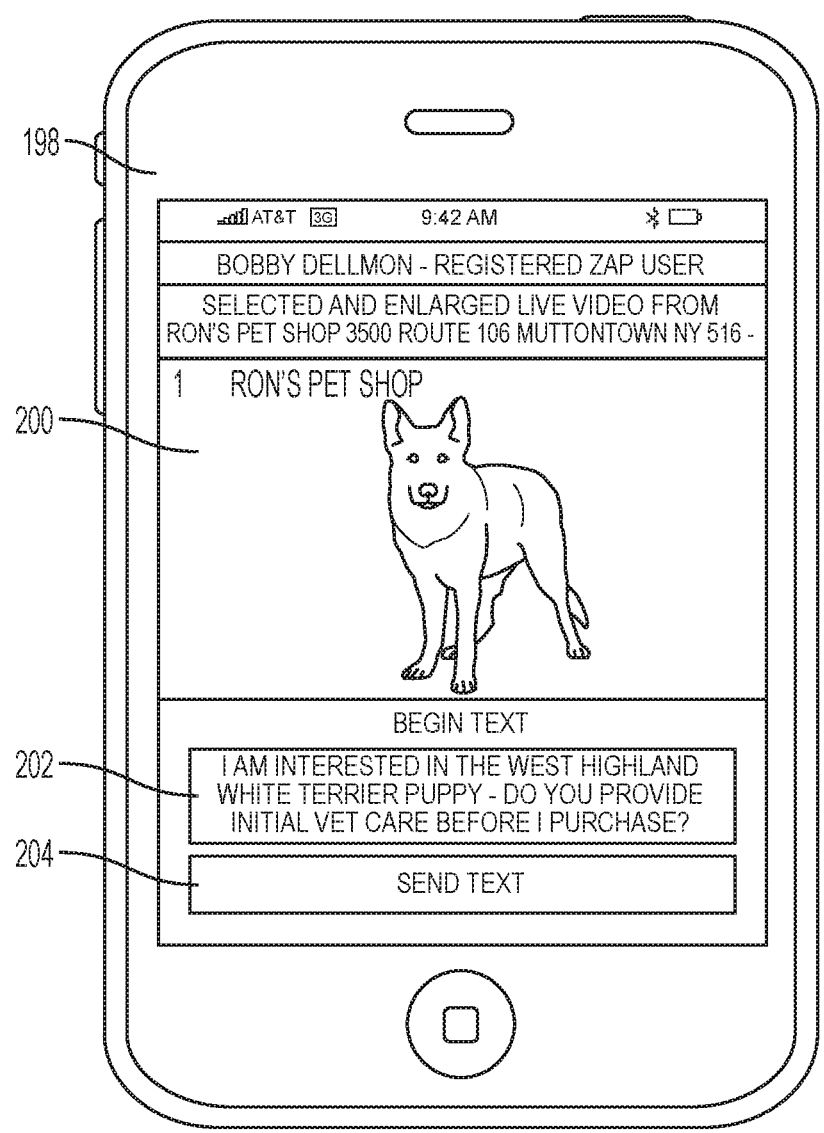
FIG. 27B is an exemplary screen of the Recipient in the personal and commercial sector viewing the selected and enlarged live real time video and taking action in response to that particular video.

The inventive system enables the Recipient of a ZAPWALL matrix of multiple real time live video streams to view and take actions in response to the entire ZAPWALL matrix, or to select one or more of the real time live videos within the ZAPWALL matrix for enlarged viewing and/or to take actions in response to those selected videos only. FIG. 27A is an exemplary screen 192 of the Recipient in the personal and commercial sector selecting one, 194, of the multiple live real time videos in the ZAPWALL matrix 196 for enlargement on the screen and to enable taking action in response to that particular video. FIG. 27B is an exemplary screen 198 of the Recipient in the personal and commercial sector viewing the selected and enlarged live real time video and taking action in response to that particular video. In this example, the Recipient has selected one of the videos from Senders who are local pet shops for an enlarged view 200 and to send a text, "I am interested in the West Highland White Terrier puppy, do you provide initial veterinary care before I purchase?" using boxes 202 and 204.

Figure 28:
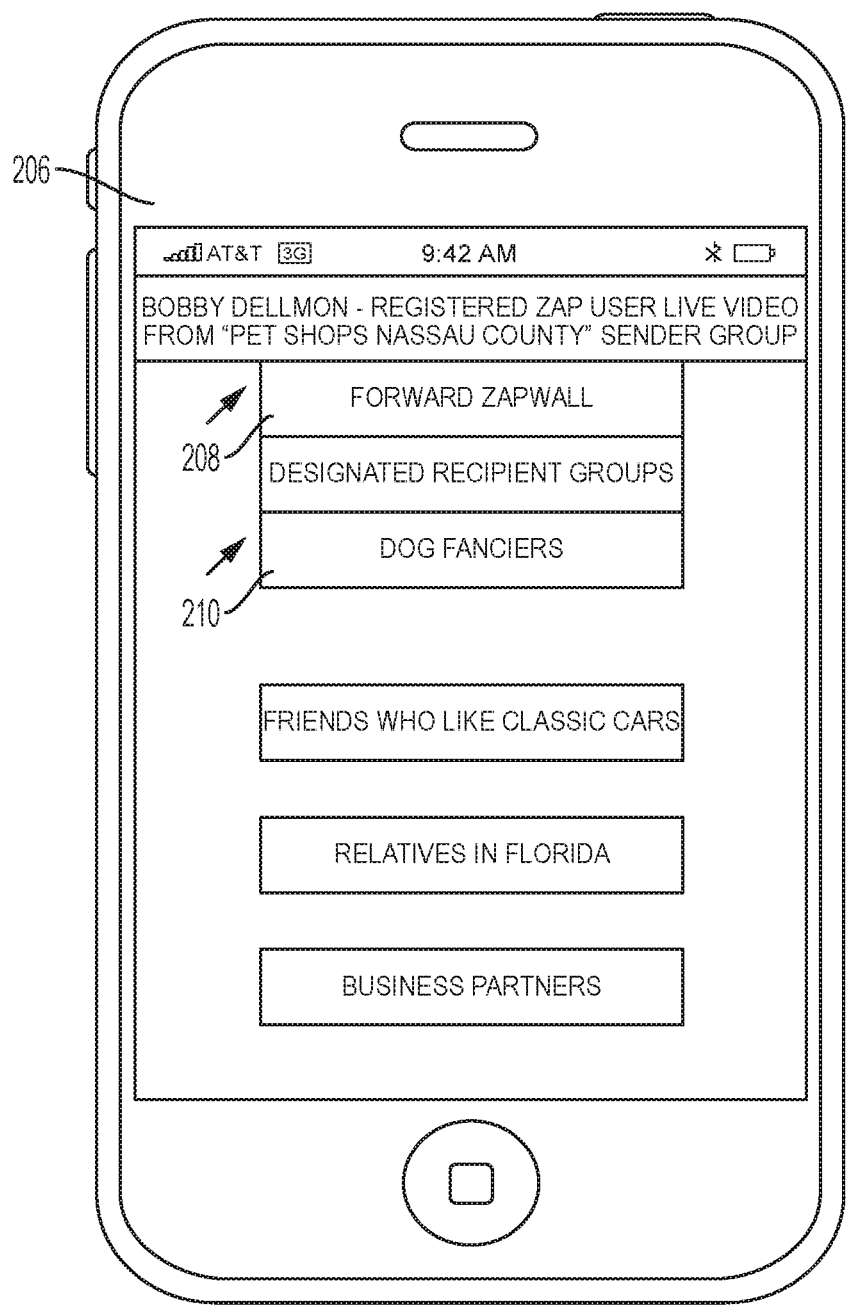
FIG. 28 is an exemplary screen of a Recipient in the personal and commercial sector forwarding the requested ZAPWALL matrix to a Designated Recipient Group.

A Recipient who has received a ZAPWALL matrix of multiple live video streams can further enhance comparative and competitive awareness by forwarding the entire ZAP-WALL matrix of live videos, or forwarding one or more of the live videos selected from the ZAPWALL matrix, to a Designated Recipient Group to obtain their comments and feedback. FIG. 28 is an exemplary screen 206 of the Recipient in the personal and commercial sector forwarding the requested ZAPWALL matrix to a Designated Recipient Group. In this example, the Recipient who had received a ZAPWALL matrix of multiple live videos from six local pet stores is forwarding the matrix to the Recipient's "Dog Fancier Friends Designated Recipient Group" to get their opinions on the dogs being offered by the six local pet stores using boxes 208 and 210.

Figure 29:
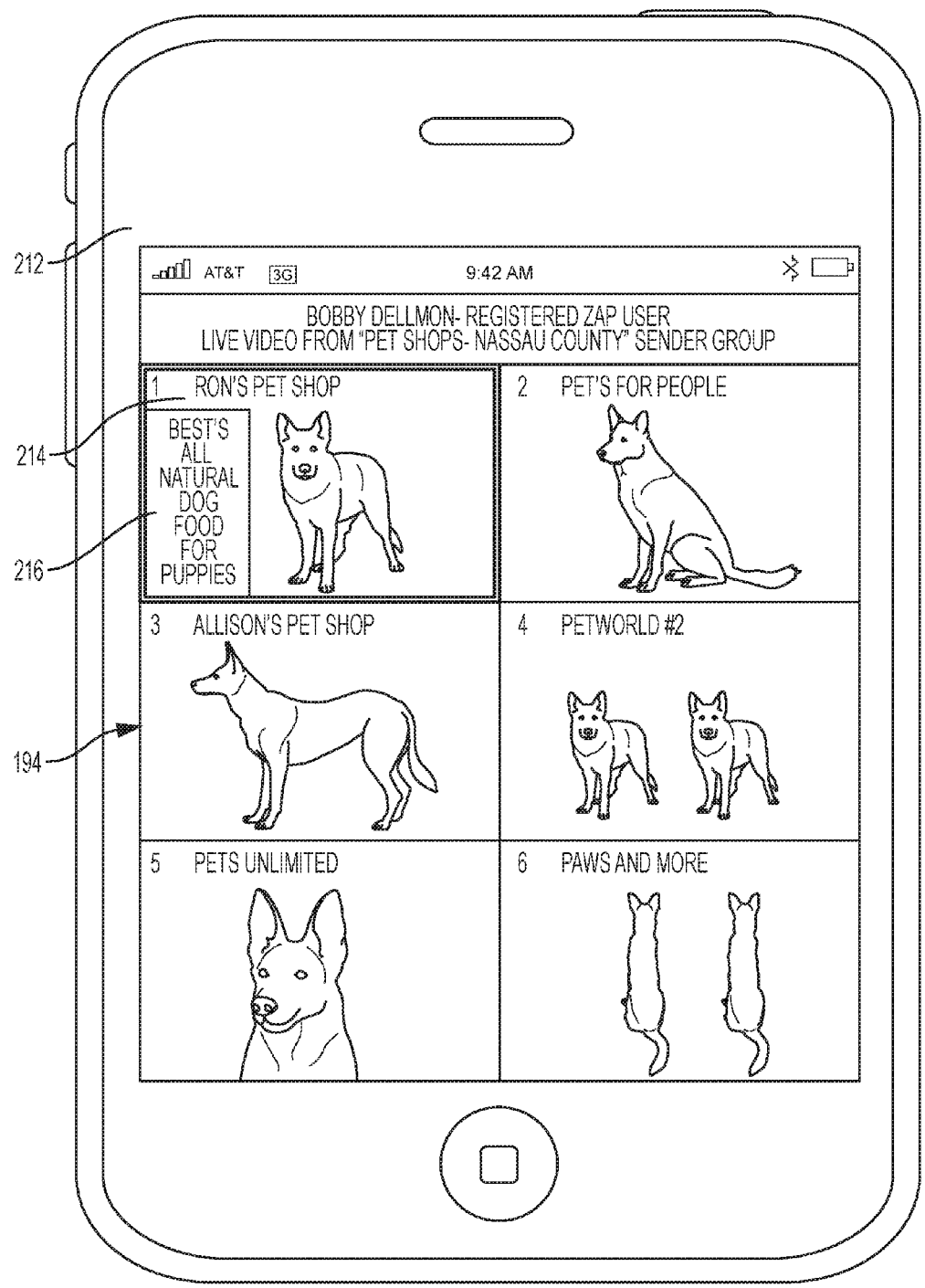
FIG. 29 is an exemplary screen of the Recipient in the personal and commercial sector, who sent a request, showing a ZAPWALL matrix of simultaneous, multiple live video streams, into which third party advertising (not associated with the Senders) has been inserted into one of the locations in the matrix.
Figure 30:
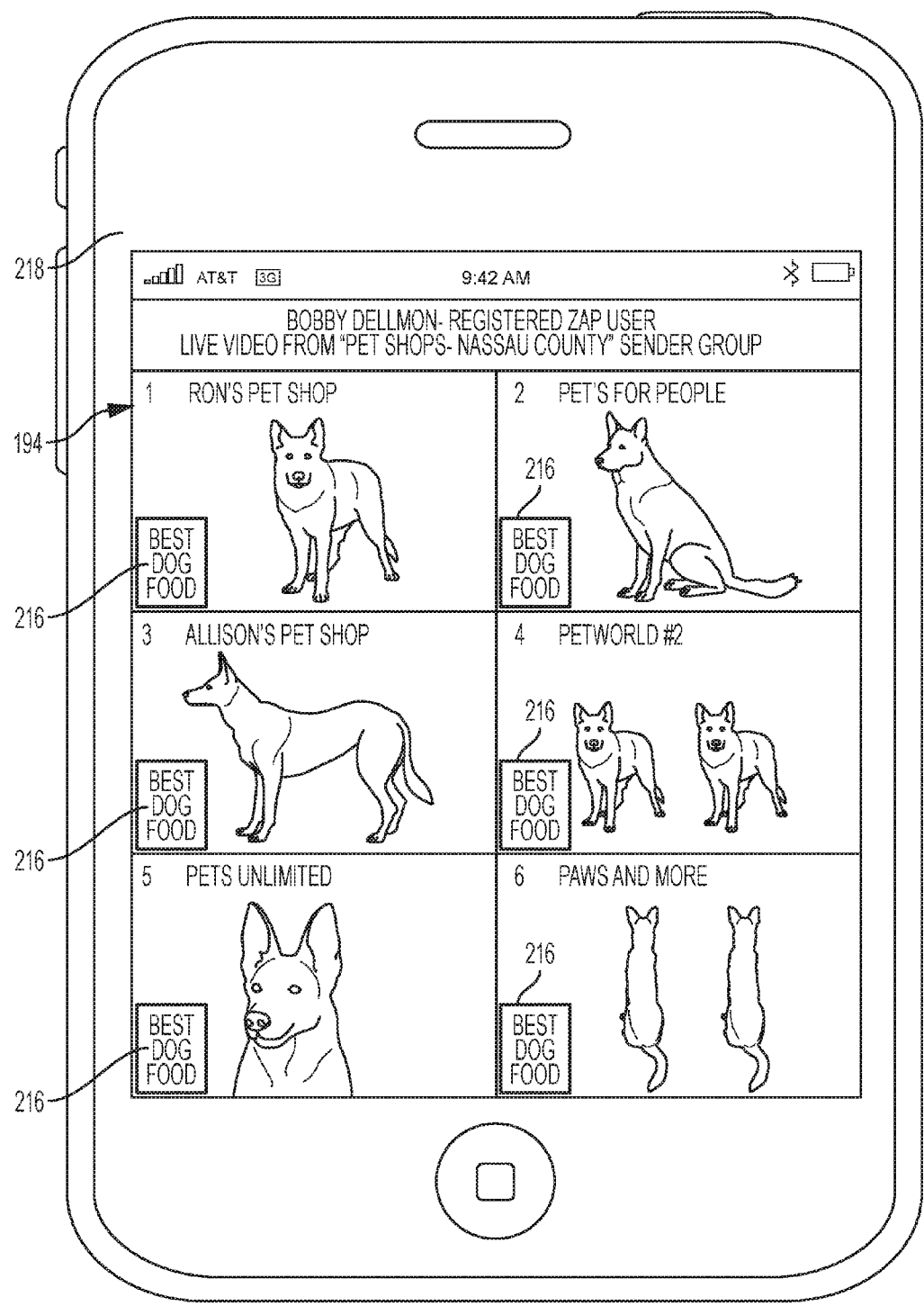
FIG. 30 is an exemplary screen of the Recipient in the personal and commercial sector, who sent a request, showing a ZAPWALL matrix of simultaneous, multiple live video streams, in which third party advertising (not associated with the Senders) has been inserted into each of the video locations in the matrix.

The inventive system also serves as an advertising and marketing medium, since third party advertising (not associated with Senders or Recipients) can be inserted into all of the live real time videos in the ZAPWALL matrix or one or more of the live real time videos in the ZAPWALL matrix. The inventive system enables the third party advertising and marketing, or other third party information, to be based on the subject matter of the live real time videos requested by the Recipient, and/or the classification of the Recipient or the Senders of the live real time videos. For example, the third party advertising or other third party information may be based on one or more of the log in, search criteria and geographic location of the Recipients or Senders or other data relating to the real time live videos streams. FIG. 29 is an exemplary screen 212 of the Recipient in the personal and commercial sector, who sent a request, showing the ZAPWALL matrix 194 of simultaneous, multiple live video streams, into which third party advertising (not associated with the Senders) has been inserted into one of the locations in the matrix. In this example, the Recipient has requested and obtained the ZAPWALL matrix 194 of live real time videos of dogs available at six local pet stores, and the ZAP SYSTEM has inserted into one of the live real time videos 214 in the ZAPWALL matrix an advertisement 216 for "Best's All Natural Dog Food for Puppies". The ZAP SYSTEM has automatically selected only one of the videos for placement of the advertisement because that video is being sent from a zip code which the advertiser can supply the product. FIG. 30 is an exemplary screen 218 of the Recipient in the personal and commercial sector, who sent a request, showing the ZAPWALL matrix 194 of simultaneous, multiple live video streams, in which third party advertising 216 (not associated with the Senders) has been inserted into each of the video locations in the matrix. In this example, the Recipient has requested and obtained the ZAPWALL matrix 194 of live real time videos of dogs available at six local pet stores, and the ZAP SYSTEM has inserted into all six of the live real time videos in the ZAPWALL matrix an advertisement 216 for "Best's All Natural Dog Food for Puppies". The ZAP SYSTEM has automatically selected all of the videos for placement of the advertisement because the advertiser can supply the product in all of the zip codes of the Senders.

In the foregoing figures and examples, a Recipient initiated the creation of a ZAPWALL matrix viewable by the Recipient, by requesting live videos from various Senders, retrieved from a Designated Sender Group of the Recipient; or by codes, tags or other identifiers designated by the Recipient, or by a text search of available real time videos by topic, subject, location or other words in which event the ZAP SERVER will utilize a search engine to poll the database for relevant Upstreamed live videos. In addition, the inventive system enables SENDERS to initiate the process by making available their real time live videos for viewing by Recipients—which may be Recipients in a Designated Recipient Group of the Sender; or by codes, tags or other identifiers designated by the Sender, or by attachment of text to the real time videos of the Senders, by topic, subject, location or other words, so that the Sender's video will be retrieved by the search engine utilized by the ZAP SERVER. Alternatively, the Senders can make available their real time videos to the general public of ZAPAPP users. The SENDERs may be commercial, governmental, or professional, who can upstream videos to the server, accessible by pre-selected groups or the general public, who are Recipients requesting ZAPWALLs of simultaneous real time live videos relevant to the location, product or service of the Sender, as a form of alerting, advertising, marketing and publicity for the Sender. In the commercial example above, an automobile dealer or pet shop as Senders may upstream live videos of activity at their location so that Recipients requesting ZAPWALLS of automobile dealers or pet shops, as applicable, in their geographic area will access the Senders' videos (along with other relevant Senders as well) on the ZAPWALL and then take actions on the system such as communicating with such retailer Senders, making an appointment, requesting quotes or prices, placing an order, or transmitting voice, text or data in real time to such Senders (and other Senders) to get more comparative information. In all of these examples, the Recipients accessing the ZAPWALL of multiple real time live video streams can send the same communication (voice, text, data) to the multiple Senders simultaneously (such as requesting a price quote) and continue to view the video display and responses to the communication in real time. Alternatively, in all of these examples, the Recipients can select from the ZAPWALL matrix of multiple videos, one or more of the Sender videos to view individually and take responses to such selected Sender videos.

Figure 31:
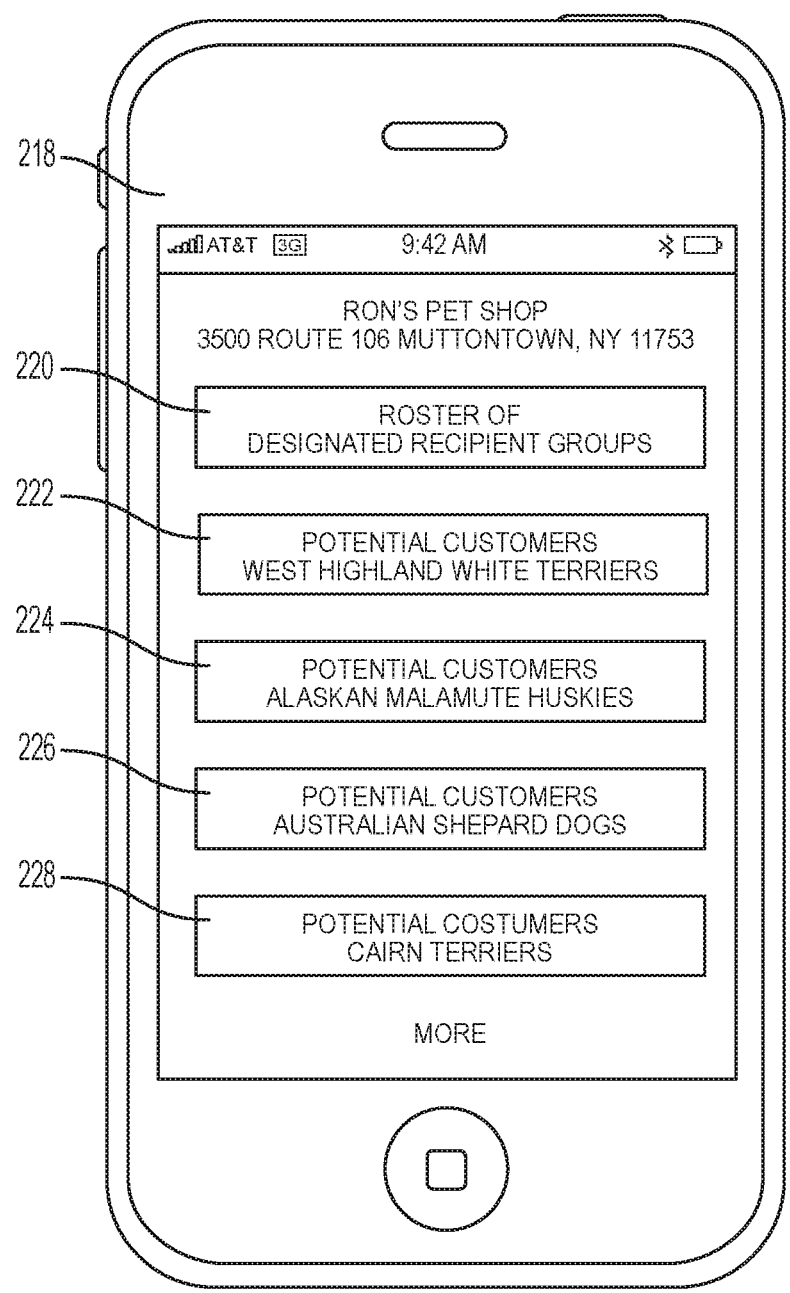
FIG. 31 is an exemplary screen showing a Sender's roster of Designated Recipient Groups in the personal and commercial sector
Figure 32:
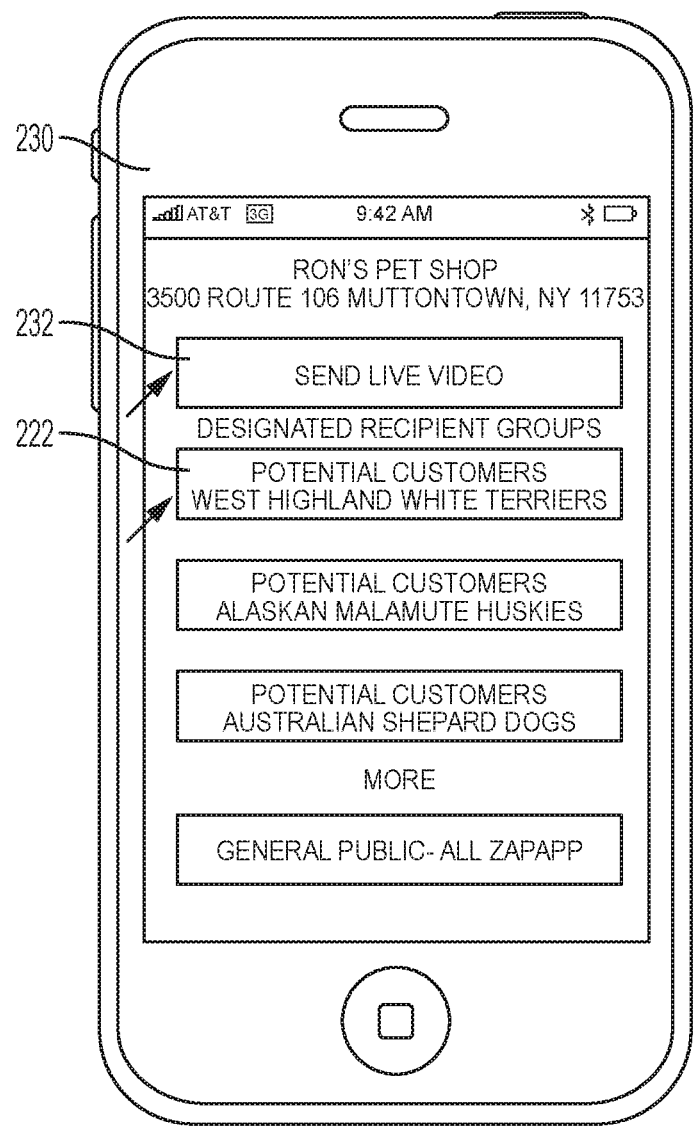
FIG. 32 is an exemplary screen showing Sender's selection of which Designated Recipient Group—or the general public having the ZAPAPP—may have access to a particular Upstream, in the personal and commercial sector
Figure 33A:
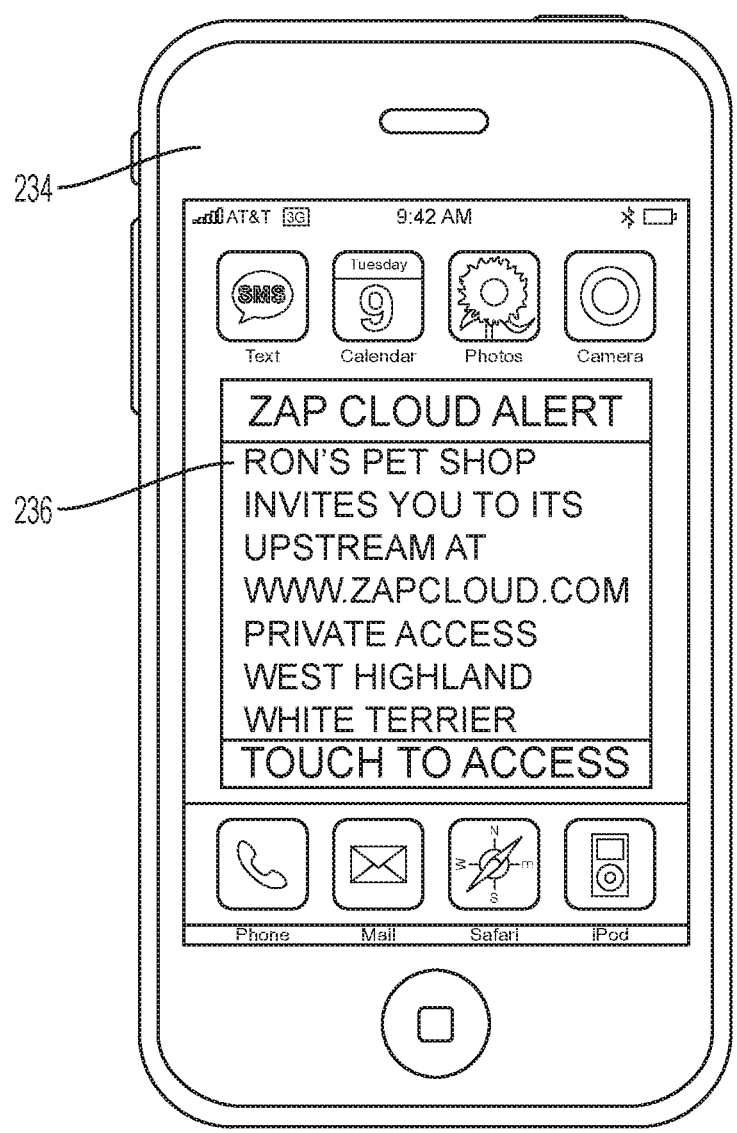
FIG. 33A is an exemplary screen showing a member of a Designated Recipient Group receiving an alert that a Sender is inviting them to access the ZAPCLOUD™ WEBSITE, in the personal and commercial sector, and view live real time videos Upstreamed by the Sender.
Figure 33B:
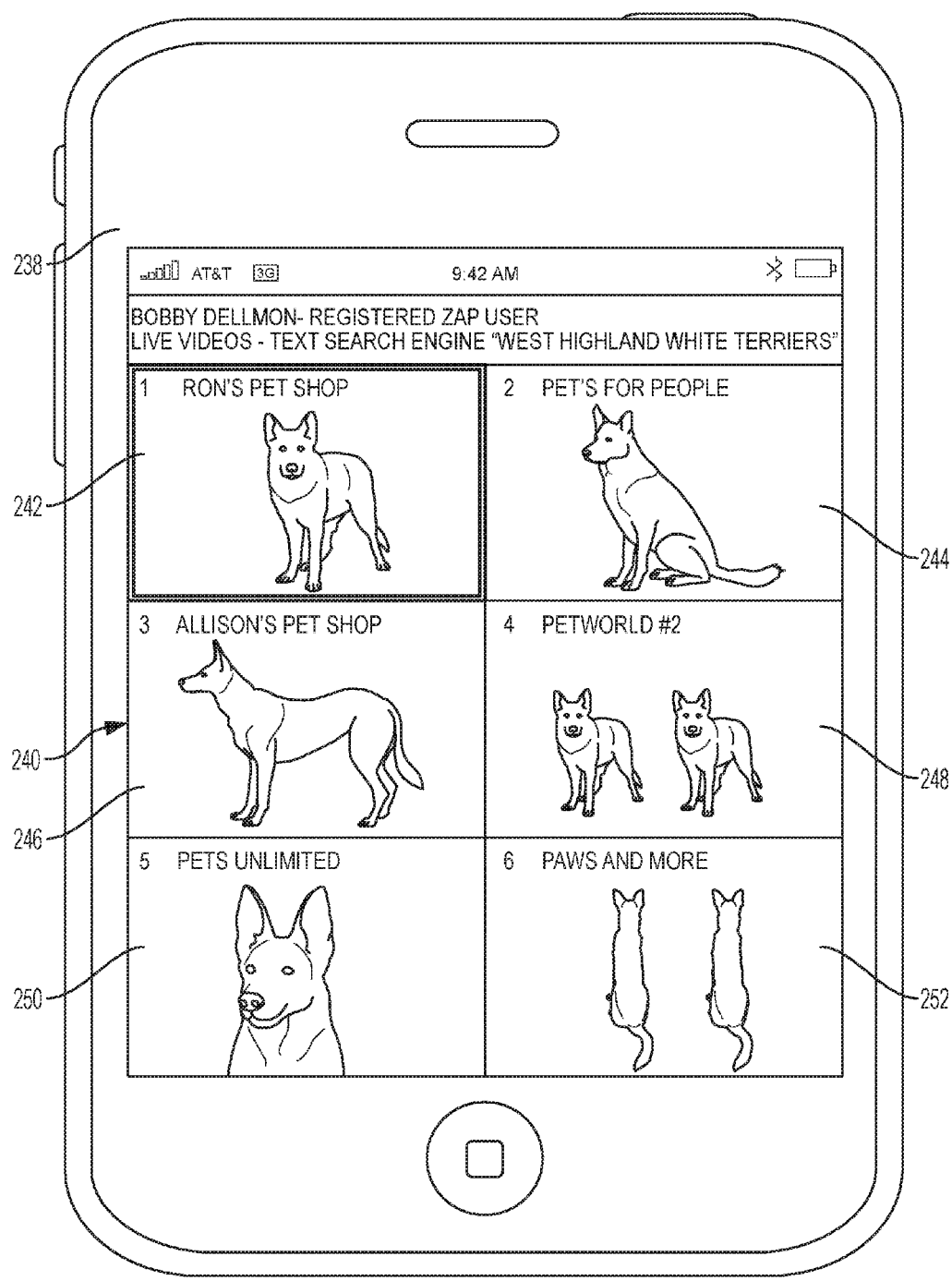
FIG. 33B is an exemplary screen of such member of the Designated Recipient Group showing a ZAPWALL matrix including the real time video Upstreamed by the Sender as well as other relevant real time live videos Upstreamed by other Senders.

The inventive system enables precision designation by Senders of real time live video of particular Recipients or designated groups of Recipients or Recipients identified by geographic area, type of facility or venue, type of Recipient, or even coded locations within facilities or venues, or any other codes or identifiers or a general text based search of Recipients. For example, police or military personnel deployed in the field might initiate sending real time live video to specific Recipient Dispatchers or commanders. Entertainment venue operators may send real time live video from their venues to designated Recipient groups of prior patrons or visitors or others who have signed up to receive such videos. A pet store owner may send real time live videos of new pet arrivals accessible to all Recipients within designated zip codes or counties and who match a text search for "seeking terrier puppies". FIG. 31 is an exemplary screen 218 showing in box 220 the selection of a Sender's roster of Designated Recipient Groups in the personal and commercial sector. In this example, a pet shop has several Designated Recipient Groups, of potential customers interested in purchasing different breeds of dogs shown in boxes 222, 224, 226 and 228. FIG. 32 is an exemplary screen 230 showing Sender's selection of which Designated Recipient Group—or the general public having the ZAPAPP—may have access to a particular Upstream, in the personal and commercial sector. In this example, the pet shop Sender has selected box 222 for the Designated Recipient Group for "West Highland White Terriers", meaning those Recipients who are interested in purchasing this breed, since the pet shop Sender wants to send a live video of new West Highland White Terriers to this group of Recipients. The Sender selects box 232 to send the live video. FIG. 33A is an exemplary screen 234 showing a member of a Designated Recipient Group receiving an alert 236 that a Sender is inviting them to access the ZAPCLOUD™ WEBSITE, in the personal and commercial sector, and view live real time videos upstreamed by the Sender. FIG. 33B is an exemplary screen 238 of such member of the Designated Recipient Group showing a ZAPWALL matrix 240 including the real time video 242 upstreamed by the Sender as well as other relevant real time live videos 244, 246, 248, 250 and 252 upstreamed by other Senders. In this example, a Recipient who is a potential customer who is looking for West Highland White Tethers receives a live video from the pet shop Sender of a new dog of this breed available at the pet shop. The Recipient, if he or she has requested a ZAPWALL matrix, will also receive relevant live videos being sent by other local pet shops.

Figure 34:
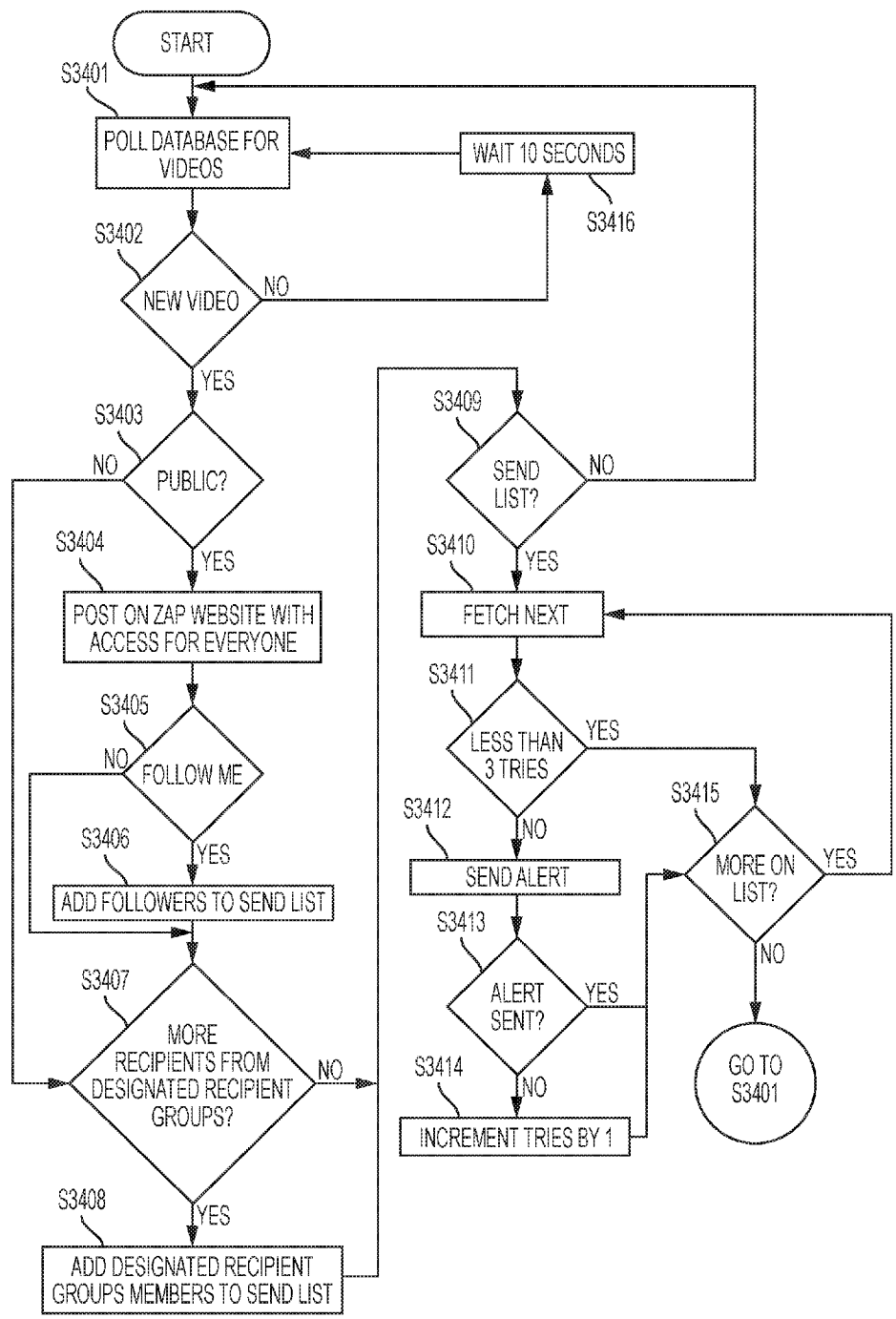
FIG. 34 is a flow diagram of the process for alerting members of a Designated Recipient Group and alerting "followers" of a particular Sender upstreaming video accessible to all ZAPAPP Recipients, in the personal and commercial sector.

FIG. 34 is a flow diagram of the process for alerting members of a Designated Recipient Group and alerting "followers" of a particular Sender upstreaming video accessible to all ZAPAPP Recipients, in the personal and commercial sector. As shown in FIG. 34, in step S3401, the database is polled for videos. If there is a new video found (S3402=YES), then the audience for the video is determined. If this video is for anyone having the ZAPAPP, e.g., if the video is public, (S3403=YES), then in step S3404 this video is posted on ZAP CLOUD WEBSITE with access available to everyone. Next, an alert is sent to the appropriate Recipients as follows. If a Recipient has requested to receive public postings of the Sender, e.g., "follow me" (step S3405=YES), then this Recipient is added to the send list in step S3406. When the Recipient is added or if there is no "follow me" (S3405=NO), then determine whether there are more Recipients.

If there are more Recipients who are members of Designated Recipient Groups (S3407=YES), then these Recipients are added to the send list in step S3408. If there are no more Recipients (S3407=NO) or the Recipients have been added in step S3408, then check the send list in step S3409. If the send list has more Recipients (S3409=YES), then the next Recipient is fetched in step S3410. If there are less than three tries (S3411=YES), then an alert is sent to the Recipient in step S3412. If the alert is successfully sent (S3413=YES), then determine whether there are more Recipients on the list. If the alert is not successfully sent (S3413=NO), then increment the number of tries in step S3414. When the alert is successfully sent or the number of tries is incremented, if there are more Recipients on the list (S3415=YES), then continue processing at step S3410. Otherwise, if there are no more Recipients (S3415=NO), then continue processing at step S3401.

If the send list has no more Recipients (S3409=NO), then continue processing at step S3401.

If the video is not to be made public (S3403=NO), then continue processing at step S3407.

If there is no new video (S3402=NO), then at step S3416, wait a predetermined number of seconds, such as 10 seconds.

The foregoing figures and examples describe ZAPWALL matrix of real time live videos, where the videos are initiated by Recipients and where the videos are initiated by Senders. The inventive system synchronizes requests by Recipients and Senders of relevant real time live videos so as to enhance the usefulness and effect of the ZAPWALL matrix for both the Recipients and Senders. In the commercial context, a Recipient with a mobile device who is attending an art show or a trade show may request a ZAPWALL of simultaneous real time live video streams from mobile devices being utilized by Senders at various exhibits or locations at the show, to obtain a comparative awareness of activity, artwork or trade displays at each location, and such Recipient can then direct such ZAPWALL to a designated group of Recipients, who are his/her business colleagues or clients, and the Recipients can take actions on the system in response to such ZAPWALL, such as communicating with the exhibitors, placing a bid or order, or transmitting voice, text or data in real time to the various Senders and Recipients to get more information on the exhibit location and content. At the same art show or trade shows, various Senders who have exhibits or booths can initiate sending live videos of their artwork or trade displays to Designated Recipient Groups of customers who may be attending the show, or to the general public of ZAPAPP users who are attending the show; in each case, the ZAP SYSTEM identifies the Recipients attending the show by GPS or by codes or tags related to the venue and the ZAP SYSTEM further identifies whether or not the Recipients are viewing and/or requesting live videos at such time, and communicates this information to the various Senders.

These capabilities are extremely useful to the Recipients; since they cannot be physically present at multiple locations of artwork exhibits within the art show venue, they can view a ZAPWALL matrix of real time live video of the artwork exhibits and activity level at these multiple locations, take actions in response thereto (such as placing a bid or purchase order or conducting other electronic commerce with the Senders) and not miss out on opportunities because they are not physically at the artwork location. These capabilities are also extremely useful to the Senders, since it enables them to identify and locate additional potential Recipient customers who are not physically at their artwork exhibit location in the venue but who could be bidders or purchasers and who can use the ZAP SYSTEM to place a bid or purchase order or conduct other electronic commerce with the Sender.

Figure 35:
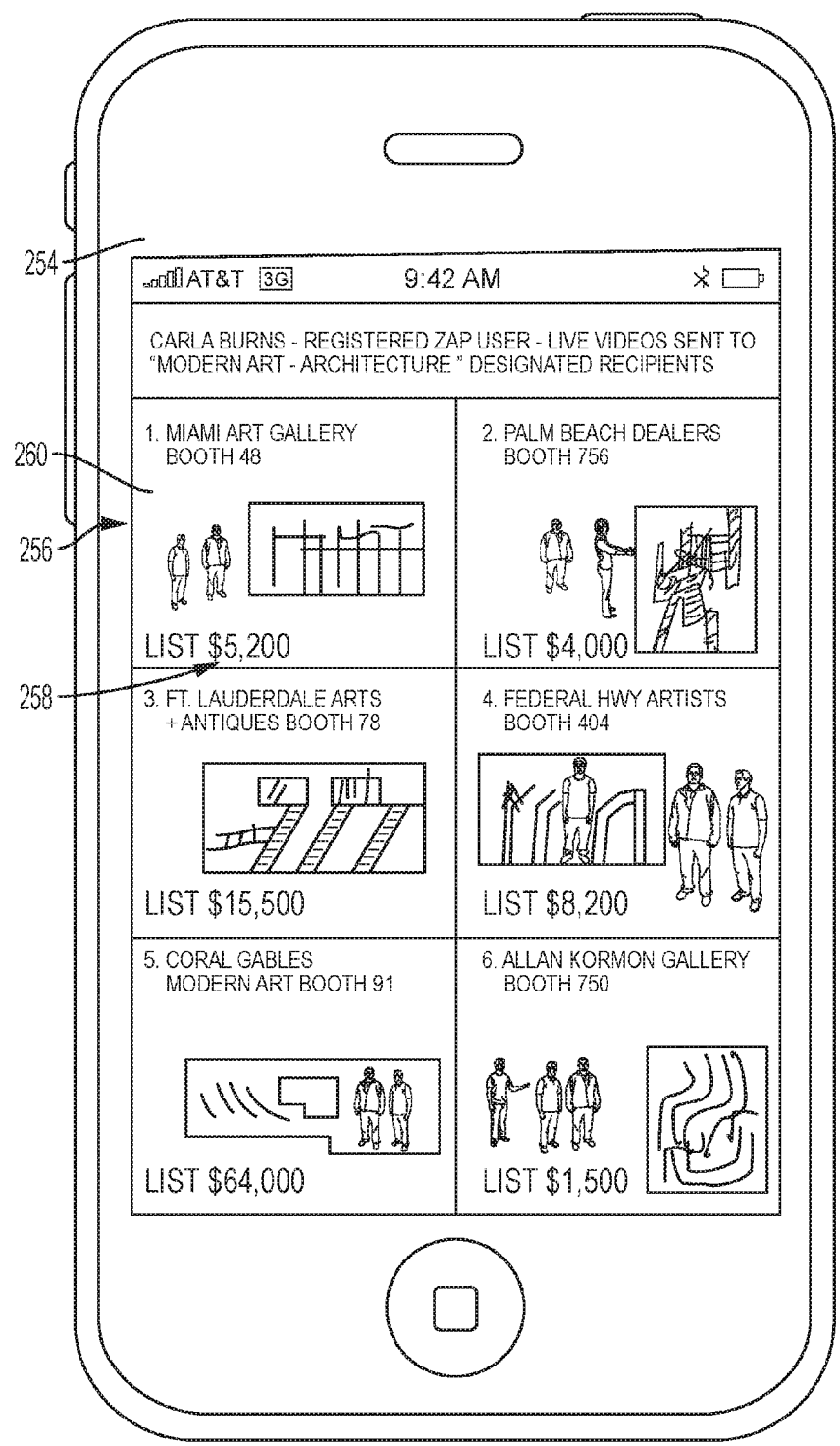
FIG. 35 is an exemplary screen of a Recipient who is a member of several Designated Recipient Groups, showing a ZAPWALL matrix of simultaneous, multiple live video streams, upstreamed by various Senders relevant to Recipient's specific interests, in the personal and commercial sector.
Figure 36:
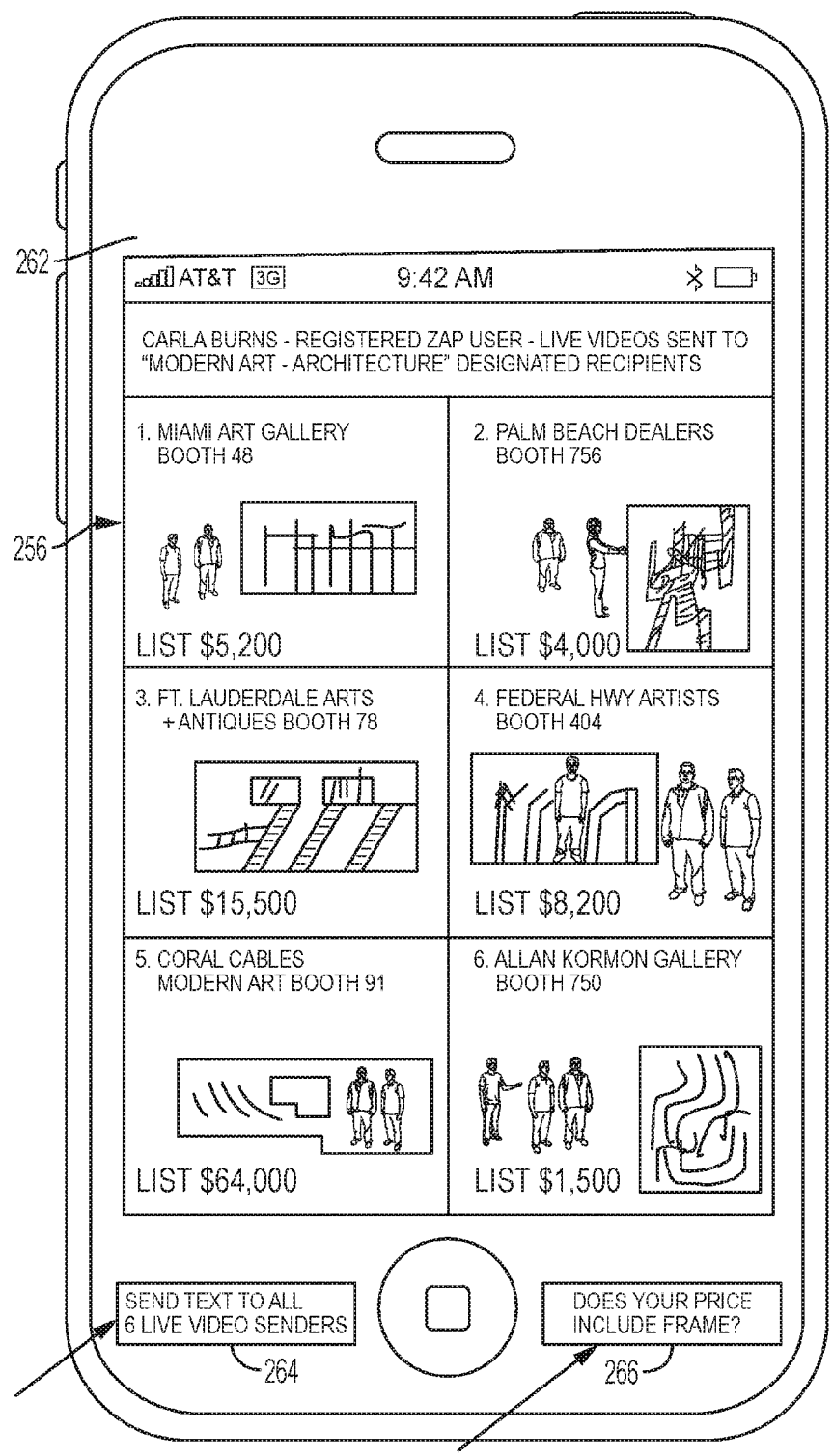
FIG. 36 is an exemplary screen of a Recipient showing the requested ZAPWALL matrix of simultaneous, multiple live video streams, with the Recipient utilizing the ZAPCLOUD™ WEBSITE to conduct communication with all six of the Senders of video streams in the ZAP WALL.
Figure 37A:
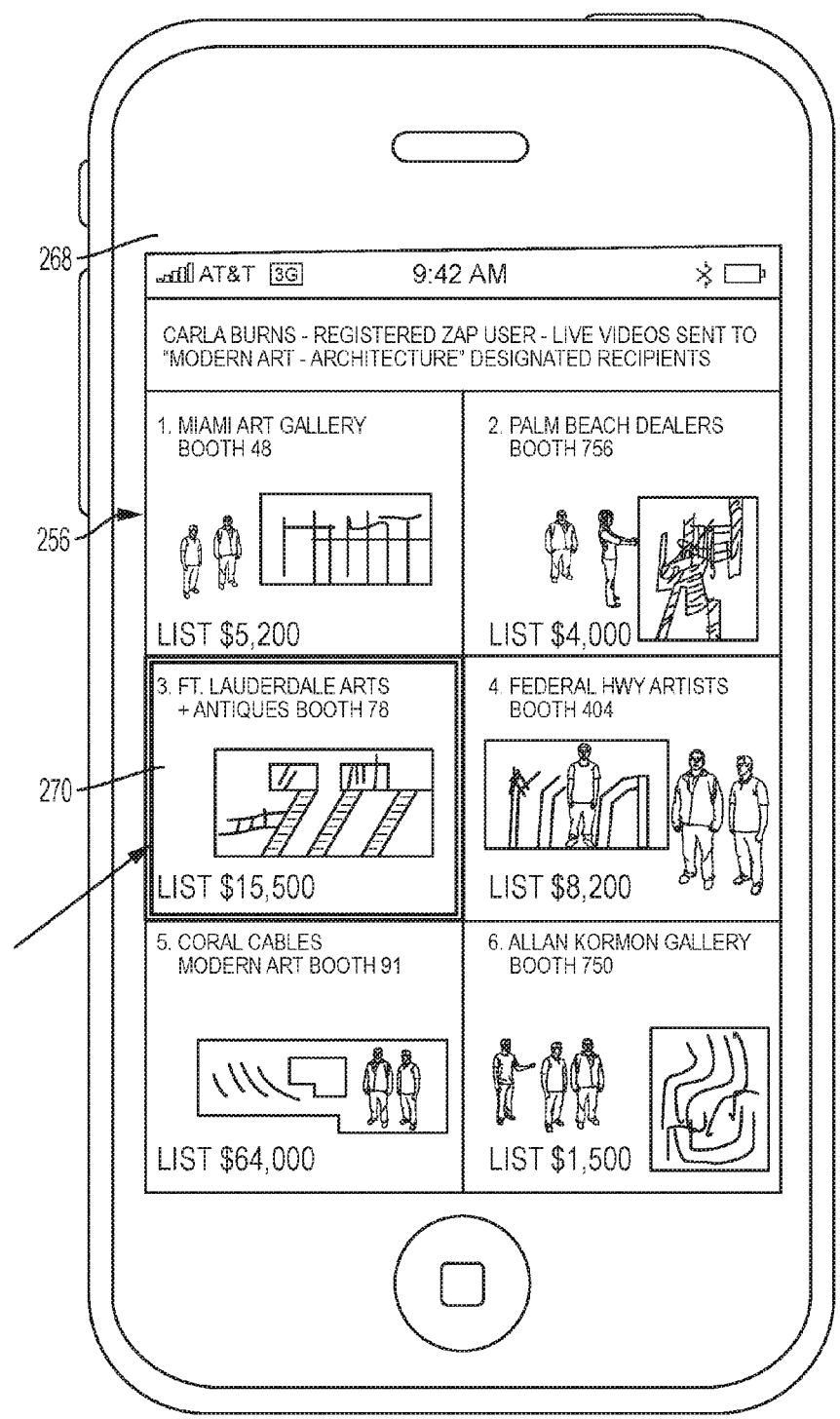
FIG. 37A is an exemplary screen of a Recipient showing the requested ZAPWALL matrix of simultaneous, multiple live video streams, with the Recipient selecting one of the live video streams in the ZAPWALL for enlargement and to enable the Recipient to take action in response to, and communicate with the Sender, of that particular video stream.
Figure 37B:
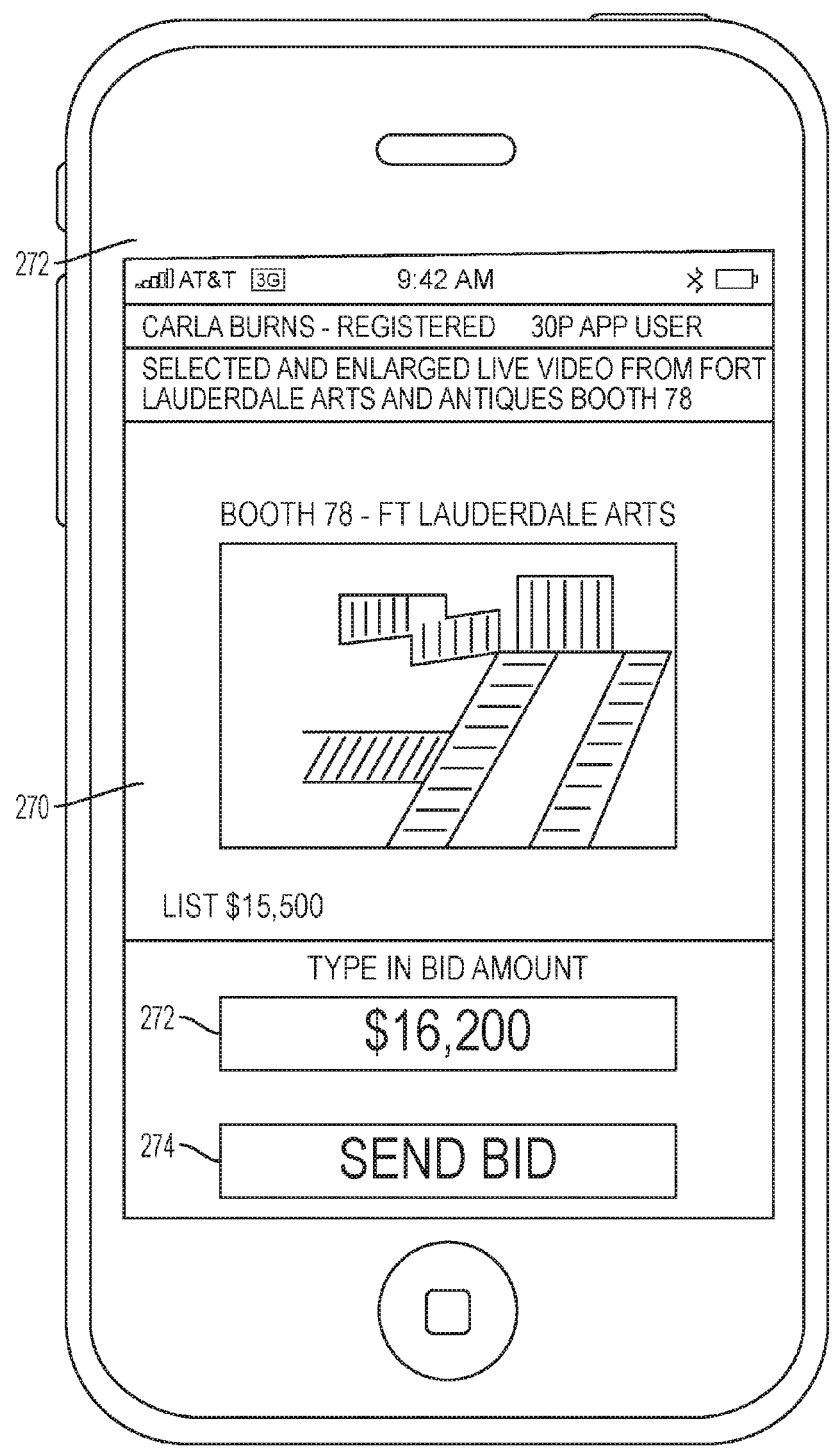
FIG. 37B is an exemplary screen of such Recipient showing the selected and enlarged live video stream of the particular Sender with the Recipient taking action in response to such video stream by communicating with that particular Sender.

FIG. 35 is an exemplary screen 254 of a Recipient who is a member of several Designated Recipient Groups, showing a ZAPWALL matrix 256 of simultaneous, multiple live video streams, upstreamed by various Senders relevant to Recipient's specific interests, in the personal and commercial sector. In this example, the Recipient is attending an art show and is interested in modern art paintings and photography of architecture and buildings, and various Senders at an art show have this Recipient on their Designated Recipient Group for "Modern Art—Architecture" and are upstreaming live video of their exhibit booths and artwork. As shown in this figure, at the request of particular Senders utilizing data of the Senders, the ZAP SYSTEM is able to automatically insert a list price 258 into each of the videos 260. FIG. 36 is an exemplary screen 262 of a Recipient showing the requested ZAPWALL matrix 256 of simultaneous, multiple live video streams, with the Recipient utilizing the ZAPCLOUD™ WEBSITE to conduct communication with all six of the Senders of video streams in the ZAPWALL. In this example, the Recipient at the art show is sending a text to all six of the Senders asking "Does your price include the frame?" using boxes 264 and 266. FIG. 37A is an exemplary screen 268 of a Recipient showing the requested ZAPWALL matrix 256 of simultaneous, multiple live video streams, with the Recipient selecting one of the live video streams 270 in the ZAPWALL for enlargement and to enable the Recipient to take action in response to, and communicate with the Sender, of that particular video stream. FIG. 37B is an exemplary screen 272 of such Recipient showing the selected and enlarged live video stream 270 of the particular Sender with the Recipient taking action in response to such video stream by communicating with that particular Sender. In this example, the Recipient at the art show is placing a bid on the artwork being exhibited on the live real time video upstream from one particular Sender using boxes 272 and 274. This is useful to the Recipient, who is not physically at the Sender's artwork exhibit, but wants to place a bid and not miss out on the opportunity and is also useful to the Sender who may receive the highest bid from this Recipient, even though this Recipient is not physically at the Sender's artwork exhibit.

Figure 38:
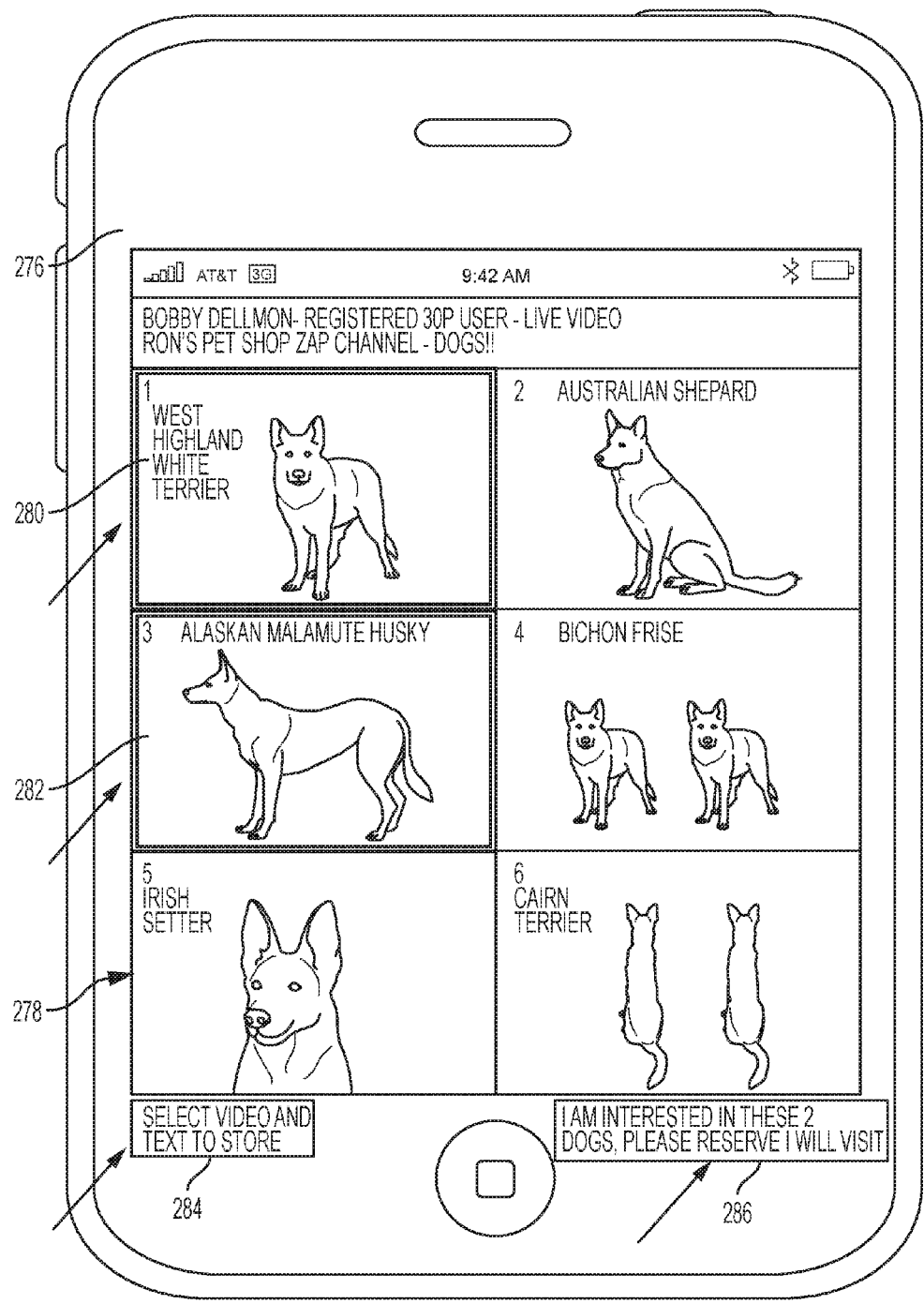
FIG. 38 is an exemplary screen of a Recipient showing the requested ZAPWALL matrix of simultaneous, multiple live video streams, Upstreamed by a Sender of a ZAPCHANNEL™, featuring video and other information and advertisements, and enabling the Recipient to respond electronically

The ZAPCLOUD™ system enables a Sender to establish a real time streaming video channel associated with that Sender (referred to as a ZAPCHANNEL™) This ZAPCHANNEL™ is a more permanent presence on the ZAPCLOUD™ WEBSITE associated with a particular Sender and can become a regular viewed channel or destination on the ZAPCLOUD™ WEBSITE, accessible by a pre-selected group of ZAPAPP users or by the general public of users of ZAPAPP, via mobile devices, personal computers, laptops, internet television, etc. and utilized for personal, entertainment, advertising, electronic commerce and other commercial applications. A ZAPCHANNEL™ is somewhat like a channel on broadcast or cable television, where a Sender may Upstream video, audio, text and data information from time to time, which may include advertising, publicity or other content. Each ZAPCHANNEL™ can be customized by the Sender, with respect to the Designated Recipient Groups to have access from time to time and with respect to the content on the ZAPCHANNEL™, which in addition to video will include other information and the ability of the Recipients to take actions in response to the Information on the ZAPCHANNEL™, such as conducting electronic commerce transactions, making appointments and reservations, entering text and data, and many other responses. The ZAPCHANNEL™ will have Recipients who are Followers who will receive an alert when the Sender of the ZAPCHANNEL™ is sending live real time video streams available for viewing. Recipients can notify the ZAP SERVER that they wish to receive an alert that the ZAPCHANNEL™ is sending real time live video and becomes Followers of that ZAPCHANNEL™. The inventive system enables Senders with a ZAPCHANNEL™ to send to the Designated Recipient Groups or the general public a ZAPWALL matrix of multiple real time videos which can be viewed simultaneously, and with the Recipients enabled to take actions in response to all of the videos or one or more of the videos selected by the Recipient. FIG. 38 is an exemplary screen 276 of a Recipient showing the requested ZAPWALL matrix 278 of simultaneous, multiple live video streams, upstreamed by a Sender of a ZAPCHANNEL™, featuring video and other information and advertisements, and enabling the Recipient to respond electronically. In this example, a pet shop with a ZAPCHANNEL™ could send to its Designated Recipient Group of customers looking for dogs, the ZAPWALL matrix 278 of six live real time videos of different dogs in the store. A Recipient of such ZAPWALL could take action in response and select two videos 280 and 282. The Recipient can text to the store, "I'm interested in these two dogs, please reserve them as I will visit your store today", using boxes 284 and 286.

The inventive system enables Recipients to search for ZAPCHANNELS™ and create a ZAPWALL matrix of multiple real time videos which can be viewed simultaneously and with the Recipient able to take actions in response to all of the videos or one or more of the videos selected by the Recipient. For example, a Recipient looking for dogs could request and receive six ZAPCHANNELS™ from different pet stores in his or her vicinity. The ZAP SERVER will create a ZAPWALL matrix of the ZAPCHANNELS™ and the Recipient could take action in response and select two of the six and text to those pet stores, "I'm interested in the dog you are showing on your ZAPCHANNEL™, please reserve them as I will visit your store today."

Figure 39A:
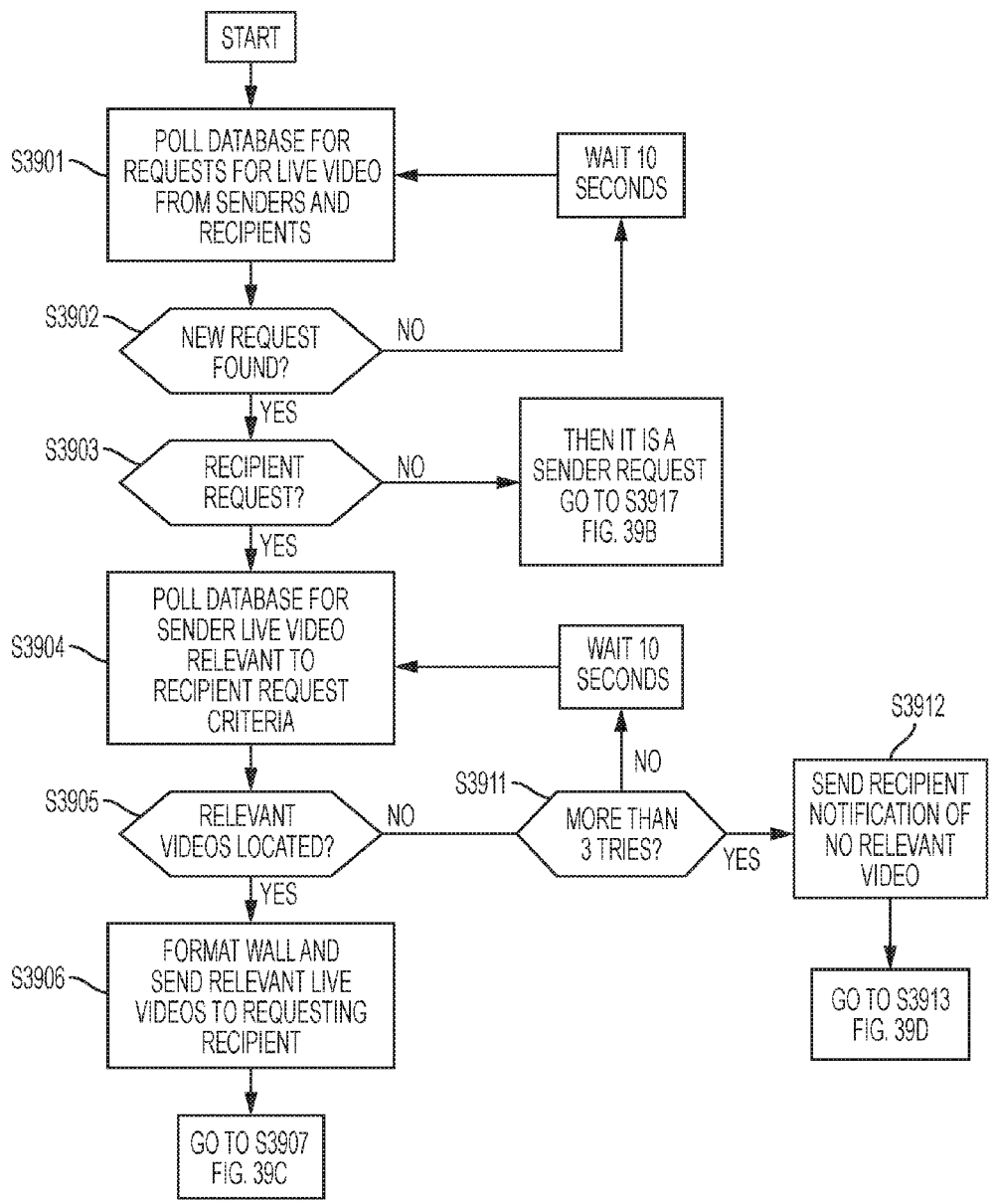
FIGS. 39A, 39B, 39C and 39D are flow diagrams of the process of receiving requests from Senders to send real time live video streams; receiving requests from Recipients to receive a matrix of real time live video streams; finding and synchronizing live videos and creating a ZAPWALL matrix of live videos relevant to Recipient request criteria; and transmitting live videos from Senders (and Recipients) to Designated Recipient Groups, the general public of ZAPAPP users, and/or Recipients whose request criteria are relevant.
Figure 39B:
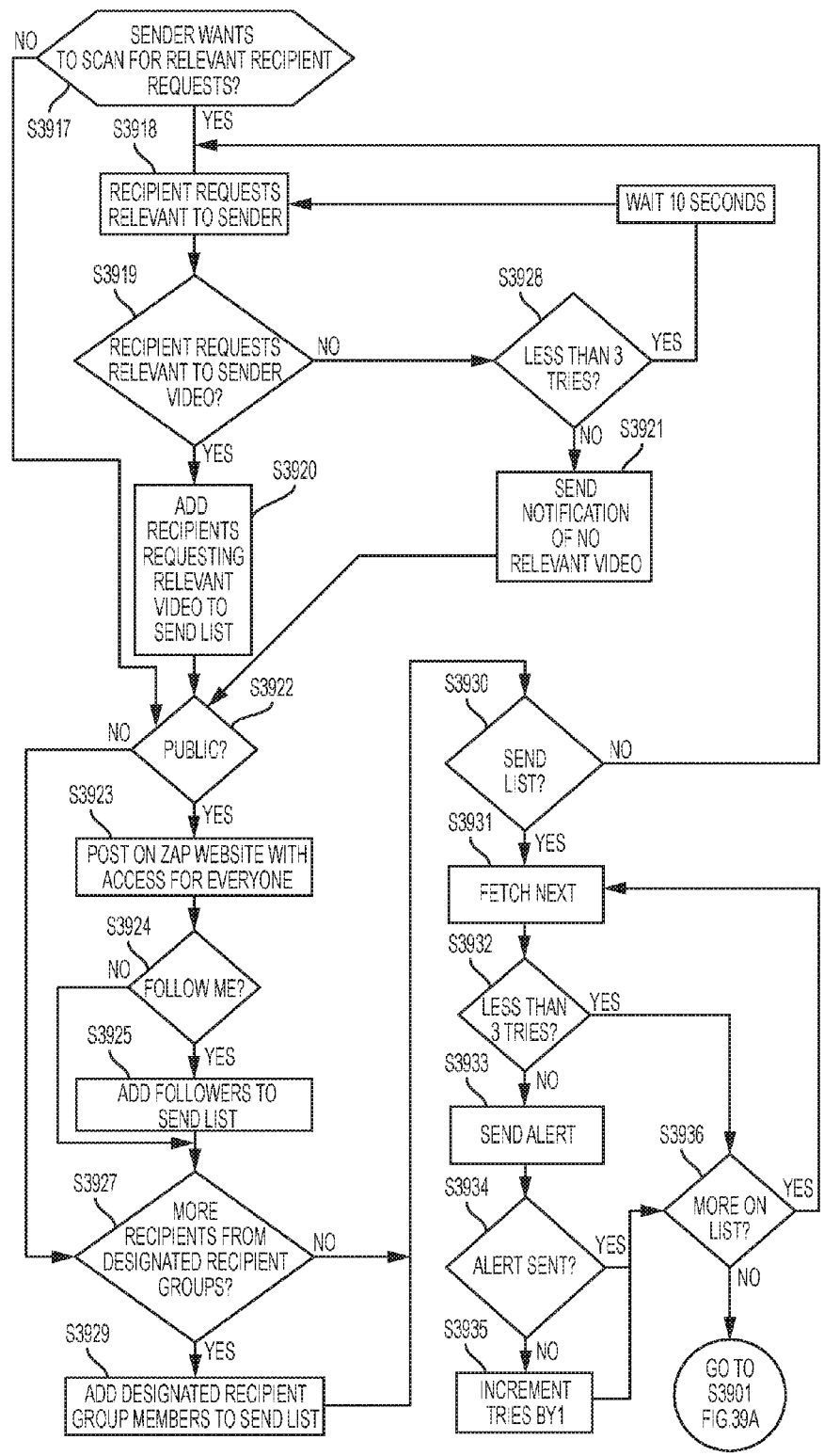
Figure 39C:
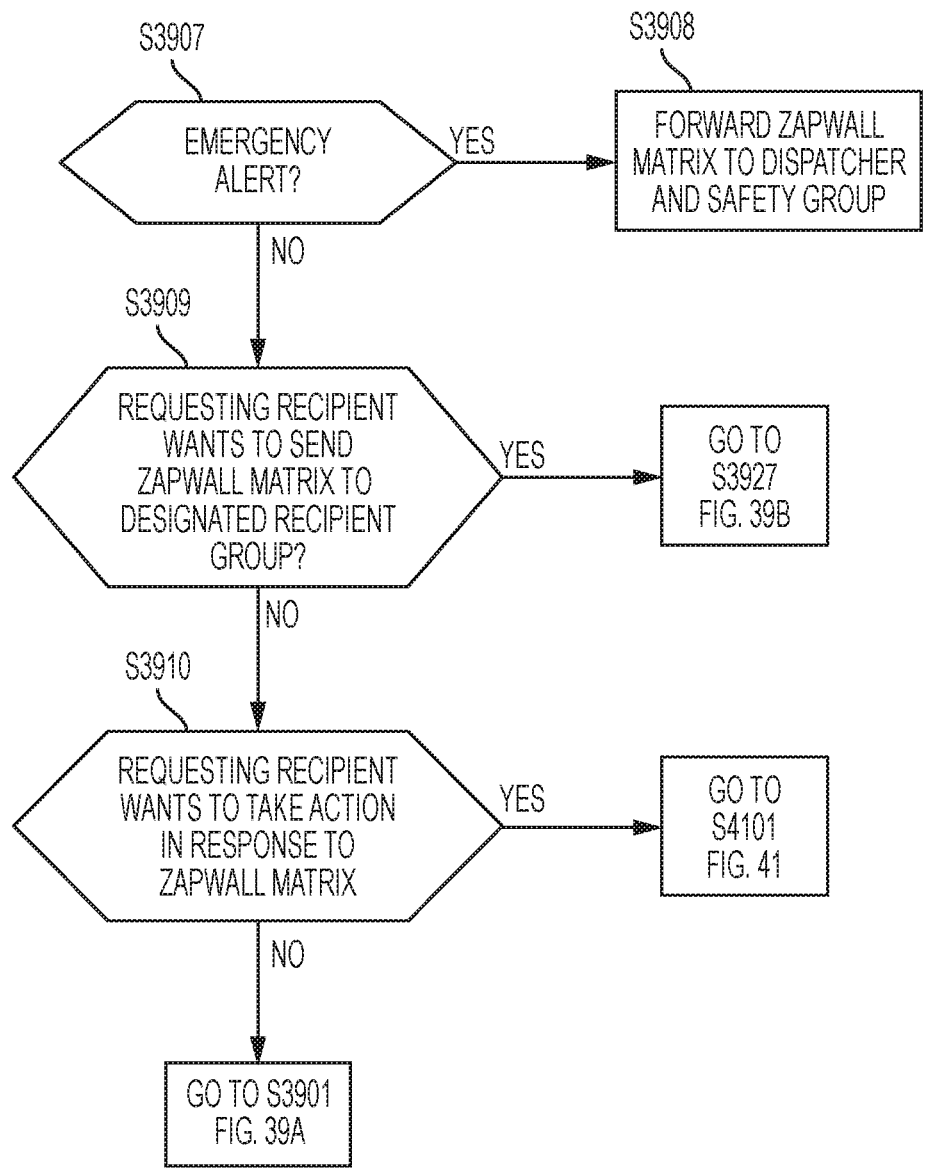
Figure 39D:
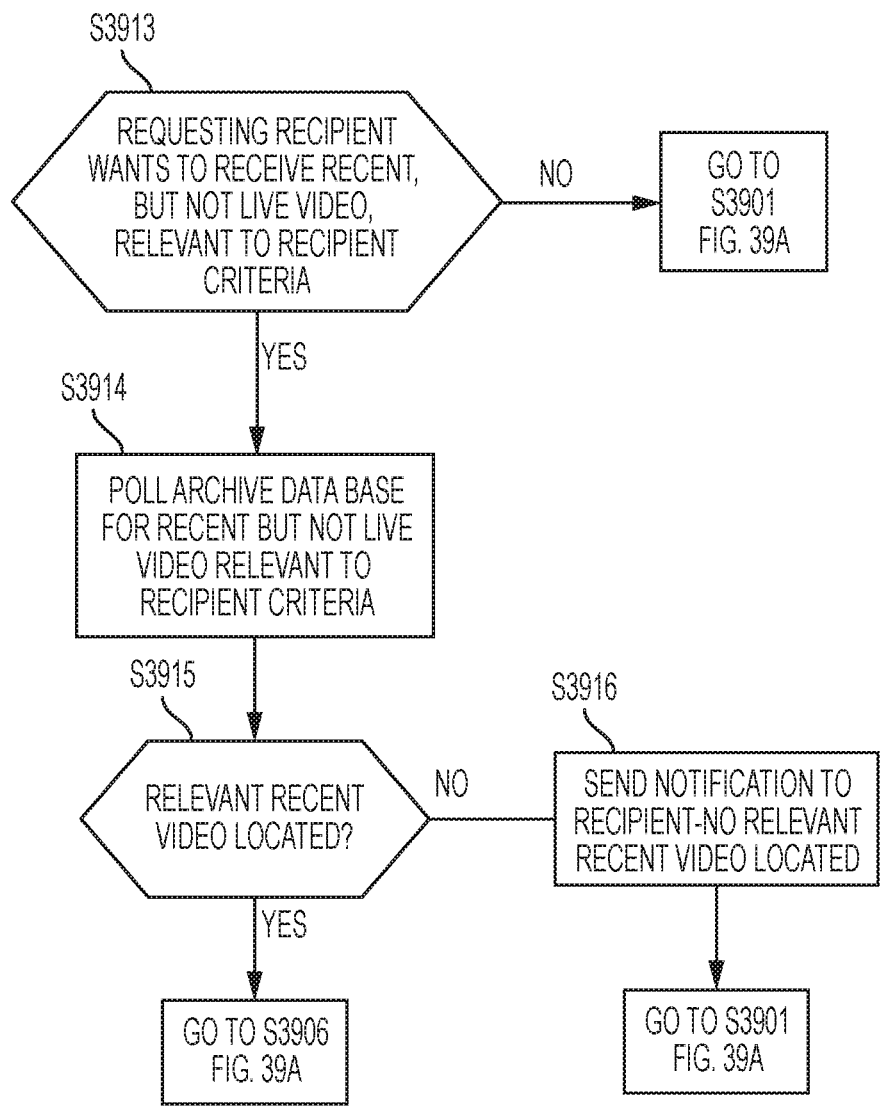

FIGS. 39A, 39B, 39C and 39D are flow diagrams of the process of receiving requests from Recipients to receive a matrix of real time live video streams; receiving requests from Senders to send real time live video streams; finding and synchronizing live videos and creating a ZAPWALL matrix of live videos relevant to Recipient request criteria; and transmitting live videos from Senders (and Recipients) to Designated Recipient Groups, the general public of ZAPAPP users, and/or Recipients whose request criteria are relevant. As shown in FIG. 39A, in step S3901, the database is polled by the ZAP SERVER for requests to receive or send live video from Recipients and Senders. If no new request is found, the ZAP SERVER waits 10 seconds and polls the database again. If there is a new request found (S3902=YES), then it must be determined if this is a request from a Recipient or from a Sender, as they will be handled differently. If the request is from a Sender (S3903=NO), then the ZAP SERVER will proceed with step S3917 of FIG. 39B as described below. If the request is from a Recipient (S3903=YES), then in Step S3904, the ZAP SERVER polls the database for live videos from Senders which are relevant to the Recipient's request criteria (the detailed procedure for retrieving live video in accordance with the Recipient's request criteria are detailed in FIG. 40 and as described below). If live videos relevant to Recipient's request criteria are not found (S3905=NO), the ZAP SERVER will try again three times (S3911=NO), waiting 10 seconds between tries, to locate relevant live video in Step S3904. If three attempts to locate live videos relevant to Recipient's request criteria are not successful (S3911=YES), the ZAP SERVER will send notification to the Recipient in Step S3912 that no relevant live video was found, and ask if the Recipient wants to view recent (but not live) relevant video streams. In FIG. 39D, If the Recipient wants to view recent (but not live) relevant video streams (S3913=YES), the ZAP SERVER in Step S3914 polls the data base for recent (but not live) videos relevant to the Recipient's request criteria. If no recent (but not live) videos relevant to the Recipient's request criteria are found (S3915=NO), the ZAP SERVER notifies the Recipient in Step S3916, and the ZAP SERVER goes back to S3901 to handle new video requests from Recipients and Senders. If no relevant live videos were found and the Recipient does not want to view recent (but not live) video streams (S3913=NO), the ZAP SERVER goes back to S3901 to handle new video requests from Recipients and Senders.

In FIG. 39A, if live real time videos relevant to Recipient's request criteria are found (S3905=YES), or if the recent (but not live) videos relevant to Recipient's request criteria are found (S3915=YES), then in Step S3906 the ZAP SERVER will format the ZAPWALL and send the matrix relevant live videos to the requesting Recipient. The Recipient then has several choices of action to take with respect to the ZAPWALL matrix being viewed by the Recipient. In FIG. 39C, if the Recipient considers himself or herself to be in an emergency situation, the Recipient will tap on the box Emergency Alert which will be recognized by the ZAP SERVER (S3907=YES), and the ZAPWALL matrix will automatically be forwarded by the ZAP SERVER to the correct Dispatcher (based on the GPS location or ZAPCODE® identifier of the Recipient) and will also be forwarded to the Safety Group of the Recipient (S3908). The Dispatcher will take actions in response to this Emergency Alert, such as requesting the ZAP SERVER to forward the ZAPWALL or individual videos included therein to First Responders. If this is not an Emergency Alert (S3907=NO), then the Recipient can decide (S3909) to send either the entire ZAPWALL matrix of live real time videos, or select one or more individual live real time videos included therein, to a Designated Recipient Group (which may be Recipient's Safety Group if Recipient believes that he or she is in a potentially dangerous situation but it is not yet an Emergency Alert). If Recipient decides to send to ZAP WALL Matrix or select videos (Step 3909=YES), ZAPAPP users in the Designated Recipient Group will be added to the Send List in Step S3929, FIG. 39B, by the ZAP SERVER. The Recipient can also decide (S3910), whether to take actions in response to the ZAPWALL matrix as a whole or as to one or more individual live videos included therein. If the Recipient decides to take action (Step 3910-YES) the flow advances to FIG. 41, which is described below.

In FIG. 39A, if a new request is found (S3902=YES) and it is determined that this is a request from a Sender (S3903=NO), then the ZAP SERVER will proceed with Step S3917, FIG. 39B. There are several different choices that a Sender can make when upstreaming a live video for viewing by Recipients. The Sender can request that the ZAP SERVER search for Recipient requests for live video that are relevant to Sender's criteria (S3917=YES), in which case the ZAP SERVER in Step S3918 will poll the data base for Recipient requests that are relevant to Sender's video (the detailed procedure for sending live video in accordance with the Sender's criteria are detailed in FIG. 40 and as described below). If Recipient requests relevant to Sender's criteria are not found (S3919=NO), the ZAP SERVER will try again three times, waiting 10 seconds between tries, to locate relevant Recipient requests in Step S3928. If three attempts to locate Recipient requests for live videos relevant to Sender's criteria are not successful (S3928=NO), the ZAP SERVER will send notification to the Sender in Step S3921 that no relevant Recipient requests for live video were found, and the process will then resume with Step S3922 to process any other instructions by Sender as to distribution of Sender's live video. That is, the Sender may want the video sent to a Designated Recipient Group in Step S3927 or to Followers in Step S3924. If the Recipient requests for live video relevant to Senders criteria are found (S3919=YES), the Recipients are added to the Send List in Step S3920.

After completion of the search for Recipient requests for live video relevant to the Sender's criteria in Steps S3918 and S3919, or if the Sender did not request that the ZAP SERVER search for Recipient requests for relevant live video (S3917=NO), the ZAP SERVER analyzes the Sender request in step S3922 to see if the Sender has other instructions for sending Sender's live real time video to Recipients. If the Sender does not want Sender's live real time video to be available to the general public of all ZAPAPP users (S3922=NO), but rather only to a Designated Recipient Group, then the ZAPAPP users in the Designated Recipient Group are added to the Send List in Step S3929. If the Sender does want Sender's live real time video to be available to the general public of all ZAPAPP users (S3922=YES), then the ZAP SERVER in Step S3923 will post the Sender's live real time video on the ZAPCLOUD™ WEBSITE, accessible for all ZAPAPP users. The ZAP SERVER in Step S3924 will also poll the database for Followers of that particular Sender and if S3924=YES, will add such Followers to the Send List in Step S3925. In Steps S3927 and S3929, the ZAP SERVER asks if more Recipients should be added and if yes, the ZAP SERVER will also add to the Send List ZAPAPP users from Designated Recipient Groups selected by a Recipient (who has already received relevant live time video from this Sender) who has elected to forward such videos in Step S3909. In the event that after completion of the foregoing process, there are no relevant or designated Recipients for the Sender's real time live video (other than the general public of ZAPAPP users, if selected), the ZAP SERVER in Steps S3930 through S3936 will try three more times to search for relevant or designated Recipients, and if not successful, notify the Sender in Step S3933 and return to Step S3901 to process additional requests from Recipients and Senders.

Figure 40A:
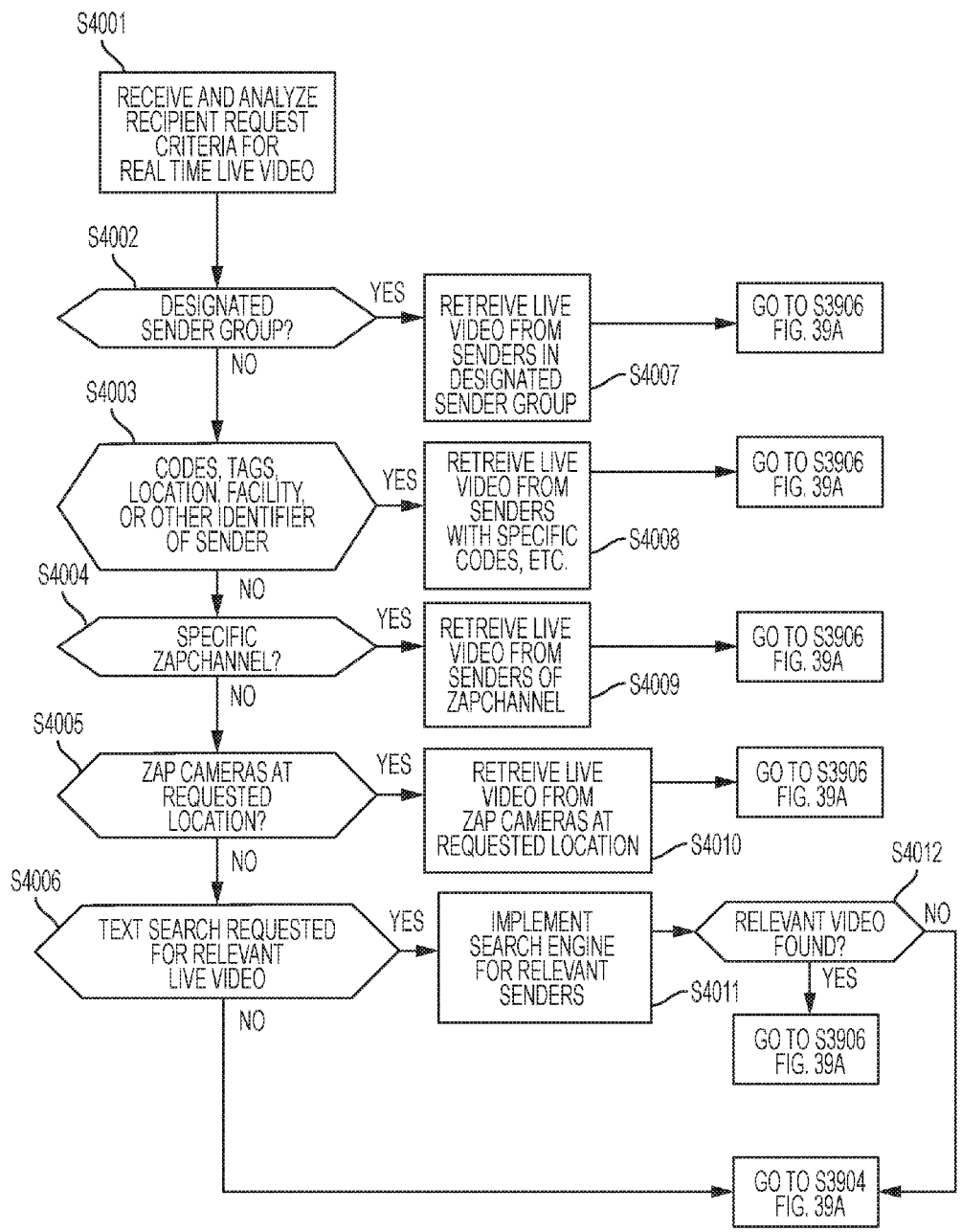
FIGS. 40A and 40B are flow diagram of the process of detailed searching for live real time video responsive to Recipient's request criteria, including videos being sent by Designated Sender Groups; videos retrieved by codes, tags, locations, facilities, room numbers or other identifiers; videos from ZAP CAMERAs or videos located by a text search by name, subject, topic, location or other words.

FIG. 40A is a flow diagram of the detailed procedure whereby the ZAP SERVER analyzes a Recipient's request criteria for multiple real time live video streams, retrieves videos and creates the requested ZAPWALL for viewing by the Recipient, starting in Step S4001. If the Recipient request criteria specifies a Designated Sender Group (S4002=YES), the ZAP SERVER in Step S4007 will poll the data base to retrieve live video from Senders within the Designated Sender Group and include them in the ZAPWALL in Step S3906. If the Recipient request criteria specifies Senders by codes, tags, location, facility, name or other identifier (S4003=YES), the ZAP SERVER in step S4008 will poll the data base to retrieve live video from Senders with such codes or other identifiers and include them in the ZAPWALL in Step S3906. If the Recipient request criteria specifies a ZAPCHANNEL™ (S4004=YES), the ZAP SERVER in step S4009 will poll the data base to retrieve live video from the Senders of that ZAPCHANNEL™ and include them in the ZAPWALL in Step S3906. If the Recipient request criteria specifies viewing of video feeds from ZAP CAMERAS identified by codes, tags, location or other identifiers (S4005=YES), the ZAP SERVER in Step S4010 will poll the data base to retrieve live video feeds from ZAP CAMERAS with such codes, tags, location or other identifier and include them in the ZAPWALL in Step S3906. If the Recipient request criteria specifies a text search for relevant live video utilizing names, subject matter, topics, locations or other words (S4006=YES), the ZAP SERVER in Step S4011 will utilize the search engine and poll the data base for live video from Senders utilizing a text search and if relevant live video is found (S4012=YES), include them in the ZAPWALL in Step S3906. If no relevant live video matching Recipient's request criteria is located (S4012=NO), the Recipient will be notified and the ZAP SERVER will return to Step S3904 to attempt the search for a total of three times.

Figure 40B:
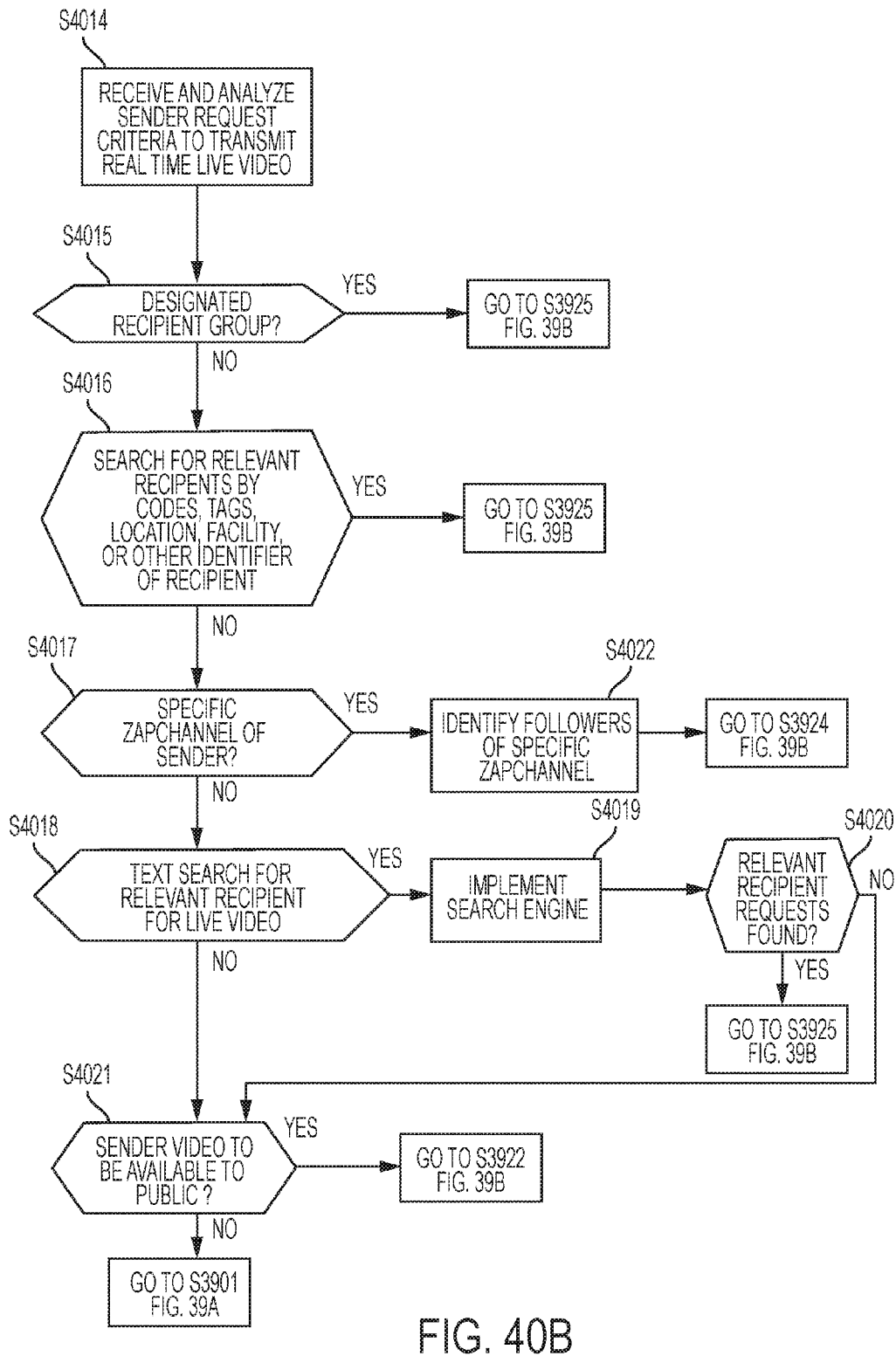

FIG. 40B is a flow diagram of the detailed procedure whereby the ZAP SERVER analyzes a Sender's request criteria to transmit and make available for viewing by Recipients of Sender's live real time video and including in ZAPWALLS requested by Recipients, starting in Step S4014. If the Sender transmission criteria specifies a Designated Recipient Group (S4015=YES), the ZAP SERVER will identify such Recipients within the data base and in Step S3925 add the Recipients within the Designated Recipient Group to the Send List. If the Sender transmission criteria specifies Recipients by codes, tags, location, facility, name or other identifier (S4016=YES), the ZAP SERVER will identify such Recipients within the data base and in Step S3925 add them to the Send List. If the Sender has a ZAPCHANNEL™ (S4017=YES), then the ZAP SERVER will identify the Followers of such ZAPCHANNEL™ within the data base and in Step S3924 add them to the Send List. If the Sender transmission criteria specifies a text search for Recipients who are requesting relevant real time live video utilizing names, subject matter, topics, locations or other words (S4018=YES), the ZAP SERVER will employ a search engine and poll the data base for relevant and matching current Recipient requests and if found (S4020=YES), in Step S3925 add them to the Send List. If relevant and matching current Recipient requests are not found (S4020=NO), the Sender will be notified and then the ZAP SERVER in Step S4021 will check if the Sender desires to make Sender's live real time video available on the ZAP CLOUD WEBSITE for viewing by the general public of all ZAPAPP users and if S4021=YES, will make the Senders video available by going to Step S3923 in FIG. 39B. If the Sender does not want Sender's video available to the general public of all ZAPAPP users (S4021=NO), than the ZAP SERVER will return to Step S3901 to process additional requests.

Figure 41:
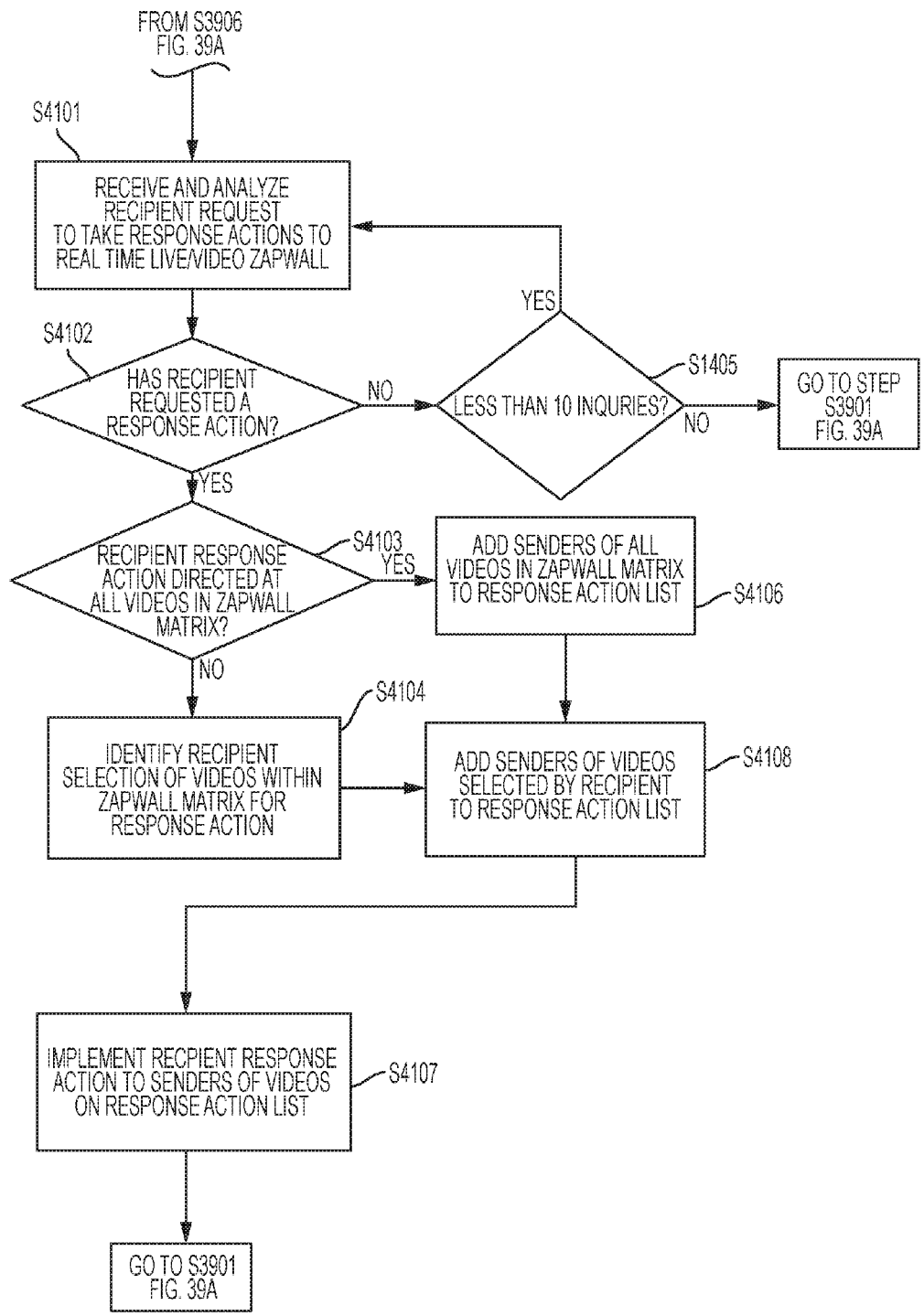
FIG. 41 is a flow diagram of the process of a Recipient, who has received a ZAPWALL matrix of real time live videos, selecting either the entire ZAPWALL matrix or individual real time videos within the ZAPWALL matrix to take response actions.

FIG. 41 is a flow diagram of the detailed procedure whereby the ZAP SERVER implements response actions taken by Recipients who are viewing a ZAPWALL matrix of multiple real time live video streams. In Step S3906 the ZAP SERVER formats and sends the ZAPWALL matrix of multiple real time live video streams to the Recipient who has made the request. In Step S4101, the ZAP SERVER polls the Recipient for response actions which may be taken by the Recipient, which the ZAP SERVER will synchronize with the available responses can that be made to the specific live video streams from the Senders. The response actions could include the Recipient sending a text or email to the Sender; an audio response; tapping on a link to the Sender's website or other location; responding to specific inquiries from the Sender such as "Would you like to make a reservation—type in the time and number of guests"; responding to an advertisement by the Sender or by a third party advertiser superimposed on the live video; and conducting electronic commerce such as placing a bid or an order. If there is no immediate response action by the Recipient (S4102=NO), the ZAP SERVER will in Step S4105 repeat the inquiry every 10 seconds for example, up to ten tries. If the Recipients still has not indicated any response action, the ZAP SERVER will return to Step S3901 to process additional requests. If the Recipient does indicate he or she is taking a response action (S4102=YES), then the ZAP SERVER analyzes whether the Recipient response action will be applied to all of the videos included in the ZAPWALL, and if S4103=YES, the ZAP SERVER in Step S4106, adds all of the Senders of such live video to the Response Action List. If the Recipient wants the response action to be applied only to one or more (but not all) of the videos included in the ZAPWALL (S4103=NO), the ZAP SERVER in Step S4104 identifies the selected Senders of such live video and in Step S4108 adds them to the Response Action List. Finally, the ZAP SERVER in Step S1407 implements the Recipient's response action to each of the Senders in the Response Action List.

For certain ZAPWALL applications, such as in the security and military sector, the process of sending and retrieving relevant live real time video is simplified, as the videos will be sent and retrieved within the limitations of Designated Sender Groups and Designated Recipient Groups. For example, the ZAP SERVER in Step S3901, would recognize that a Recipient request is being sent by a commander of a security, police or military organization, and that only live video from a Designated Sender Group is to be retrieved and accessed, and the ZAP SERVER would proceed directly to Step S4002 in FIG. 40A, retrieve the live video from Senders in that Designated Sender Group and create the ZAPWALL in Step S4007, and immediately send the ZAPWALL to the Recipient commander who had requested it, as there would be no other eligible Recipients. For another example, a Recipient can call up a screen on the ZAPAPP that will show the Recipient all Senders that are currently inviting the Recipient to access Upstreams because the Recipient is a member of their Designated Recipient Groups for those Upstreams, and the Recipient can just click on such Sender identification and obtain immediate access to their Upstreams on the ZAPCLOUD™ WEBSITE or request a ZAPWALL matrix of Upstreams from multiple Senders. As a third example, a Recipient can request a ZAPWALL of multiple real time live video being Upstreamed by a single Sender identified by the Recipient (which may be a ZAPCHANNEL™) so that the ZAPWALL matrix is composed of multiple videos from the same Sender.

The ZAP SERVER, among other functions, (1) manages the search for and retrieval of real time live video in accordance with Recipient request criteria and the transmission of real time live video in accordance with Sender transmission criteria; (2) manages the creation of the ZAPWALL in response to Sender and Recipient criteria so that Recipients can view simultaneously the ZAPWALL matrix of multiple real time live video streams in accordance with Recipient and Sender criteria and obtain the situational, comparative and competitive awareness desired by Recipients and Senders, (3) analyzes Recipients' criteria for relevant real time live video and retrieves such video, utilizing the ZAP system databases and search engines; (4) analyzes Senders' criteria for transmission of relevant real time live video to particular Recipients and implements such transmission and controls access to Sender's video on the ZAPCLOUD™ WEBSITE in accordance with Sender's instructions; (5) manages the insertion of advertising and other information into the ZAPWALL based on the characteristics of Recipients, Senders, and/or the relevant content; (6) manages Recipients actions taken in response to the ZAPWALL matrix of real time live video, including communications with Senders and selection of all or one or more of such videos for further action, (7) manages the log-in and authentication of Recipients, Senders, members of Designated Recipient Groups, Designated Sender Groups, Safety Groups, and ZAPAPP users having codes, tags, locations or other identifiers; (8) manages words, codes, tags, locations, topics, subject matter or other identifiers associated with real time live videos upstreamed by Senders and requested by Recipients, (9) manages the forwarding of real time live videos from Senders and Recipients to Dispatchers, First Responders and Safety Groups, based on geographic location, codes, tags, and other criteria and bi-directional communication between such parties and actions taken in response thereto, (10) manages the sending of alerts to Senders and Recipients of requests for videos and availability for viewing of videos, reports of searches and retrievals of relevant videos as successful or unsuccessful, activity reports of who is viewing Sender's videos, who are Followers of ZAPCHANNELS™, and other status reports to users of ZAPAPP; (11) manages the retrieval and distribution of live real time video feeds from ZAP CAMERAS; (12) manages the insertion and replacement of Upstreamed video, formatting, bandwidth, transmission, refreshing and other display features associated with the ZAPWALL matrix, (13) manages archiving of video Upstreamed by Senders for later viewing by ZAPAPP users based on the type and purpose of the communication, (14) manages creating of "folders" of bi-directional communication by video, audio, text, imagery, data and other communications among Recipients and Senders, based on the type and purpose of the communications and (15) maintains and manages the databases associated with the foregoing.

ZAP SERVER software binds the components together. Typically this software is installed on servers that are owned and operated by ZAP, but third party operations, e.g., cloud servers, can also host ZAP SERVER.

The ZAP SERVER manages the processing and display of advertising and insertion of advertising and other information into the ZAPWALL based on the characteristics of Recipients, Senders, and/or the relevant content; maintains the database and content of advertising and the protocols and instructions for inserting such adverting into displays on the ZAPCLOUD™ WEBSITE and on ZAPWALL matrixes, and the collection of data regarding viewing and responses to such advertising. Such content which is inserted into the ZAPWALL matrix of real time live video may be third party advertising, Sender related advertising, governmental, weather or security alerts. Such advertising and other content may be inserted into all of the videos in the ZAPWALL matrix, or just one or more selected videos included in the ZAPWALL matrix, as a replacement for one or more of the cells in the ZAPWALL matrix (instead of a video in such cell), or as a banner, frame or within other areas of the viewing screen.

Bi-directional communications with the ZAP system, including the creation and display of ZAPWALLs and action taken in response thereto, may be encrypted or unencrypted and/or contain a variety of security and privacy features, based on the type and purpose of the communication and content, all managed by the ZAP SERVER.

The Upstream. i.e., alert sent by ZAPAPP to ZAP SERVER can contain the login id of the Sender to identify the caller and the geo-location coordinates of the Sender. Similarly, a Recipient requesting content or a ZAPWALL requires the ZAP SERVER to process the login of the Recipient and the geo-location coordinates of the Recipient. Additional information can also be included. As soon as the ZAP SERVER gets this information, it creates a folder on the database for storing all bi-directional communications relating to the specific session and the specific Sender and/or Recipient, including video, audio, text, chat and data files and other information such as Recipient request criteria, Sender transmission criteria, and results of searches for relevant real time live videos. The ZAP SERVER will maintain folder information, e.g., folder identification or storage location for the information for this Upstream and/or this session. Once the folder is established, the ZAP SERVER expects, registers and stores video upstreams and all other communications relating to the session. The folder created by the ZAP SERVER provides the storage location which is also recorded in the data base to set up a pointer between the upstream and its storage location. The creation and maintenance of folders by the ZAP SERVER enables extensive status, alert and reporting capabilities, as well as archiving of video upstreams for later retrieval for a wide variety of purposes. For example, a Dispatcher or other personnel associated with a police, security or military application, or sports team managers, players and fans, may wish to review ZAPWALLs of video sessions to study and analyze a particular incident or sports play the multiple viewing angles enabled by the ZAPWALL matrix of video streams taking by different Senders or ZAP CAMERAS.

The information, e.g., data in the form of video, images, audio, text or data, that is received on the ZAP SERVER is stored in the ZAP SERVER, identified by folders as described above. The length of time the folder and information is stored is based on the purpose and content of the communication. Senders and Recipients may specify for each particular Upstream how long the content thereof is to be displayed on the ZAPCLOUD™ Website or available for viewing as a ZAPWALL, as well as how long the folder is to be preserved within the database archives. For example, police, security and military users may have certain protocols as to the time to store information and content which will be based on their registration into the ZAP system, as it may be required for investigative and evidentiary purposes; commercial and retail organizations may have different protocols as to maintaining only current content on the ZAP system, as they would only want to display videos of current products and services; individual users may designate a variety of time limits—24 hours for spontaneous, fun videos Upstreamed to friends, much longer for videos of holiday and vacation activity. The Sender may specify for each particular Upstream how long the content thereof is to be displayed on the ZAPCLOUD™ WEBSITE and available for inclusion in ZAPWALLs, and a Recipient who has received a ZAPWALL and forwarded it to a Designated Recipient Group or a Safety Group may specify for each particular ZAPWALL received how long the content thereof is to be available. For example, a Recipient who requests a ZAPWALL of multiple real time live videos because he or she is walking on a train platform at night and is worried about personal safety, and forwards to his or her Safety Group the ZAPWALL of live videos and feeds from ZAP CAMERAS at the train station, may specify that if no emergency situation actually arises, the content is to be deleted from the ZAP system after a limited amount of time. Even if the ZAPWALL is not available for viewing after such limited time period, the ZAP SERVER may store the information for a longer period of time in accordance with ZAP SERVER protocols, just in case some other ZAPAPP user or a Dispatcher or other authority in a ZAP PROTECTED COUNTY, organization or facility does report an emergency relating to that location, but eventually it will be deleted unless there has been an actual emergency incident.

The novel system can operate with the following protocols: SOCKETS, HTTP Uploads, RTP, RTSP, RTMP and/or MQTT. Other protocols for communication, transfer and receipt of data may also be used. Methods of transmission of information in the inventive system can include TP, Messaging, Secure Sockets, Secure HHTP Secure FTP, Secure Messaging, server protocols, Secure RTP, Secure RTSP and/or Secure RTMP.

Various aspects of the present disclosure may be embodied as a program, software or computer instructions embodied or stored in a computer or machine usable or readable medium, which causes the computer or machine to perform the steps of the method when executed on the computer, process and/or machine. A program storage device readable by a machine, e.g., a computer readable medium, tangibly embodying a program of instructions executable by the machine to perform various functionalities and methods described in the present disclosure is also provided.

The system and method of the present disclosure may be implemented and run on a special purpose computer system. The computer system may be any type of known or will be known system and may typically include a processor, memory device, a storage device, input/output devices, internal buses and/or a communications interface for communicating with other computer systems in conjunction with the communication hardware and software, etc. The system also may be implemented on a virtual computer system, colloquially known as a cloud.

The computer readable medium is a non-transitory computer readable storage medium. Regarding a computer readable storage medium, it may be, for example, a magnetic, optical, electronic, electromagnetic, infrared or semiconductor system, apparatus or device, or any suitable combination of the foregoing; however, the computer readable storage medium is not limited to these examples. Additional particular examples of the computer readable storage medium can include: a portable diskette, a hard disk, a magnetic storage device, a portable compact disc, read only memory (CD-ROM), a random access memory (RAM), a read only memory (ROM), an erasable programmable read only memory (EPROM or Flash Memory) an electronic connection having one or more wires, an optical fiber, an optical storage device, or any appropriate combination of the foregoing, however, the computer readable storage medium is also not limited to these examples. Any non-transitory tangible medium that can contain, or store a program for use by or in connection with an instruction execution system apparatus or device could be a computer readable storage medium.

The terms "computer system" and "computer network" as may be used in the present application may include a variety of combinations of fixed and/or portable computer hardware, software, peripherals and storage devices. The computer system may include a plurality of individual components that are networked or otherwise linked to perform collaboratively or may include one or more stand alone components. The hardware and software components of the computer system of the present application may include and may be included within fixed and portable devices such as a desktop, laptop and/or server and network of servers (cloud). A module may be a component of a device, software, program, or system that implements some "functionality" which can be embodied as software, hardware, firmware, electronic circuitry, or etc.

The terms "click" and "click on" as may be used in the present application may include a variety of techniques for input, such as touching tee screen, pressing with a stylus device, announcing voice command or other known methods.

The embodiments described above are illustrative examples and it should not be construed that the present invention is limited to these particular embodiments. Thus, various changes and modifications may be effected by one skilled in the art without departing from the spirit or scope of the invention as defined in the appended claims.

The invention claimed is:

1. A system for simultaneous real time video streaming from multiple mobile devices or other sources through a server to a website and to recipient mobile devices or other video displays, to create a wall of real time live videos, comprising:

a server having a CPU, the server operable to bi-directionally communicate with one or more sender devices and with one or more recipient devices, the one or more sender devices and the one or more recipient devices having an application operable to stream to the server real time videos at the same time as the video is being captured by the one or more sender devices, the application being operable to retrieve and display from the server the multiple real time videos in a wall on one or more recipient devices;

a module on the server operable to:

receive a request from a recipient device to perform one or more of search, retrieve, upstream and simultaneously transmit real time videos from multiple sender devices to the requesting recipient device and other designated recipient devices, in accordance with recipient's search criteria;

authenticate the log-in of the recipient device, receive a request from one or more sender devices to upstream real time videos from one or more sender devices through the server to designated recipient devices, authenticate the log-in of the sender device, receive an upstream of real time video from the sender device, the video being streamed at the same time as the video is being captured by the sender device, transmit and display the upstream to the website, transmit a notice of the upstream to, one or more of, the requesting recipient devices in accordance with the log-in of the recipient device and one or more preselected recipients comprising one or more Designated Recipient Groups selected in accordance with the log-in of the sender device, predetermined recipients in accordance with the log-in of the sender device, and other recipients meeting Sender's criteria in accordance with the log-in of the sender device, search for, identify, retrieve and format a matrix of multiple real time videos from one or more sender devices meeting the requesting recipient's search criteria into a video wall, stream to the recipient device of the requesting recipient, the video wall of the matrix of multiple real time videos at the same time as each of the multiple videos is being captured for simultaneous viewing of the multiple real time live video streams, search for and identify recipients meeting criteria set by the one or more senders for receiving real time videos from the one or more sender devices, and add an identification of the sender to the video wall of the matrix of multiple real time videos, stream to the one or more recipient devices associated with the identified recipients meeting the criteria of one or more senders, multiple real time videos from the sender devices associated with such senders, at the same time as each of the multiple videos is being captured, for simultaneous viewing of the multiple real time live video streams, enable the recipients whose recipient devices are displaying the video wall of the matrix of multiple real time live video streams to select from the web site one or more of the real time live video streams for one or more of enlargement of the display and the taking of actions in response, enable the recipients whose recipient devices are displaying the video wall of the matrix of multiple real time live video streams to take actions on the web site in response to one or more of the real time live videos, route responsive actions from the recipients from the website and display the responsive actions on the one or more multiple displayed upstreams selected by the recipient and communicate the responsive actions to the one or more senders of the displayed upstreams, insert one or more of third party advertising, other third party information, sender advertising, and other sender information into one or more of the multiple real time live video streams being displayed on the recipient device based on one or more of the log in, search criteria and geographic location of the recipients or the senders, or other data relating to the real time live video streams, in real time at the same time as the video is being captured, and record the bi-directional communication between the one or more sender devices and the one or more recipient devices, including the multiple real time live video streams and the responsive actions.

2. The system according to claim 1, wherein the module is further operable to route bi-directional communications between the one or more sender devices and the one or more recipient devices, wherein the bi-directional communication comprises one or more of live audio, images, text, data in encrypted form and data in unencrypted form.

3. The system according to claim 1, wherein the sender device and the recipient device are each a mobile device having characteristics comprising at least a geographic locator and the server further operable to prepare and maintain a map of the geographic location of each sender and recipient device.

4. The system according to claim 1, wherein the bi-communication between the server and the sender device is performed using one or more of an internet and a cellular network, the bi-communication between the server and the one or more recipient devices is performed using one or more of an internet and cellular network.

5. The system according to claim 1, wherein the one or more recipient devices comprise one or more of a mobile device, a personal computer, a laptop, a tablet and an internet television, and at least one or more of the recipient devices and a log-in of one of the one or more recipient devices is registered with the system, and wherein the one or more sender devices comprise one or more of a mobile device, a personal computer, a laptop, a tablet, an internet television and a video camera, and at least one or more the sender devices and a log-in of one of the one or more sender devices is registered with the system.

6. The system according to claim 1, the module further operable to manage data describing the log-in of the sender device, the data comprising one or more of name, address and emergency contacts of a particular sender associated with the sender device and pre-selected recipient names and telephone numbers, and manage data describing the log-in of the recipient device, the data comprising one or more of name and address of a particular recipient associated with the recipient device.

7. The system according to claim 1, wherein the responses to the displayed content comprise at least communicating with the log-in of the device, posting comments, conducting electronic commerce, making appointments and making reservations.

8. The system according to claim 1, further including a real time streaming video channel associated with a particular sender which contains live video imagery and other information uploaded by the particular sender to the website and which can be accessed by the one or more pre-selected recipients or by the general public on the website, in which the particular sender can upstream multiple live videos to be viewed simultaneously by recipients, and/or in which the particular sender can upstream live videos to be viewed by recipients simultaneously with live videos from other senders with similar channels.

9. The system according to claim 8, wherein the video channel includes the ability of the pre-selected recipients or general public to take actions on the website in response to the information on the video channel, the actions comprising conducting electronic commerce transactions, making appointments, making reservations, and entering text and data, with the ability of such actions to be taken simultaneously in response to multiple real time videos being upstreamed on the channel or as to one or more of the multiple real time videos being upstreamed on the channel.

10. The system according to claim 9, wherein the module is further operable to enable searching for video imagery, audio, text and data on the website with respect to particular channels and particular senders, and to format and create the video wall of the matrix or grid of real time live video and other information, so that the requesting recipient can simultaneously view multiple real time live videos and other information meeting the requesting recipient's criteria.

11. The system according to claim 3, wherein the module is further operable to determine the geo-location of a sender device and a recipient device, send an alert to a dispatcher nearest to the geo-location of the sender device or recipient device, as applicable, and stream the real time video to the nearest dispatcher, including the entire matrix or grid of multiple real time live videos and other information available to the sender or to a recipient who has requested such information, or one or more live videos included within such matrix or grid.

12. The system according to claim 11, wherein the module is further operable to forward the real time video, including one or more of the live videos of the video wall of the matrix of multiple real time live video and other information available to the dispatcher, to responders selected by the dispatcher based on the geo-location of the sender device or recipient device which provided the content to the dispatcher.

13. The system according to claim 11, wherein the module is further operable to send an alert to one or more pre-selected recipients, stream the real time video to the one or more pre-selected recipients, including the entire matrix or grid of multiple real time live video and other information available to the dispatcher (or one or more live videos included within such matrix or grid), and forward the real time video from the one or more pre-selected recipients to the nearest dispatcher based on the geo-location of the sender device, including the entire matrix or grid of multiple real time live video and other information available to the recipient (or one or more live videos included within such matrix or grid).

14. The system according to claim 1, wherein the module is further operable to obtain a login ID and geo-location of the sender device, create a folder for storing the upstream and send folder identifying information back to the sender device thereby creating a video session between the sender device and the server, and wherein the module is further operable to obtain a login ID and geo-location of the recipient device which has requested live video, create a folder for storing the upstreams requested by the recipient and send folder identifying information back to the recipient device thereby creating a video session between the recipient device and the server.

15. The system according to claim 14, wherein the module is further operable to store the upstream, including one or more of video, audio, text and data files in the folder relating to the video session, including identifying information as to the matrix or grid of multiple real time live videos created in response to requests by a recipient or for which a sender has requested inclusion of real time live videos upstreamed by the sender.

16. The system according to claim 15, wherein the module is further operable to store in the folder one or more of video, audio, text and data files of bi-directional communications related to the video session.

17. A method for simultaneous real time video streaming from multiple mobile devices or other sources through a server to a website and to recipient mobile devices or other video displays, to create a wall of real time live videos, comprising steps of:

receiving a request from a recipient device to perform one or more of search, retrieve, upstream and simultaneously transmit real time videos from multiple sender devices to the requesting recipient device and other designated recipient devices, in accordance with recipient's search criteria;

authenticating the log-in of the recipient device, receiving a request from one or more sender devices to upstream real time videos from one or more sender devices through the server to designated recipient devices, authenticating the log-in of the sender device, receiving an upstream of real time video from the sender device, the video being streamed at the same time as the video is being captured by the sender device, transmitting and displaying the upstream to the website, transmitting a notice of the upstream to, one or more of, the requesting recipient devices in accordance with the log-in of the recipient device and one or more pre-selected recipients comprising one or more Designated Recipient Groups selected in accordance with the log-in of the sender device, predetermined recipients in accordance with the log-in of the sender device, and other recipients meeting Sender's criteria in accordance with the log-in of the sender device, searching for, identifying, retrieving and formatting a matrix of multiple real time videos from one or more sender devices meeting the requesting recipient's search criteria into a video wall, streaming to the recipient device of the requesting recipient, the video wall of the matrix of multiple real time videos at the same time as each of the multiple videos is being captured for simultaneous viewing of the multiple real time live video streams, searching for and identifying recipients meeting criteria set by the one or more senders for receiving real time videos from the one or more sender devices, and adding an identification of the sender to the video wall of the matrix of multiple real time videos, streaming to the one or more recipient devices associated with the identified recipients meeting the criteria of one or more senders, multiple real time videos from the sender devices associated with such senders, at the same time as each of the multiple videos is being captured, for simultaneous viewing of the multiple real time live video streams, enabling the recipients whose recipient devices are displaying the video wall of the matrix of multiple real time live video streams to select from the web site one or more of the real time live video streams for one or more of enlargement of the display and the taking of actions in response, enabling the recipients whose recipient devices are displaying the video wall of the matrix of multiple real time live video streams to take actions on the web site in response to one or more of the real time live videos, routing responsive actions from the recipients from the website and displaying the responsive actions on the one or more multiple displayed upstreams selected by the recipient and communicating the responsive actions to the one or more senders of the displayed upstreams, inserting one or more of third party advertising, other third party information, sender advertising, and other sender information into one or more of the multiple real time live video streams being displayed on the recipient device based on one or more of the log in, search criteria and geographic location of the recipients or the senders, or other data relating to the real time live video streams, in real time at the same time as the video is being captured, and recording bi-directional communication between the one or more sender devices and the one or more recipient devices, including the multiple real time live video streams and the responsive actions.

18. The method according to claim 17, further comprising steps of:

routing the bi-directional communication between the one or more sender devices and the one or more recipient devices and performing the bi-directional communication using one or more of live audio, images, text, data in encrypted form and data in unencrypted form.

19. The method according to claim 17, further comprising a step of preparing and maintaining a map of the geographic location of each sender and recipient device.

20. The method according to claim 17, wherein the step of bi-directionally communicating between the server and the sender device is performed using one or more of an internet and a cellular network, and the step of bi-directionally communicating between the server and the one or more recipient devices is performed using one or more of an internet and cellular network.

21. The method according to claim 17, further comprising a step of registering at least one or more recipient devices and a log-in of one of the one or more recipient devices with the system, wherein the recipient devices comprise one or more of a mobile device, a personal computer, a laptop, a tablet and an internet television, and registering at least one or more sender devices and a log-in of one or more sender devices with the system, wherein the sender devices comprise one or more of a mobile device, a personal computer, a laptop, a tablet, an internet television and a video camera.

22. The method according to claim 17, further comprising the steps of: managing data describing the log-in of the sender device, the data comprising on or more of name, address and emergency contacts of a particular sender associated with the sender device and pre-selected recipient names and telephone numbers and managing data describing the log-in of the recipient device, the data comprising one or more of name and address of a particular recipient associated with the recipient device.

23. The method according to claim 17, wherein the responses to the displayed content comprise at least communicating with the log-in of the device, posting comments, conducting electronic commerce, making appointments and making reservations.

24. The method according to claim 17, further including streaming a real time video channel associated with a particular sender which contains live video imagery and other information uploaded by the particular sender to the website and which can be accessed by the one or more pre-selected recipients or by the general public on the website, in which the particular sender can upstream multiple live videos to be viewed simultaneously by recipients, and/or in which the particular sender can upstream live videos to be viewed by recipients simultaneously with live videos from other senders with similar channels.

25. The method according to claim 24, wherein the video channel includes the ability of the pre-selected recipients or general public to take actions on the website in response to the information on the video channel, the actions comprising conducting electronic commerce transactions, making appointments, making reservations, and entering text and data, with the ability of such actions to be taken simultaneously in response to multiple real time videos being upstreamed on the channel or as to one or more of the multiple real time videos being upstreamed on the channel.

26. The method according to claim 25, further including searching for video imagery, audio, text and data on the website with respect to particular channels and particular senders, and formatting and creating the video wall of the matrix of real time live video and other information, so that the requesting recipient can simultaneously view multiple real time live videos and other information meeting the requesting recipient's criteria.

27. The method according to claim 19, further comprising determining the geo-location of a sender device and a recipient device, sending an alert to a dispatcher nearest to the geo-location of the sender device or recipient device, as applicable, and streaming the real time video to the nearest dispatcher, including the entire video wall of the matrix of multiple real time live videos and other information available to the sender or to a recipient who has requested such information, or one or more live videos included within the video wall.

28. The method according to claim 27, further including forwarding the real time video, including one or more of the live videos of the video wall of the matrix of multiple real time live video and other information available to the dispatcher, to responders selected by the dispatcher based on the geo-location of the sender device or recipient device which provided the content to the dispatcher.

29. The method according to claim 27, further including sending an alert to one or more pre-selected recipients, streaming the real time video to the one or more pre-selected recipients, including one or more live videos of the video wall of the matrix of multiple real time live video and other information available to the dispatcher, and forwarding the real time video from the one or more pre-selected recipients to the nearest dispatcher based on the geo-location of the sender device, including one or more live videos of the video wall of the matrix or grid of multiple real time live video and other information available to the recipient.

30. The method according to claim 17, further including obtaining a login ID and geo-location of the sender device, creating a folder for storing the upstream and sending folder identifying information back to the sender device thereby creating a video session between the sender device and the server, obtaining a login ID and geo-location of the recipient device which has requested live video, creating a folder for storing the upstreams requested by the recipient and sending folder identifying information back to the recipient device thereby creating a video session between the recipient device and the server, storing the upstream, including one or more of video, audio, text and data files in the folder relating to the video session, including identifying information as to video wall of the matrix of multiple real time live videos created in response to requests by a recipient or for which a sender has requested inclusion of real time live videos upstreamed by the sender, and storing in the folder one or more of video, audio, text and data files of bi-directional communications related to the video session.

\* \* \* \* \*